(12) United States Patent
Ito

(10) Patent No.: US 9,699,195 B2
(45) Date of Patent: Jul. 4, 2017

(54) LICENSE MANAGEMENT SYSTEM, LICENSE MANAGEMENT DEVICE, AND COMPUTER-READABLE RECORDING MEDIUM HAVING LICENSE MANAGEMENT PROGRAM

(75) Inventor: Tatsuo Ito, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 306 days.

(21) Appl. No.: 13/503,945

(22) PCT Filed: Nov. 2, 2010

(86) PCT No.: PCT/JP2010/069876
§ 371 (c)(1),
(2), (4) Date: Apr. 25, 2012

(87) PCT Pub. No.: WO2011/055835
PCT Pub. Date: May 12, 2011

(65) Prior Publication Data
US 2012/0210442 A1 Aug. 16, 2012

(30) Foreign Application Priority Data

Nov. 4, 2009 (JP) ................. 2009-253500

(51) Int. Cl.
*H04L 29/06* (2006.01)
*G06F 21/10* (2013.01)
*G06F 21/12* (2013.01)

(52) U.S. Cl.
CPC ............ *H04L 63/102* (2013.01); *G06F 21/10* (2013.01); *G06F 21/121* (2013.01); *H04L 2463/101* (2013.01)

(58) Field of Classification Search
CPC ...... G06F 21/10; G06F 21/105; G06F 21/608; G06Q 50/184
(Continued)

(56) References Cited

U.S. PATENT DOCUMENTS 5,418,889 A 5/1995 Ito
5,438,508 A 8/1995 Wyman
(Continued)

FOREIGN PATENT DOCUMENTS

EP 2 019 364 A2 1/2009
JP 2001-125976 5/2001
(Continued)

OTHER PUBLICATIONS

The Extended European Search Report issued Apr. 16, 2014, in Application No. / Patent No. 10828393.8-1870 / 2497050 PCT/JP2010069876.

(Continued)

*Primary Examiner* — Harunur Rashid
*Assistant Examiner* — Quy Pham
(74) *Attorney, Agent, or Firm* — Oblon, McClelland, Maier & Neustadt, L.L.P.

(57) ABSTRACT

A license management device includes a license identifier generator unit generating a license identifier and license information corresponding to a group of application programs, the license identifier associated with a group identifier of the group and the license information on the group, a group information storage unit storing the group identifier with a product identifier of each application program, a license information storage unit recording the license identifier corresponding to the group identifier with the product identifier of the application program, a determination unit determining, on receiving the license identifier associated with the application program, whether the received license identifier is recorded in the license information storage unit, and a sending unit sending via a network, if the received license identifier is recorded in the license information storage unit, a license file corresponding to the recorded
(Continued)

license identifier to provide a permission to use the application program of the group.

16 Claims, 52 Drawing Sheets

(58) Field of Classification Search
USPC .......................................................... 726/33
See application file for complete search history.

(56) References Cited

U.S. PATENT DOCUMENTS

| | | |
|---|---|---|
| 6,273,136 B1 | 8/2001 | Steinert |
| 7,239,406 B1 | 7/2007 | Piersol |
| 7,307,748 B2 | 12/2007 | Piersol |
| 7,359,074 B2 | 4/2008 | Ito |
| 7,613,404 B2 | 11/2009 | Takeuchi et al. |
| 7,859,700 B2 | 12/2010 | Ito |
| 7,929,162 B2 | 4/2011 | Ito et al. |
| 8,122,119 B1* | 2/2012 | Green .................... G06F 21/10 709/224 |
| 2002/0184515 A1 | 12/2002 | Oho et al. |
| 2003/0225894 A1 | 12/2003 | Ito |
| 2004/0236862 A1 | 11/2004 | Ito et al. |
| 2005/0044248 A1 | 2/2005 | Mihira et al. |
| 2005/0117179 A1 | 6/2005 | Ito et al. |
| 2005/0216420 A1* | 9/2005 | Padole et al. .................. 705/59 |
| 2006/0080447 A1 | 4/2006 | Takeuchi et al. |
| 2007/0165265 A1 | 7/2007 | Ito et al. |
| 2007/0201723 A1 | 8/2007 | Ito |
| 2007/0220484 A1 | 9/2007 | Takahashi et al. |
| 2008/0005029 A1 | 1/2008 | Ando |
| 2008/0027742 A1 | 1/2008 | Maeda |
| 2008/0209569 A1 | 8/2008 | Araki |
| 2009/0024984 A1* | 1/2009 | Maeda .......................... 717/121 |
| 2009/0031432 A1 | 1/2009 | Wakai |
| 2009/0037336 A1* | 2/2009 | Sunata ................. G06F 21/105 705/59 |
| 2009/0037492 A1* | 2/2009 | Baitalmal et al. ............ 707/201 |
| 2010/0011336 A1* | 1/2010 | Muller et al. ................ 717/100 |
| 2011/0276501 A1 | 11/2011 | Sako et al. |

FOREIGN PATENT DOCUMENTS

| | | |
|---|---|---|
| JP | 2006 18403 | 1/2006 |
| JP | 2006-134246 | 5/2006 |
| JP | 2006-236273 | 9/2006 |
| JP | 2007 316938 | 12/2007 |
| JP | 2008 16013 | 1/2008 |
| JP | 2008 33561 | 2/2008 |
| JP | 2008 243180 | 10/2008 |
| JP | 2009 31851 | 2/2009 |
| JP | 2009-48466 | 3/2009 |
| WO | WO 2010092655 A1 * | 8/2010 |

OTHER PUBLICATIONS

Japanese Office Action issued Feb. 17, 2015 in Patent Application No. 2013-211609 (1 page).
International Search Report Issued Feb. 1, 2011 in PCT/JP10/69876 Filed Nov. 2, 2010.
Japanese Office Action issued Jul. 22, 2014, in Japan patent application No. 2013-211609.

* cited by examiner

FIG.9

| DOMAIN NAME | DISTRIBUTION SITE ID | PASSWORD |
|---|---|---|
| US (UNITES STATES) | ... | ... |
| EU (EUROPEAN UNION) | ... | ... |
| JP (JAPAN) | ... | ... |
| AP (ASIA PACIFIC) | ... | ... |
| OTHERS | ... | ... |

COMMERCIAL PRODUCT INFORMATION EDITION SCREEN ~210

2111

| | | |
|---|---|---|
| DOMAIN NAME | JP ~2113 | |
| PRODUCT ID/GROUP ID | 872415248  SELECT ~2116  xxxx ~2114 | SELECT ~2112 ~2115 |
| PRODUCT UNIT ID CLASSIFICATION | PRODUCT ID | |
| LICENSE ARRANGEMENT | TRIAL LICENSE ⌄ ~2117 | |
| LICENSE VALIDATION PERIOD | 30 ~2118 | |
| VOLUMES (NUMBER OF INSTALLABLE APPARATUSES) | 1 ~2119 | |
| CLASS CODE | 8724152489999 ~2120 | |
| COMMERCIAL PRODUCT NAME | AUTO-GENERATION ~2121<br>xxxx_Trial_30days ~2122 | |
| COMMERCIAL PRODUCT NAME (JAPANESE) | xxxx_Trial_30days ~2123 | |

OK ~2131    CANCEL

FIG.11

| PRODUCT ID | DISTRIBUTION PACKAGE NAME (JAPANESE) | VENDOR NAME (JAPANESE) | DISTRIBUTION PACKAGE NAME (ENGLISH) | VENDOR NAME (ENGLISH) | ... |
|---|---|---|---|---|---|
| 11111111 | DISTRIBUTION PACKAGE 1 | xxxxxxxx | Package1 | xxxxxxxx | ... |
| 11111112 | DISTRIBUTION PACKAGE 2 | xxxxxxxx | Package2 | xxxxxxxx | ... |
| .. | .. | .. | .. | .. | .. |

| GROUP ID | DISTRIBUTION SITE ID | PRODUCT ID | DELETE FLAG |
|---|---|---|---|
| 001 | ... | ... | ON |
| 001 | ... | ... | ON |
| 001 | ... | ... | ON |
| 002 | ... | ... | ON |
| 002 | ... | ... | ON |

| GROUP ID | LANGUAGE | GROUP NAME |
|---|---|---|
| 001 | JAPANESE | ... |
| 001 | ENGLISH | ... |
| 001 | ... | ... |
| : | : | : |
| 002 | JAPANESE | ... |
| : | : | : |

| CLASS CODE | PRODUCT UNIT ID (PRODUCT ID /GROUP ID) | LICENSE ARRANGEMENT | LICENSE VALIDATION PERIOD | VOLUMES | COMMERCIAL PRODUCT NAME |
|---|---|---|---|---|---|
| …… | …… | OUTRIGHT LICENSE | PERMANENT | 1 | SECURITY PACK (PERMANENT) …… |
| …… | …… | TIME-LIMITED LICENSE (SPECIFIED PERIOD) | ONE YEAR | 10 | SECURITY PACK (ONE YEAR) …… |
| …… | …… | TIME-LIMITED LICENSE (SPECIFIED DUMMY PERIOD) | ONE YEAR | 100 | …… |
| …… | …… | TIME-LIMITED LICENSE (SPECIFIED PERIOD/ AUTOMATIC UPDATING) | ONE YEAR | 1 | …… |
| …… | …… | TRIAL LICENSE | ONE MONTH | 1 | SECURITY PACK TRIAL (ONE MONTH) …… |

| MANAGEMENT NO. | PRODUCT KEY | PRODUCT ID | APPARATUS NO. | STATUS | LICENSE ARRANGEMENT | LICENSE VALIDATION PERIOD | LICENSE EXPIRATION PERIOD | LICENSE ISSUANCE DATE |
|---|---|---|---|---|---|---|---|---|
| 1 | KEY001 | PR0xxx001 | K00001 | CHECK-OUT | TIME-LIMITED LICENSE (SPECIFIED PERIOD) | ONE YEAR | | |
| 2 | KEY001 | PR0xxx001 | K00002 | CHECK-OUT | TIME-LIMITED LICENSE (SPECIFIED PERIOD) | ONE YEAR | | |
| 3 | KEY001 | PR0xxx001 | | CHECK-IN | TIME-LIMITED LICENSE (SPECIFIED PERIOD) | ONE YEAR | | |
| 4 | KEY002 | PR0xxx002 | K00003 | CHECK-OUT | | | | |
| 5 | KEY002 | PR0xxx003 | K00003 | CHECK-OUT | | | | |
| 6 | KEY003 | PR0xxx004 | K00004 | CHECK-OUT | | | | |

121

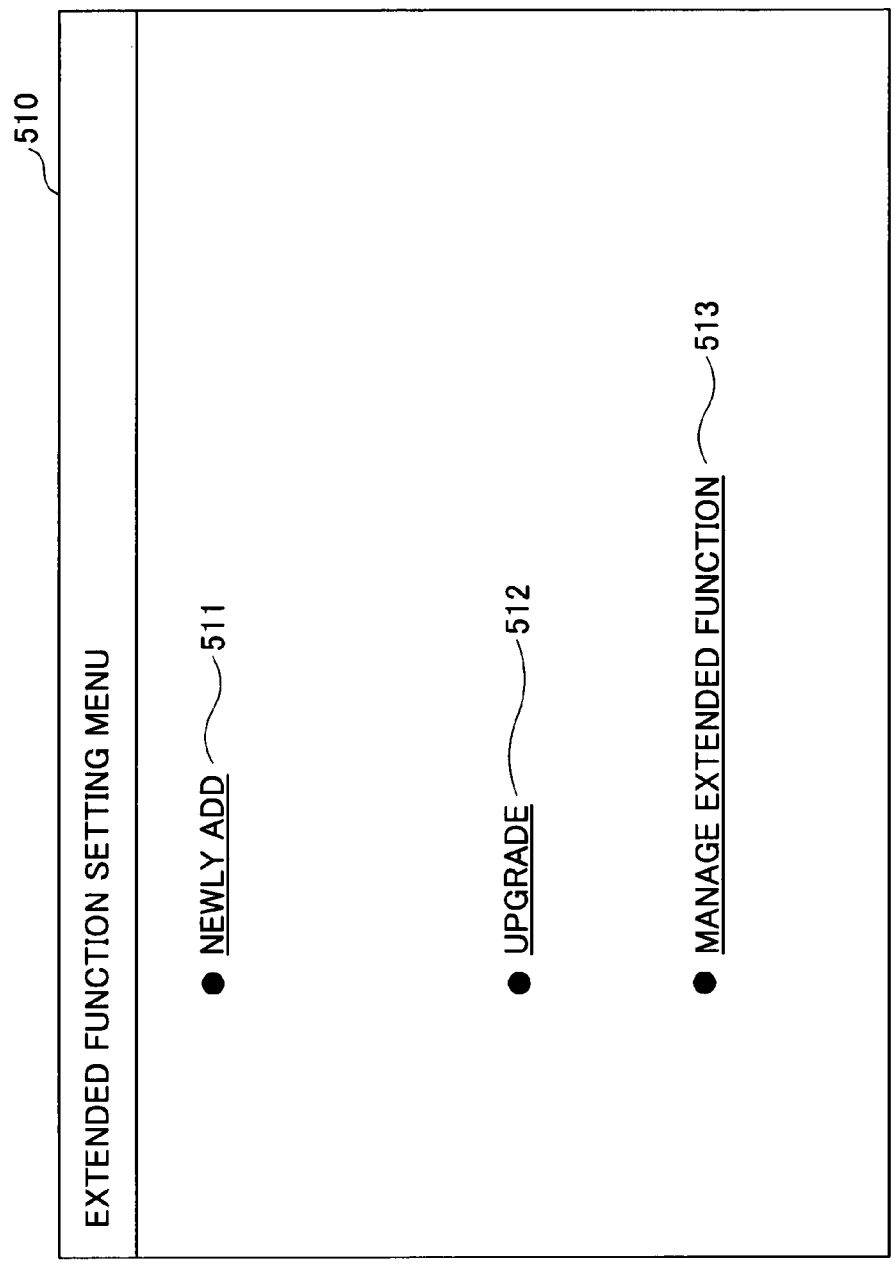

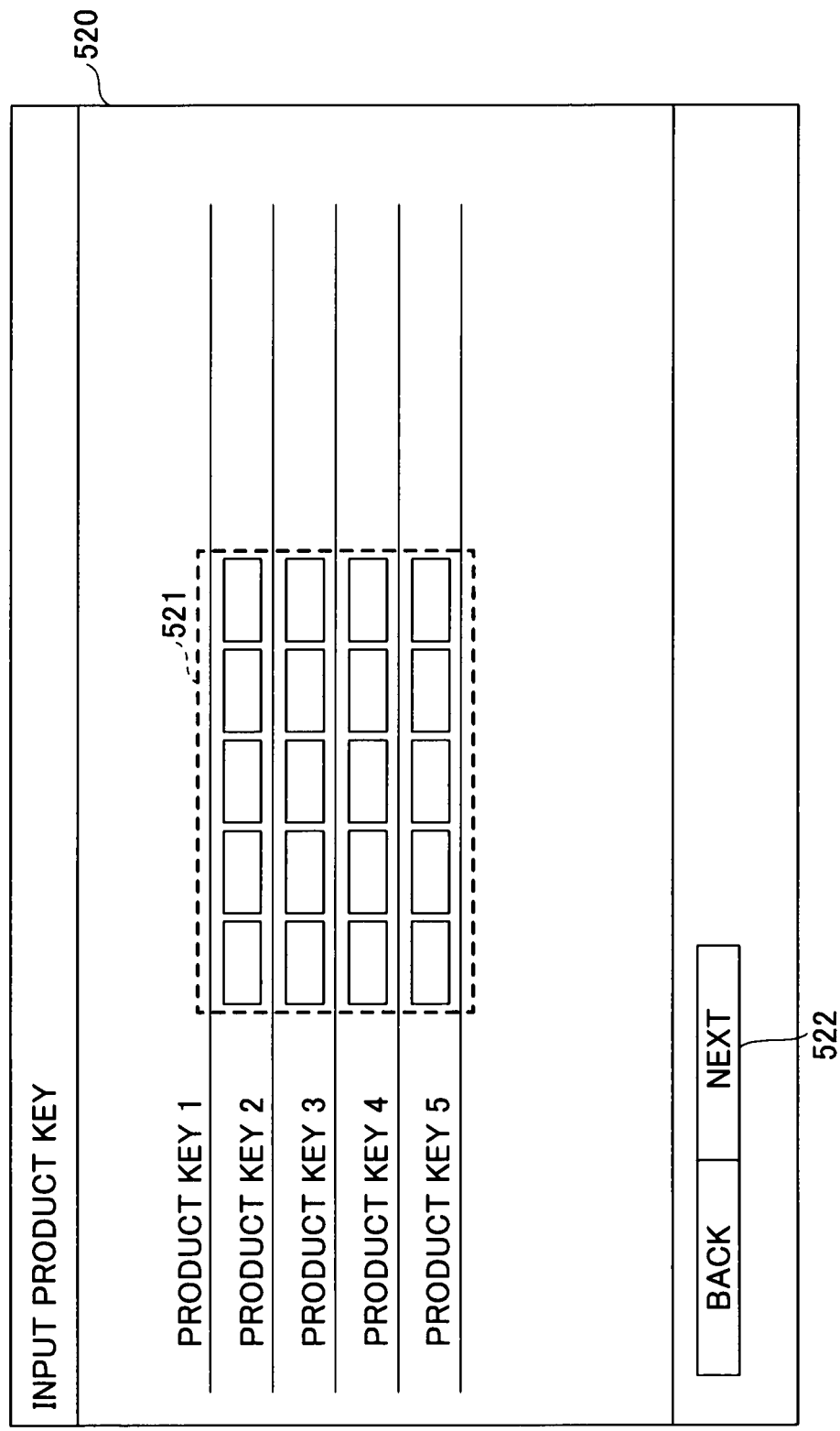

FIG.25

LICENSE ACQUISITION/UPDATING — 530

⚠ ERRORS

TWO ERRORS: ACTIVATION ERRORS OCCURRED.
PLEASE CORRECT ERRORS BY FOLLOWING PROCEDURES.

[ERROR 1]
*PRODUCT KEY ERROR.

▶ NEW PACKAGE 1

| PACKAGE NAME (VERSION) | PACKAGE 1 (1.0) | |
|---|---|---|
| *PRODUCT KEY [ERROR 1] | PLEASE ENTER CORRECT PRODUCT KEY. ☐ ☐ ☐ ☐ | — 531 |
| TYPE | PACKAGE TYPE A | |
| VENDOR | XXX | |
| DESCRIPTION | DESCRIPTION OF PACKAGE 1 | |
| PACKAGE MEMBER (VERSION) | EXTENDED FUNCTION 1 (1.0) EXTENDED FUNCTION 2 (2.0) | |

[ OK ] — 532     [ CANCEL ] — 533

FIG.26

| PRODUCT ID | VERSION | NAME | DESCRIPTION | VENDOR NAME | DISTRIBUTION TYPE | DOWNLOAD PATH | PRODUCT ID OF FUNCTION PACKAGE | ... |
|---|---|---|---|---|---|---|---|---|
| ... | ... | ... | ... | ... | ... | ... | ... | ... |
| ... | ... | ... | ... | ... | ... | ... | ... | ... |
| ... | ... | ... | ... | ... | ... | ... | ... | ... |

INSTALLATION LIST

PLEASE SELECT PACKAGE YOU WISH TO INSTALL, AND THEN PRESS "INSTALL" BUTTON.

| | NAME (VERSION)/PRODUCT KEY | FUNCTION DESCRIPTION | LICENSE ARRANGEMENT | VENDOR NAME |
|---|---|---|---|---|
| ☑ | PURCHASED PACKAGE 1 ⟨1.1⟩ | ⊞ DESCRIPTION | TIME-LIMITED LICENSE | XXX |
| ☑ | PURCHASED PACKAGE 2 ⟨1.2⟩ | ⊞ DESCRIPTION | TRIAL LICENSE | XXX |
| ☑ | PURCHASED PACKAGE 3 ⟨2.0⟩ | ⊞ DESCRIPTION | TIME-LIMITED LICENSE | XXX |
| ☐ | PURCHASED PACKAGE 4 ⟨3.0⟩ | ⊞ DESCRIPTION | | |

| INSTALL | CANCEL |

FIG.28

| PRODUCT ID | VERSION | PRODUCT ID OF FUNCTION PACKAGE | ACTIVATION FLAG | LICENSE EXPIRATION DATE |
|---|---|---|---|---|
| ... | ... | ......... | ACTIVATED | 2009.1.30 |
| ... | ... | ......... | INACTIVATED | PERMANENT |
| .. | .. | .. | .. | .. |

| INSTALLATION | |
|---|---|
| CONFIRM | |
| FOLLOWING PACKAGES WILL BE INSTALLED. OK? | |
| NUMBER OF PACKAGES | 2 |
| ▼ NEW PACKAGE 1 | |
| PACKAGE NAME (VERSION) | PACKAGE 1 (1.0) |
| VENDOR | XXX |
| DESCRIPTION | DESCRIPTION OF PACKAGE 1 |
| LICENSE ARRANGEMENT | TRIAL LICENSE |
| PACKAGE MEMBER (VERSION) | EXTENDED FUNCTION 1 (1.0)<br>EXTENDED FUNCTION 2 (2.0) |
| DEPENDENCY PACKAGE/FIRMWARE | PACKAGE 2 (2.1) \<TO BE INSTALLED SIMULTANEOUSLY\><br>PACKAGE 3 (3.1) \<ALREADY INSTALLED\>  ⟵ 552a |
| INSTALLATION | NEW |
| LICENSE ACQUISITION | NEW |
| ▲ NEW PACKAGE 2 | |

551a

[ OK ] [ CANCEL ]

FIG.30

INSTALLATION

| CONFIRM | | |
|---|---|---|
| THERE IS DEPENDENCY FIRMWARE OF SELECTED PACKAGE THAT IS NOT UPDATED. DEPENDENCY FIRMWARE IS UPDATED SIMULTANEOUSLY WITH SELECTED PACKAGE. OK? — 552b | | |
| NUMBER OF UNUPDATED FIRMWARE | 1 | |
| NAME OF UNUPDATED FIRMWARE | FIRMWARE 5 (2.0) | |

▼ NEW PACKAGE 1

| PACKAGE NAME (VERSION) | PACKAGE 1 (1.0) |
|---|---|
| VENDOR | XXX |
| DESCRIPTION | DESCRIPTION OF PACKAGE 1 |
| LICENSE ARRANGEMENT | TRIAL LICENSE |
| PACKAGE MEMBER (VERSION) | EXTENDED FUNCTION 1 (1.0)<br>EXTENDED FUNCTION 2 (2.0) |
| DEPENDENCY PACKAGE/FIRMWARE | PACKAGE 3 (3.1) <ALREADY INSTALLED><br>PACKAGE 5 (2.0) <TO BE INSTALLED SIMULTANEOUSLY> |
| INSTALLATION | NEW |
| LICENSE ACQUISITION | NEW |

▲ NEW PACKAGE 2
551b

[ OK ]  [ CANCEL ]

PURCHASED PACKAGE LIST — 550c

⚠ ERRORS

THREE ERRORS: THERE ARE PACKAGES THAT CANNOT BE INSTALLED.

WHEN "OK" BUTTON IS PRESSED, ONLY SELECTED PACKAGES THAT ARE ALLOWED TO BE INSTALLED WILL BE INSTALLED. — 552c

| | NAME (VERSION)/PRODUCT KEY | FUNCTION DESCRIPTION | LICENSE ARRANGEMENT | VENDOR NAME |
|---|---|---|---|---|
| ☑ | PURCHASED PACKAGE 1 <1.1> | ⊞ DESCRIPTION | TIME-LIMITED LICENSE | XXX |
| ☑ | PURCHASED PACKAGE 2 <1.2> | ⊞ DESCRIPTION | TRIAL LICENSE | XXX |
| | PURCHASED PACKAGE 3 <2.0> UNABLE TO RESOLVE PACKAGE DEPENDENCY. | ⊞ DESCRIPTION | TIME-LIMITED LICENSE | XXX |
| | PURCHASED PACKAGE 4 <3.0> LICENSE ALREADY ACQUIRED. | ⊞ DESCRIPTION | | |
| | PURCHASED PACKAGE 5 <3.0> COMBINATION CANNOT BE PURCHASED. | ⊞ DESCRIPTION | TIME-LIMITED LICENSE (NO AUTOMATIC UPDATING) | XXX |

553c, 554c, 555c

551c — [ OK ] [ CANCEL ]

| PRODUCT ID (FUNCTION PACKAGE) | PRODUCT ID OF DEPENDENCY FUNCTION PACKAGE |
|---|---|
| 21111111 | 0 |
| 21111112 | 21111111 |
| 21111113 | 0 |
| 21111114 | 21111111 |
| ⋮ | ⋮ |

FIG.39

EXTENDED FUNCTION MANAGEMENT — 560

| PACKAGE | EXTENDED FUNCTION | FIRMWARE |

| VALID/INVALID | INSTALL | UNINSTALL | ACQUIRE/UPDATE LICENSE — 562 | CANCEL LICENSE — 563 |

≪ < 1-4 / 4 > ≫  [10 CASES ▼] /PAGE   [1] /2 PAGE [MOVE]

561

| NAME (VERSION) | VENDOR NAME | LICENSE ARRANGEMENT | EXPIRATION DATE | STATUS |
|---|---|---|---|---|
| ☒ ⊟ PACKAGE 1 | XXX | TIME-LIMITED LICENSE | 2009/03/31 | VALID/ACTIVATED |
|    EXTENDED FUNCTION 1-1 (1.0) | | | | |
|    EXTENDED FUNCTION 1-2 (1.0) | | | | |
| ☒ ⊞ PACKAGE 2 | XXX | TRIAL LICENSE | 2009/03/31 | VALID/ACTIVATED |
| ☒ ⊞ PACKAGE 3 | XXX | TRIAL LICENSE | 2012/03/31 | INVALID/ACTIVATED |
| ☐ ⊞ PACKAGE 4 | XXX | TIME-LIMITED LICENSE | 2009/03/31 | INACTIVATED |

[BACK]

FIG.40

ACQUIRE/UPDATE LICENSE — 570

NUMBER OF PACKAGES : 2

▶ NEW PACKAGE 1

| PACKAGE NAME (VERSION) | PACKAGE (1.0) | 572 |
| PRODUCT KEY | XXX |
| VENDOR | |
| DESCRIPTION | DESCRIPTION OF PACKAGE 1 |
| PACKAGE MEMBER (VERSION) | EXTENDED FUNCTION 1 (1.0) |
| | EXTENDED FUNCTION 2 (2.0) |

571

| OK | CANCEL |

FIG.42

UPDATE LIST — 580

PLEASE SELECT DISTRIBUTION PACKAGE THAT YOU WISHES TO UPGRADE AND PRESS "UPGRADE" BUTTON.

| PACKAGE | FIRMWARE |

≪ < 1-4 / 4 > ≫   10 CASES ▼ /PAGE   1 /2 PAGE  MOVE

581

| | NAME (VERSION) ▼ | VENDOR NAME |
|---|---|---|
| ☒ | UPDATING PACKAGE 1 (1.0) → (2.0) | xxx |
| ☒ | UPDATING PACKAGE 2 (1.0) → (2.0) | xxx |
| ☒ | UPDATING PACKAGE 3 (1.0) → (2.0) | xxx |
| ☐ | UPDATING PACKAGE 4 (1.0) → (2.0) | xxx |

582

| UPDATE | CANCEL |

LICENSE MANAGEMENT SYSTEM, LICENSE MANAGEMENT DEVICE, AND COMPUTER-READABLE RECORDING MEDIUM HAVING LICENSE MANAGEMENT PROGRAM

TECHNICAL FIELD

The invention generally relates to a license management system, a license management device, and a computer-readable recording medium having a license management program. The invention specifically relates to a license management system, a license management device, and a computer-readable recording medium having a license management program that manages a license of an application program (i.e., computer software and associated materials) used in apparatuses.

BACKGROUND ART

In recent image forming apparatuses, mainly multifunctional peripherals or multifunctional apparatuses, users of the image forming apparatuses may be allowed to develop a new application program or install the developed new application program in the image forming apparatuses after the shipment. If a license that allows installing such a new application program in the image forming apparatuses after the shipment is provided based on a user's usage of the image forming apparatuses, it is not only convenient for the user but distributors of the application program may expand their commercial opportunities or their businesses.

For example, Japanese Patent Application Publication No. 2008-016013 discloses a license management technology capable of allowing a user to install or utilize an application program only in predetermined image forming apparatuses. In the disclosed technology, the user of the application program is charged based on the number of the predetermined image forming apparatuses in which the user installs or utilizes the application program. Further, with this technology, unauthorized use of the application program by unauthorized copying may be appropriately prevented.

However, since such an application program and its license are separately provided, an installation procedure of the application program into the image forming apparatuses is becoming complicated. That is, the user of the application program needs not only installing the application program in the image forming apparatuses he or she wishes to use but also needs another procedure for acquiring the license for the application program to operate the application program on the image forming apparatuses.

Further, some application programs distributed alone may be grouped and sold as a group of the application programs. In that case, it is extremely cumbersome for the user to carry out a license acquisition procedure for each of the application programs contained in the group.

SUMMARY OF THE INVENTION

Accordingly, it is a general object of the present invention to provide a novel and useful system, apparatus, and computer-readable recording medium having a computer program capable of appropriately supporting installation of a software application program as well as supporting a license introduction for the installation of the software application program.

In one embodiment, there is provided a license management device that includes a license identifier generator unit configured to generate a license identifier and license information corresponding to a purchased group of one or more application programs, the license identifier being associated with a group identifier of the purchased group of the application programs, the license identifier being associated with the license information corresponding to the purchased group of the application programs; a group information storage unit configured to store the group identifier of the purchased group of the application programs in association with product identifiers of the application programs of the purchased group; a license information storage unit configured to record the license identifier corresponding to the group identifier of the purchased group of the application programs in association with the product identifiers of the application programs of the purchased group; a determination unit configured to determine, on receiving the generated license identifier associated with at least one of the application programs of the purchased group, whether the received license identifier associated with the at least one of the application programs of the purchased group is recorded in the license information storage unit; and a first sending unit configured to send via a network, if the determination unit determines that the license identifier received by the determination unit is recorded in the license information storage unit, a license file corresponding to the recorded license identifier associated with the at least one of the application programs of the purchased group to provide a permission to use the at least one of the application programs of the purchased group associated with the recorded license identifier.

In another embodiment, there is provided a computer-readable recording medium containing a computer program for causing a computer to carry out a method for managing a license in a license management device. The method includes generating a license identifier and license information corresponding to a purchased group of one or more application programs, the license identifier being associated with a group identifier of the purchased group of the application programs, the license identifier being associated with the license information corresponding to the purchased group of the application programs; storing the group identifier of the purchased group of the application programs in association with product identifiers of the application programs of the purchased group; recording the license identifier corresponding to the group identifier of the purchased group of the application programs in association with the product identifiers of the application programs of the purchased group; determining, on receiving the generated license identifier associated with at least one of the application programs of the purchased group, whether the received license identifier associated with the at least one of the application programs of the purchased group is recorded in a license information storage unit; and sending via a network, if the license identifier associated with the at least one of the application programs of the purchased group received in the determination step is determined as being recorded in the license information storage unit, a license file corresponding to the recorded license identifier associated with the at least one of the application programs of the purchased group to provide a permission to use the at least one of the application programs of the purchased group associated with the recorded license identifier.

In another embodiment, there is provided a license management system that includes an information processing apparatus; and a license management device connected to the information processing apparatus via a network. In the license management system, the license management device includes a license identifier generator unit configured to generate a license identifier and license information corresponding to a purchased group of one or more application programs, the license identifier being associated with a group identifier of the purchased group of the application programs, the license identifier being associated with the license information corresponding to the purchased group of the application programs; a group information storage unit configured to store the group identifier of the purchased group of the application programs in association with product identifiers of the application programs of the purchased group; a license information storage unit configured to store the license identifier corresponding to the group identifier of the purchased group of the application programs in association with the product identifiers of the application programs of the purchased group; a determination unit configured to determine, on receiving the generated license identifier associated with at least one of the application programs of the purchased group from the information processing apparatus, whether the received license identifier associated with the at least one of the application programs of the purchased group is recorded in the license information storage unit; and a sending unit configured to send to the information processing apparatus via a network, if the determination unit determines that the license identifier associated with the at least one of the application programs of the purchased group received by the determination unit is recorded in the license information storage unit, a license file corresponding to the recorded license identifier associated with the at least one of the application programs of the purchased group to provide a permission to use the at least one of the application programs of the purchased group associated with the recorded license identifier, and the information processing apparatus includes an input unit configured to receive the license identifier input thereto; a sending unit configured to send the input license identifier received by the input unit to the license management device; and a receiving unit configured to receive the license file corresponding to the received license identifier associated with the at least one of the application programs of the purchased group from the license management device.

BRIEF DESCRIPTION OF DRAWINGS

Other objects and further features of embodiments will become apparent from the following detailed description when read in conjunction with the accompanying drawings, in which:

FIG. 9 is a diagram illustrating a configuration example of a distribution site master;

FIG. 10 is a diagram illustrating an example of a commercial product information edition screen;

FIG. 11 is a diagram illustrating a configuration example of a distribution package master;

FIG. 12 is a diagram illustrating a configuration example of a group ID master;

FIG. 13 is a diagram illustrating a configuration example of a group name master;

FIG. 14 is a diagram illustrating a configuration example of a commercial product master in the distribution server;

FIG. 20 is a diagram illustrating a configuration example of a license management table;

FIG. 23 is a diagram illustrating a display example of an extended function setting menu screen;

FIG. 24 is a diagram illustrating a display example of a product key input screen;

FIG. 25 is a diagram illustrating an example of an error screen when the product key is invalid;

FIG. 26 is a diagram illustrating a configuration example of a component management table;

FIG. 27 is a diagram illustrating a display example of an installation list screen;

FIG. 28 is a diagram illustrating a configuration example of an installation information management table;

FIG. 29 is a diagram illustrating a display example of a confirmation screen when there is a valid package dependency relationship between distribution packages;

FIG. 30 is a diagram illustrating a display example of a confirmation screen when simultaneous installation of dependency packages is allowed;

FIG. 31 is a diagram illustrating a display example of a confirmation screen when installation of dependency packages is not allowed;

FIG. 34 is a diagram illustrating a configuration example of a package dependency relationship management table;

FIG. 39 is a diagram illustrating a display example of an extended function management screen;

FIG. 40 is a diagram illustrating a display example of a license acquisition/updating screen;

FIG. 42 is a diagram illustrating a display example of a distribution package upgrading list screen;

BEST MODE FOR CARRYING OUT THE INVENTION

Figure 1:
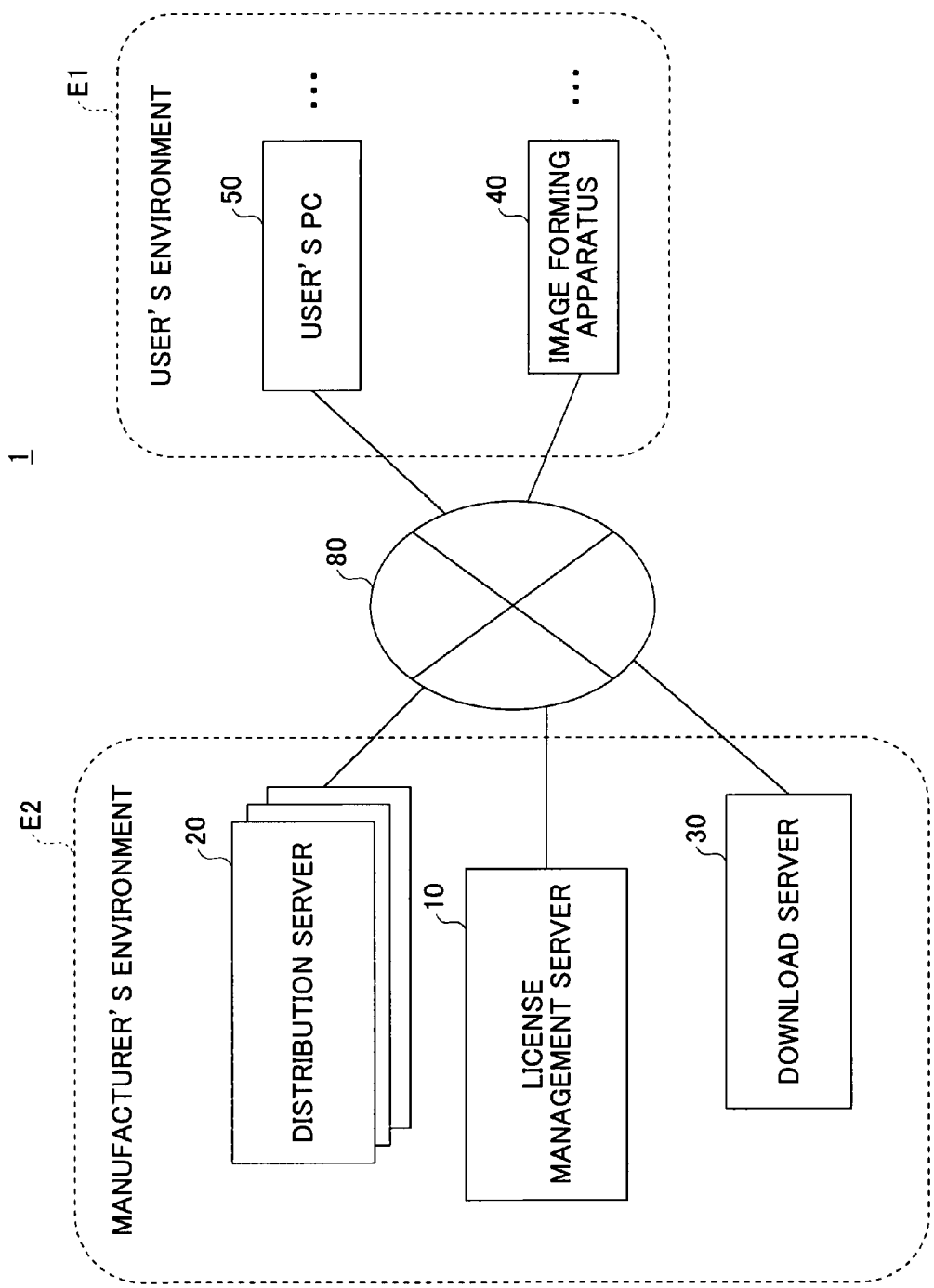
FIG. 1 is a diagram illustrating a configuration example of an apparatus management system according to a first embodiment.

In the following, preferred embodiments of the present invention are described with reference to the accompanying drawings. FIG. 1 is a diagram illustrating a configuration example of an apparatus management system according to a first embodiment. The apparatus management system illustrated in FIG. 1 includes two system environments of a user's environment E1 and a manufacturer's environment E2. The user's environment E1 is connected to the manufacturer's environment E2 via a wide area network 80 such as the Internet.

The user's environment E1 is a system environment of a user (client) of an image forming apparatus 40 in which software application programs (application programs) are installed. For example, the user's environment E1 may be a corporation or an office that is a user of the image forming apparatus 40. The user's environment E1 typically includes one or more image forming apparatuses 40 and one or more user's PCs 50. The image forming apparatus 40 is a multi-functional peripheral (MFP) capable of implementing numerous functions such as printing, copying, and facsimile transmission and reception in one apparatus. Note that the image forming apparatus 40 may be capable of carrying out only one of such functions. The image forming apparatus 40 may be capable of extending its functions at any time by adding or updating/upgrading a software component (hereinafter simply called a "component"). The user's PC 50 is utilized for purchasing a component that the user wishes to add to the image forming apparatus 40. Note that the number of user's environments E1 may be varied with the number of users per corporation or office (the number of users in a corporation or an office).

In the meantime, the manufacturer's environment E2 is a system environment of a distributor who sells components to be added to the image forming apparatus 40. For example, the manufacturer's environment E2 may be managed by the manufacturer of the image forming apparatus 40. The manufacturer's environment E2 typically includes a license management server 10, a distribution server 20, and a download server 30. The distribution server 20 is a computer that receives a component purchase application from the user's environment E1. The distribution servers 20 are placed in each of distribution areas (e.g., United States, European countries, Japan, or Asian countries excluding Japan) for selling the image forming apparatuses 40, and each of the distribution servers 20 may receive the component purchase application from the user's environment E1 in a distribution area covered by the corresponding distribution server 20.

The download server 30 is a computer that manages an entity of the component (actual software component). The user's environment E1 is configured to download the entity of the component whose purchase has been applied for from the download server 30. The license management server 10 is a computer that manages a license of the purchased component (i.e., authorization to use the component).

A component in the embodiment is distributed as a unit called a "distribution package". That is, a distribution package may be distributed alone. Alternatively, a collection of plural distribution packages (combination of distribution packages) may be distributed as a set. A distribution unit of a distribution package or a collection of one or more distribution packages (combination of distribution packages) in this embodiment is called a "group".

Figure 2:
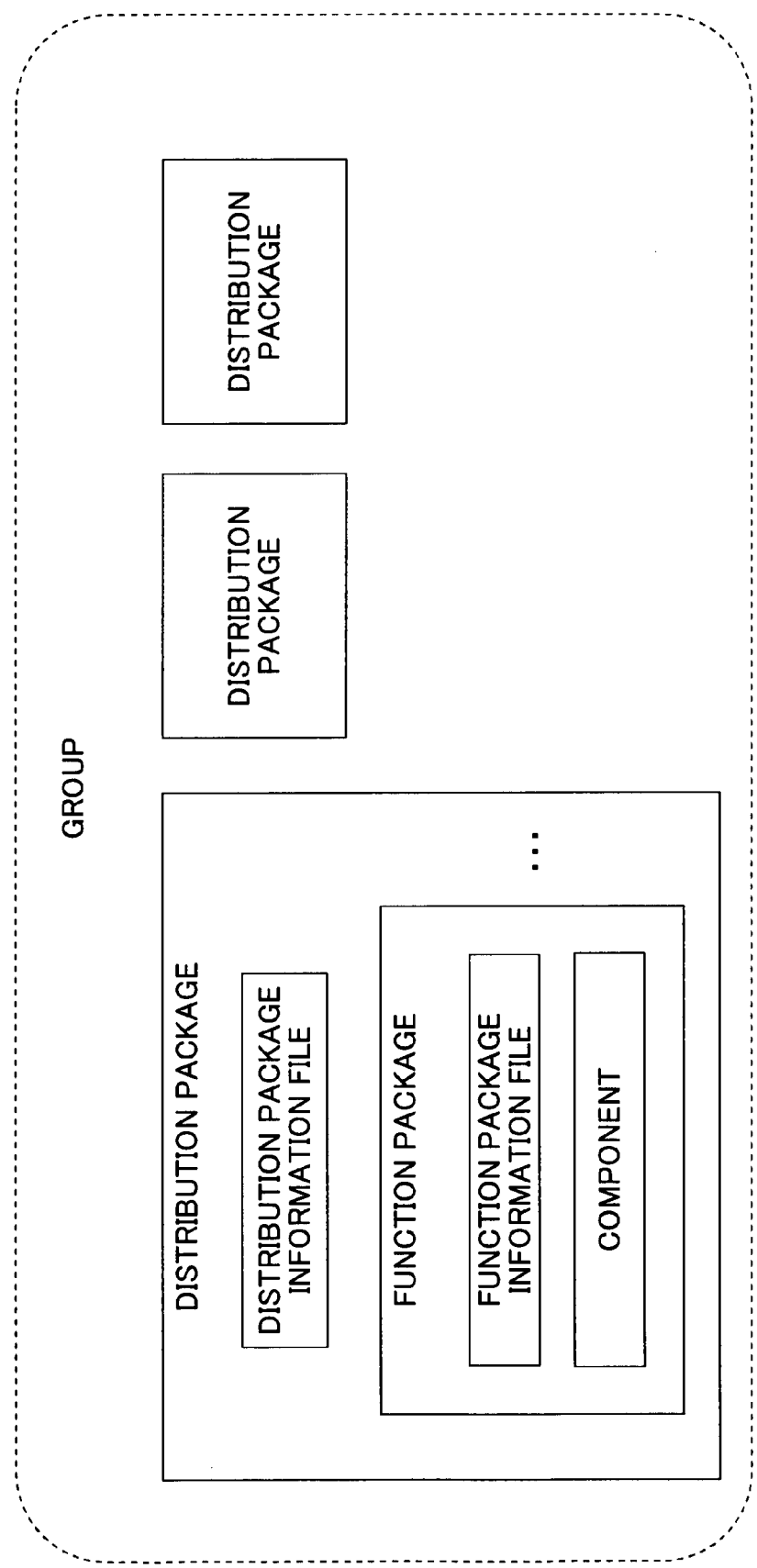
FIG. 2 is a diagram illustrating a configuration example of a distribution package.

FIG. 2 is a diagram illustrating a configuration example of the distribution package. As illustrated in FIG. 2, a distribution package is an archive file that includes a distribution package information file and one or more function packages.

The distribution package information file includes attributed information of the distribution package (i.e., distribution package information).

Figure 3:
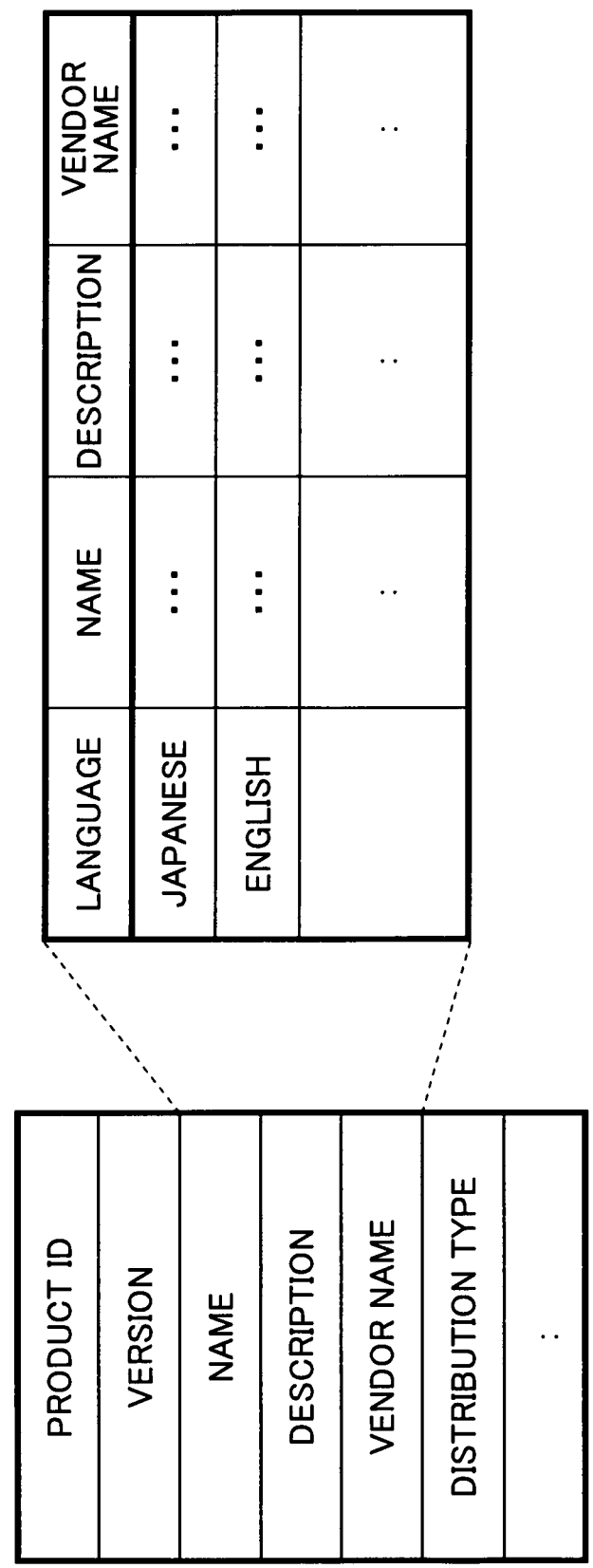
FIG. 3 is a diagram illustrating a configuration example of distribution package information.

FIG. 3 is a diagram illustrating a configuration example of the distribution package information. As illustrated in FIG. 3, the distribution package information includes a product ID, a version, a name, a description, a vendor name, and a distribution type.

The product ID is an identifier (product identifier) that is uniquely assigned to each distribution package and each function package. The version is a version number of the distribution package. The description is a description associated with the distribution package. The vendor name is a name of a vendor (i.e., developer) that has developed the distribution package. The name is a name of the distribution package (i.e., distribution package name). The distribution type involves information indicating whether the distribution package requires activation (i.e., license authentication). Note that the distribution package that does not require the activation may be used for free. Note that the name, description, and vendor name are recorded based on character codes corresponding to different languages. That is, since the distribution packages are intended to be sold worldwide, the name, description, and vendor name of the distribution package are recorded in many different languages.

Referring back to FIG. 2, the function package is a software package packaged per function. A function package is an archive file that includes a function package information file and an entity of a component (e.g., JAR (JAVA (registered trademark) archive) file).

The function package information file includes attributed information of the function package (i.e., function package information).

Figure 4:
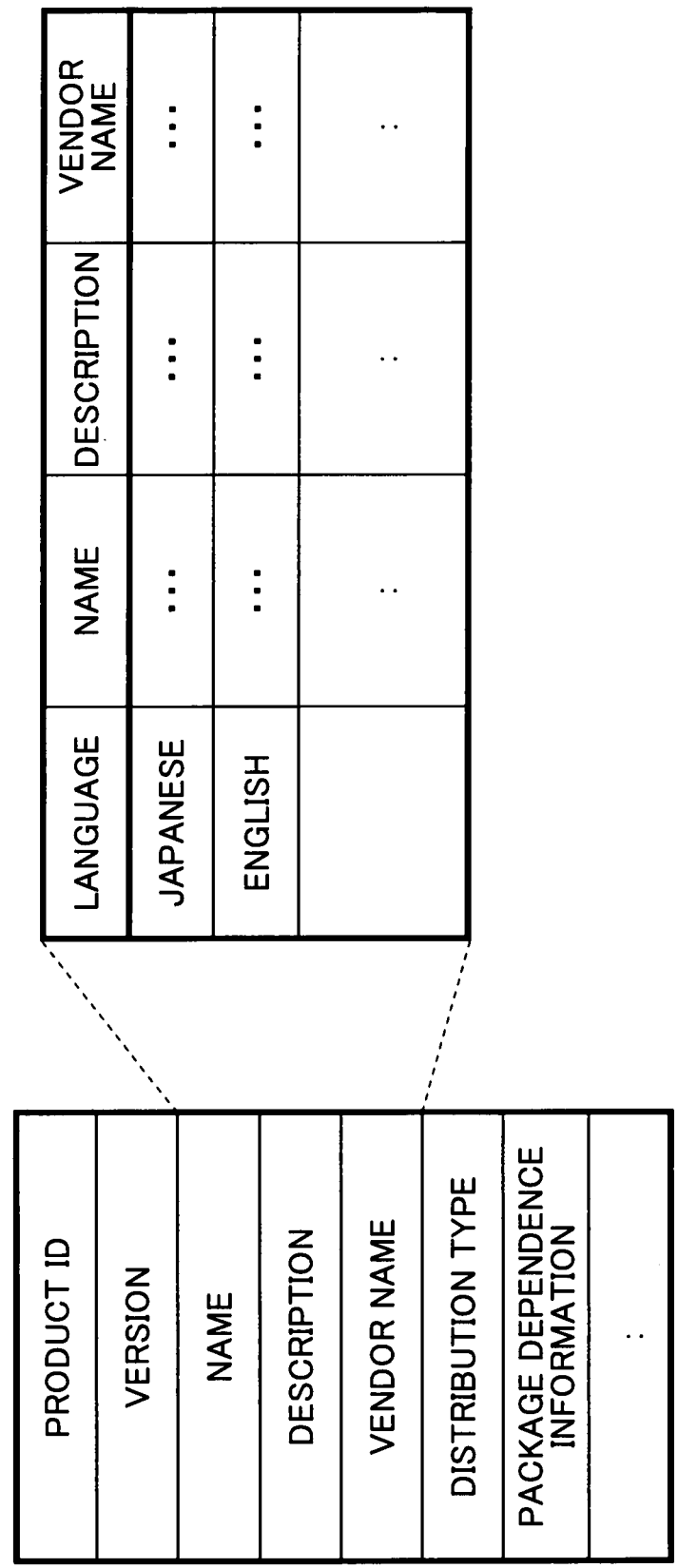
FIG. 4 is a diagram illustrating a configuration example of function package information.

FIG. 4 is a diagram illustrating a configuration example of the function package information. As illustrated in FIG. 4, the function package information includes a product ID, a version, a name, a description, a vendor name, a distribution type, and package dependency information.

The product ID is a product ID assigned to the function package. The version is a version number of the function package. The name is a name of the function package (i.e., function package name). The description is a description associated with the function package. The vendor name is a name of a vendor (i.e., developer) that has developed the function package. The distribution type involves information indicating whether the function package requires activation (i.e., license authentication) assigned to the function package. Note that the function package that does not require the activation assigned to the function package may be used for free. The package dependency information is a product ID of another function package on which the function package is dependent. That is, one function package may be dependent on plural other function packages. Note that the name, description, and vendor name of the function package information are recorded based on character codes corresponding to different languages in the same manner as the case of the distribution package information.

Note also that as illustrated in FIG. 2, a group includes three distribution packages. However, the three distribution packages attributed to the group may be separately sold.

Figure 5:
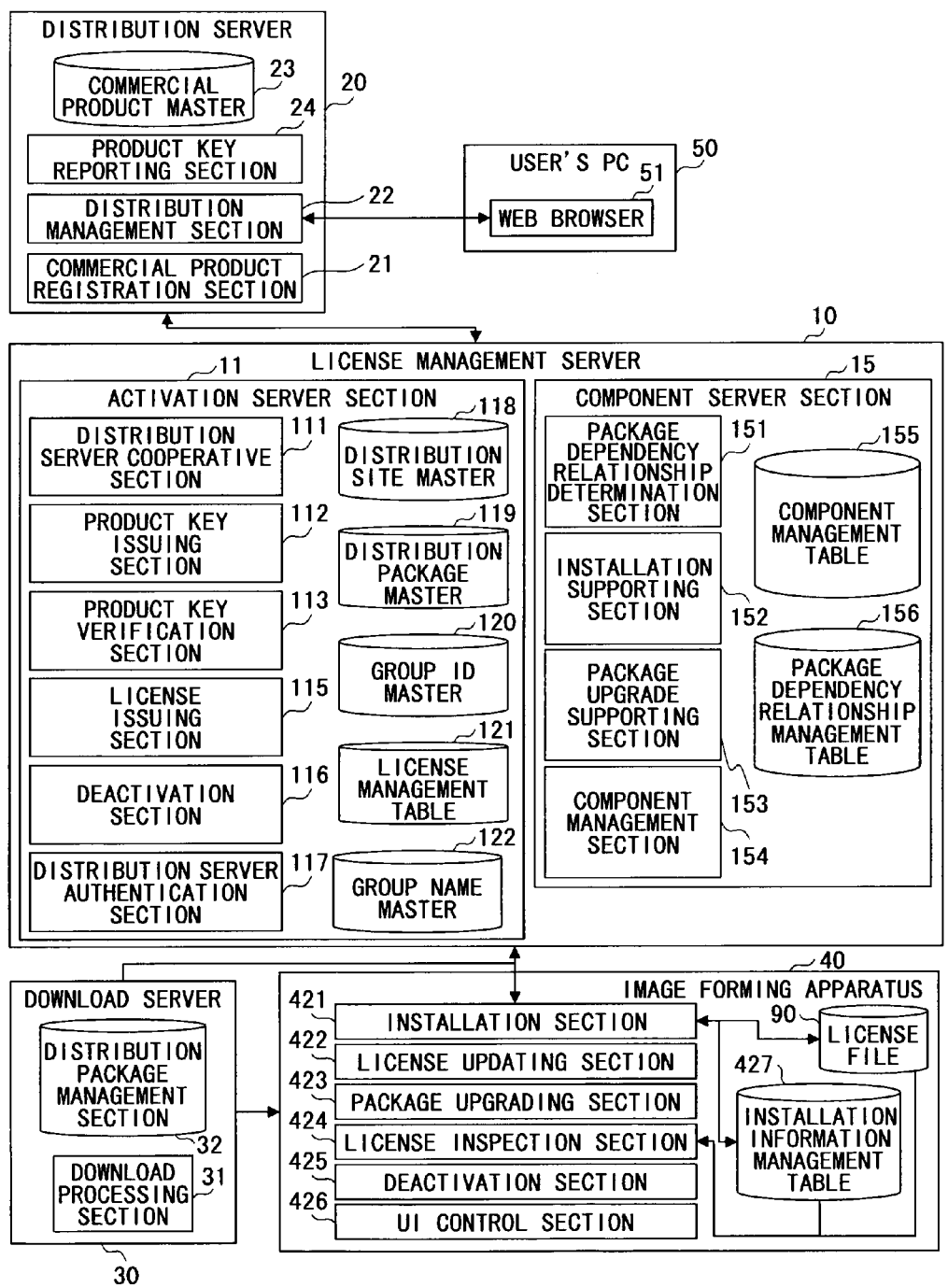
FIG. 5 is a diagram illustrating a functional configuration example of the apparatus management system according to the first embodiment.

FIG. 5 is a diagram illustrating a functional configuration example of the apparatus management system according to the first embodiment. As illustrated in FIG. 5, the distribution server 20 includes a commercial product registration section 21, a distribution management section 22, a commercial product master 23, and a product key reporting section 24.

The commercial product registration section 21 downloads a distribution package information list managed in an integrated fashion by the license management server 10, and registers configuration information and the like of commercial products input into the commercial product master 23 by an operator based on the distribution package information list. The distribution management section 22 receives a purchase application of one of the commercial products registered in the commercial product master 23 from the user's PC 50. The distribution management section 22 requests the license management server 10 to issue a product key associated with the received purchase application. The product key reporting section 24 sends, on receiving the issued product key from the license management server 10, the issued product key to the user's PC 50 as a response to the received purchase application.

The commercial product in this embodiment is configured based on a distribution package with license content or a group of the distribution packages with license content. Thus, if one distribution package is identical to the other distribution package but they include different license contents (i.e., license arrangement, license validation period, the number of license volumes, etc.), the two identical distribution packages having different license contents may be treated as two different commercial products. Information associated with license content is hereinafter called "license information".

Further, the product key is an identifier that is uniquely issued for or assigned to each commercial product every time the commercial product is purchased. That is, the product key is used as identifier information (i.e., license identifier) that identifies a license associated with the distribution package (i.e., authorization to use the distribution package) contained in the commercial product, or used as information to certify a validated purchaser of the commercial product. Note that in this embodiment, the product ID and the product key are separate entities. That is, the product ID is used for identifying same or different distribution packages whereas the product key is used for identifying a purchasing operation of the commercial product. Thus, a different product key is issued every time one of the distribution packages that have identical product IDs is purchased.

The image forming apparatus 40 includes an installation section 421, a license updating section 422, a package upgrading section 423, a license examination section 424, a deactivation section 425 (hereinafter called an "apparatus deactivation section 425"), a UI control section 426, and an installation information management table 427.

The installation section 421 controls a sequence of processes for installing the distribution package corresponding to the product key when receiving the product key. For example, the installation section 421 requests the license management server 10 to verify whether the function package contained in the distribution package subject to installation has a valid package dependency relationship with other function packages already installed in the image forming apparatus 40, downloads the distribution package subject to installation from the download server 30, or the installation section 421 acquires a license file 90 associated with the distribution package subject to installation from the license management server 10.

The license file 90 is a file including data that certifies the license associated with the distribution package (i.e., data for providing permission to use the distribution package). That is, the distribution package (component) in the embodiment may not be made operable in the image forming apparatus 40 by acquiring its entity alone. The distribution package may be operable by introducing the license file 90 associated with the distribution package in combination with its acquired entity.

The license updating section 422 controls an updating process for updating (i.e., extending) the license validation period (i.e., a license updating process) of the distribution package installed in the image forming apparatus 40. The package upgrading section 423 controls an upgrading process for upgrading the distribution package (i.e., a distribution package upgrading process) installed in the image forming apparatus 40. The license examination section 424 determines whether to authorize the operation of the distribution package when the distribution package is actually used. The apparatus deactivation section 425 carries out deactivation of the distribution package installed in the image forming apparatus 40. Specifically, the apparatus deactivation section 425 deletes the distribution package subject to deactivation and its associated license file 90. The UI control section 426 controls display of an operations panel of the image forming apparatus 40. The installation information management table 427 is a table used for managing information associated with the distribution package installed in the image forming apparatus 40, and stored in a storage of the image forming apparatus 40.

The license management server 10 includes an activation server section 11 and a component server section 15. The activation server section 11 includes a distribution server cooperative section 111, a product key issuing section 112, a product key verification section 113, a license issuing section 115, a server deactivation section 116, a distribution server authentication section 117, a distribution site master 118, a distribution package master 119, a group ID master 120, a license management table 121, and a group name master 122.

The distribution server cooperative section 111 carries out a process requested by the distribution server 20 or a process in response to information reported by the distribution server 20. The product key issuing section 112 generates a product key in response to a request received from the distribution management section 22. The product key issuing section 112 registers the generated product key and its associated license information identified by the generated product key in the license management table 121. The product key verification section 113 verifies the validity of the product key, which is input into the image forming apparatus 40 while downloading the distribution package or the like, based on the license management table 121 or the like.

The license issuing section 115 issues a license associated with the distribution package. On the issuance of the license associated with the distribution package, the license management table 121 is updated, and the license file 90 is then generated. The server deactivation section 116 releases the license subject to deactivation in response to a deactivation request received from the apparatus deactivation section 425 of the image forming apparatus 40. The distribution server authentication section 117 authenticates the distribution server 20 based on the distribution site master 118. The distribution package master 119 includes a registered distribution package information list. The group ID master 120 registers information on groups and their associated distribution packages (i.e., group configuration information). The group name master 122 registers corresponding names of the groups (i.e., group names). Note that the distribution site master 118, the distribution package master 119, the group ID master 120, the license management table 121, and the group name master 122 are stored in a storage of the license management server 10.

The component server section 15 includes a package dependency relationship determination section 151, an installation supporting section 152, a package upgrade supporting section 153, a component management section 154, a component management table 155, and a package dependency relationship management table 156. The package dependency relationship determination section 151 determines whether other function packages, on which the function package contained in the distribution package subject to installation or upgrading, have already been installed in the image forming apparatus 40. More specifically, the package dependency relationship determination section 151 determines, in response to a request from the installation section 421 of the image forming apparatus 40, whether to validate the package dependency relationship of the function package contained in the distribution package subject to installation with other function packages already installed in the image forming apparatus 40, by referring to the component management table 155 and the package dependency relationship management table 156. The installation supporting section 152 supports the installation of the distribution package in the image forming apparatus 40. For example, the installation supporting section 152 that generates HTML data (installation list screen data) for displaying a screen for selecting the distribution package subject to installation is selected, and supplies the installation list screen data to the installation section 421 of the image forming apparatus 40. The package upgrade supporting section 153 supports upgrading of the distribution package (upgrading the version of the distribution package) in the image forming apparatus 40. For example, the package upgrade supporting section 153 generates HTML data (upgrade list screen data) for displaying a screen for selecting the distribution package subject to upgrading, and supplies the upgrade list screen data to the package upgrading section 423 of the image forming apparatus 40. The component management section 154 periodically acquires the distribution package stored in a distribution package management section 32 of the download server 30, and registers the configuration information on the distribution package or function package dependency information contained in the distribution package in the component management table 155 or the package dependency relationship management table 156. Note that the component management table 155 or the package dependency relationship management table 156 are stored in the storage of the license management server 10.

Since each function package has its own package dependency destination information (destination information (i.e., other packages) on which the function package is dependent), the license management server 10 may easily register complicated package dependency relationship information in the package dependency relationship management table 156 based on the package dependency destination information. For example, when the function package (or the distribution package containing the function package) manufactured by a manufacturer of the function package is arranged in the download server 30, the license management server 10 acquires package dependency information of the arranged function package from the download server 30 and automatically registers the package dependency relationship between the arranged function package and other function packages in the package dependency relationship management table 156, based on the acquired package dependency information. Accordingly, even if an administrator of a distribution site that distributes the function package and the manufacturer of the same function package are different, the administrator of the distribution site does not need to have information on the package dependency relationship between the distributed function package and other function packages. This facilitates a third vendor or the like being able to manufacture the function packages, which increases sales opportunities of the function packages.

Figure 6:
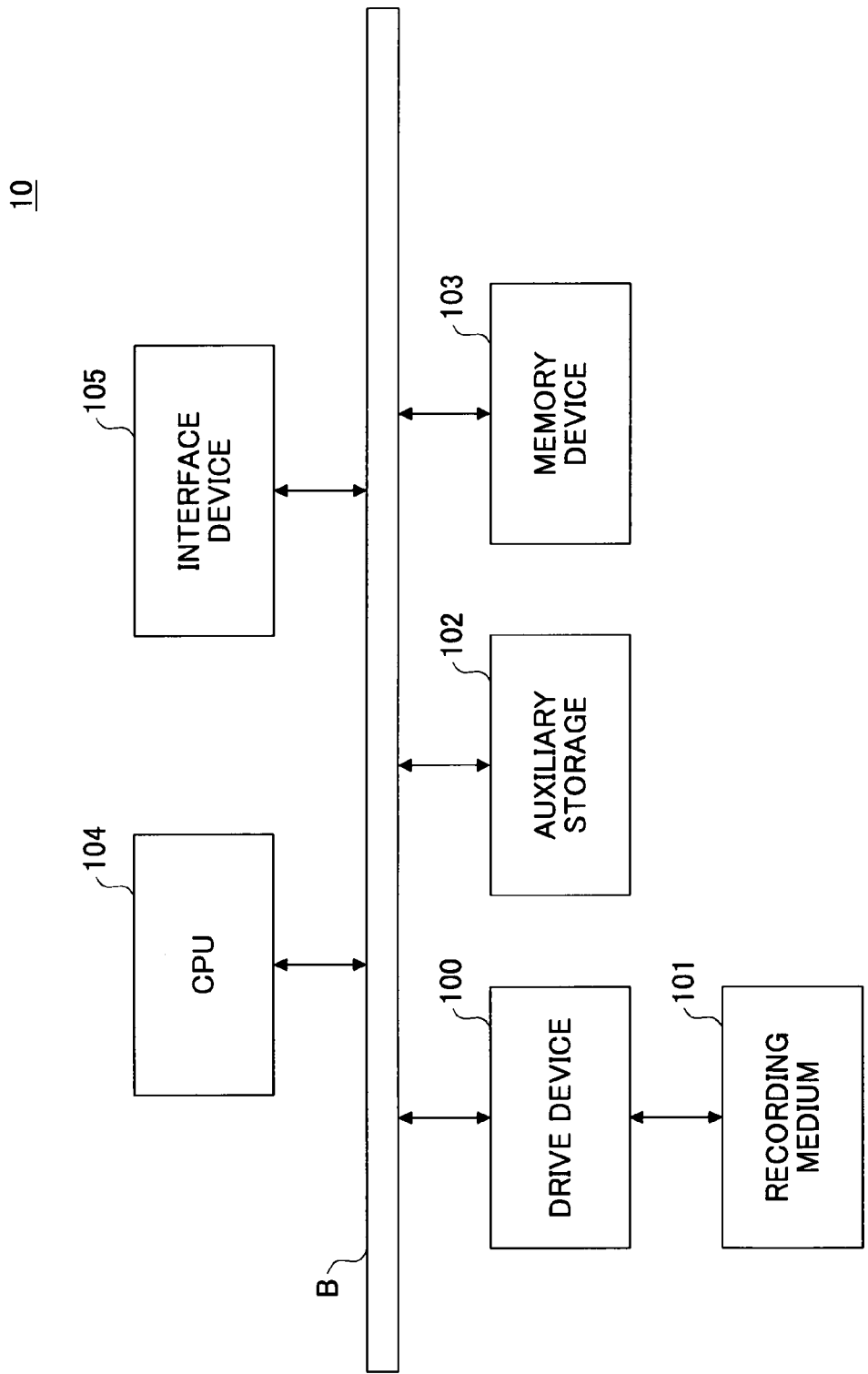
FIG. 6 is a diagram illustrating a hardware configuration example of a license management server according to the first embodiment.

FIG. 6 is a diagram illustrating a hardware configuration example of the license management server 10 according to the first embodiment. As illustrated in FIG. 6, the license management server 10 includes a drive device 100, an auxiliary storage 102, a memory device 103, a CPU 104, and an interface device 105 that are connected via a bus B.

A computer program that implements various processes in the license management server 10 is provided by a recording medium 101 such as a CD-ROM. When the recording medium 101 storing the computer program is placed in the drive device 100, the computer program is installed in the auxiliary storage 102 from the recording medium 101 via the drive device 100. Note that the computer program may not be installed from the recording medium 101, and may be installed by downloading the computer program from other computers via the network. The auxiliary storage 102 stores necessary files, data, and the like while storing the installed computer program.

On receiving an activating computer program instruction, the memory device 103 reads the computer program from the auxiliary storage 102 and loads the read computer program. The CPU 104 implements functions of the license management server 10 (conducted by various sections of the license management server 10 illustrated in FIG. 5) based on the computer program loaded in the memory device 103. The interface device 105 is used as an interface for connecting the license management server 10 to the network.

Note that the license management server 10 may include a display device such as a liquid crystal display or a CRT display and input devices such as a keyboard and a mouse.

The distribution server 20, the download server 30, and the user's PC 50 may also include a hardware configuration similar to the hardware configuration illustrated in FIG. 6.

Figure 7:
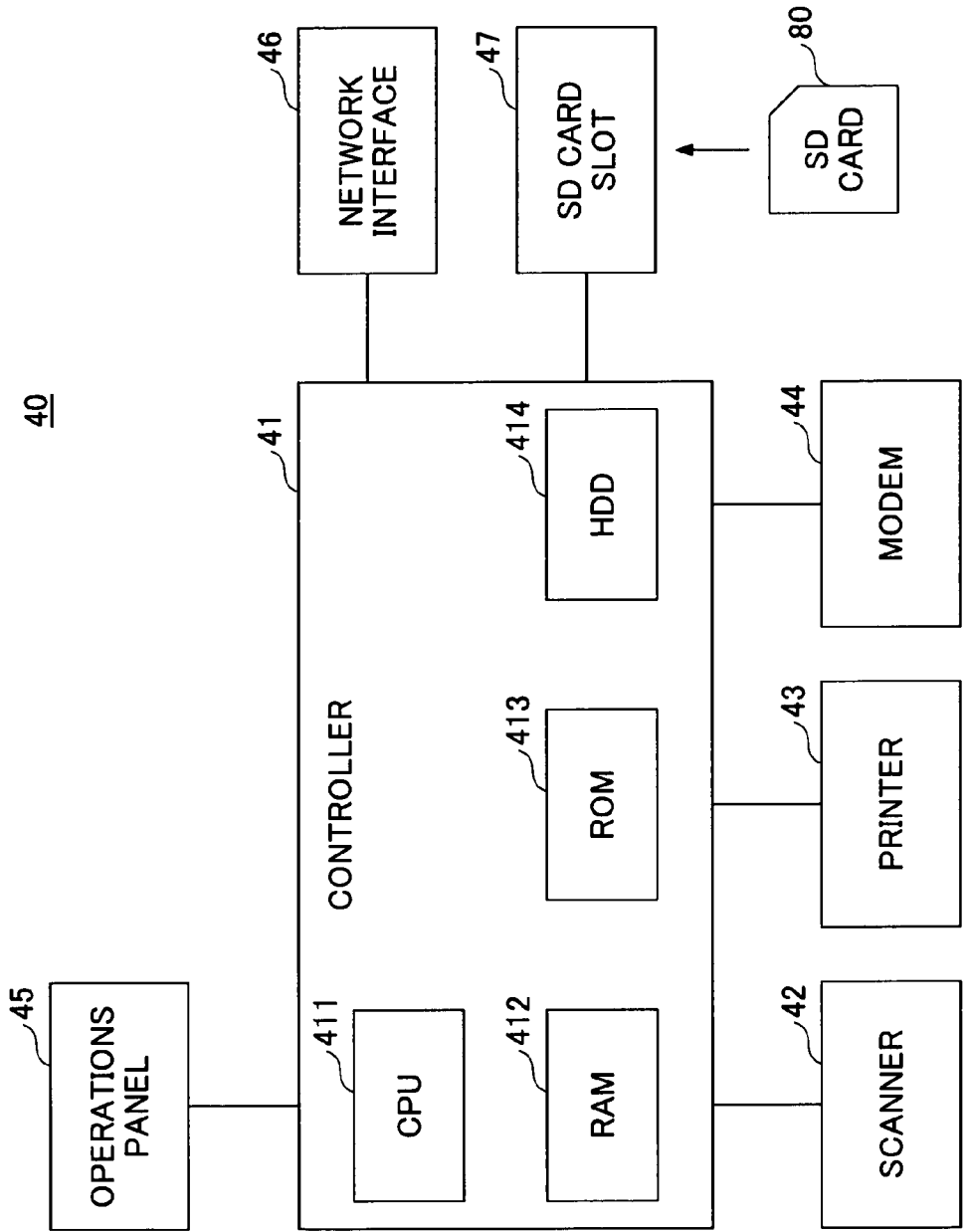
FIG. 7 is a diagram illustrating a hardware configuration example of an image forming apparatus according to the first embodiment.

FIG. 7 is a diagram illustrating a hardware configuration example of the image forming apparatus 40 according to the first embodiment. As illustrated in FIG. 7, the image forming apparatus 40 includes hardware components such as a controller 41, a scanner 42, a printer 43, a modem 44, an operations panel 45, a network interface 46, and an SD card slot 47.

As illustrated in FIG. 7, the controller 41 includes a CPU 411, a RAM 412, a ROM 413, and an HDD 414. The ROM 413 includes various computer programs and data or the like used by the various computer programs. The RAM 415 is used as a working space such as a storage region for loading the computer programs or a working region for the loaded computer programs. The CPU 411 implements various functions of the image forming apparatus 40 (conducted by various sections of the image forming apparatus 40 in FIG. 5) by processing the computer programs loaded in the RAM 412. The HDD 414 records the computer programs or various data or the like used by the various computer programs.

The scanner 42 is a hardware component for reading image data of a document. The printer 43 is a hardware component for printing the image data on printing paper. The modem 44 is a hardware component for connecting the image forming apparatus 40 to a telephone circuit, and used for sending and receiving the image data via facsimile communications. The operations panel 45 is a hardware component including an input unit such as buttons via which information input by the user is received and a display unit such as a liquid crystal panel. The network interface 46 is a hardware component for connecting the image forming apparatus 40 to the network (regardless of wired or wireless connection). The SD card slot 47 is used for retrieving the computer programs recorded on an SD card 80. That is, in the image forming apparatus 40, the computer programs recorded on the SD card 80 may also be loaded for execution in the RAM 412 in addition to the computer programs stored in the ROM 413.

Figure 8:
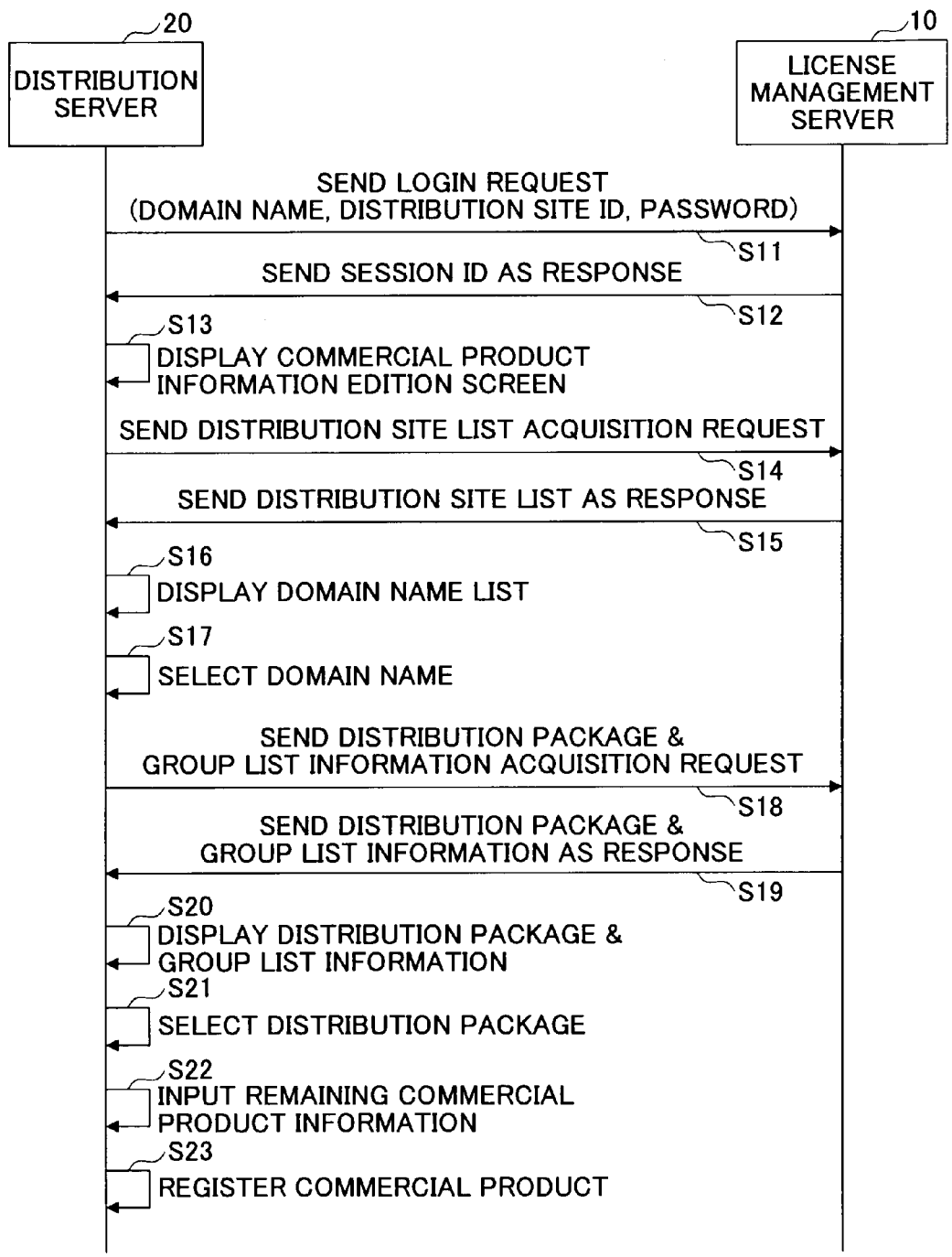
FIG. 8 is a sequence diagram illustrating a commercial product information registration process carried out in a distribution server.

Various processes carried out in the apparatus management system 1 according to the first embodiment are described below. FIG. 8 is a sequence diagram illustrating a commercial product information registration process carried out by the distribution server 20. Configurations of commercial products subject to distribution are determined based on distribution areas. The processes illustrated in FIG. 8 are executed when the configuration of the commercial product in a certain distribution area is determined.

For example, when the administrator of the distribution site inputs a registration start instruction for registering commercial product information in the distribution server 20, the commercial product registration section 21 of the distribution server 20 specifies a domain name, a distribution site ID, and a password stored in the storage of the distribution server 20 and sends an authentication request to the activation server section 11 of the license management server 10 (step S11).

On receiving the authentication request, the distribution server authentication section 117 performs authentication for the distribution server 20 based on information specified in the authentication request and corresponding information contained in the distribution site master 118.

FIG. 9 is a diagram illustrating a configuration example of the distribution site master 118. As illustrated in FIG. 9, the distribution site master 118 includes a domain name, a distribution site ID, and a password registered for each distribution area.

The distribution server authentication section 117 matches a domain name, a distribution site ID, and a password contained in the authentication request with the domain name, the distribution site ID, and the password contained in the distribution site master 118, and authenticates, when they are matched, for the distribution server 20. When the authentication for the distribution server 20 is successful, the authentication section 117 establishes a session and sends a session ID as a response to the distribution management section 22 (step S12). A communication between the distribution management section 22 and the activation server section 11 is hereafter carried out based on the session ID. When the authentication for the distribution server 20 is successful (i.e., when the session is sent as a response), the commercial product registration section 21 displays a commercial product information edition screen on a display device of the distribution server 20 (step S13).

FIG. 10 is a diagram illustrating an example of the commercial product information edition screen. A domain name, a product ID, a product unit ID classification, a license arrangement, a license validation period, the number of volumes, a class code, and a commercial product name may be input via a commercial product information edition screen 210.

For example, when a "select" button 2112 is clicked on the commercial product information edition screen 210, the commercial product registration section 21 sends a distribution site list acquisition request to the distribution server cooperative section 111 of the activation server section 11 (step S14). The distribution server cooperative section 111 acquires, on receiving the distribution site list acquisition request from the commercial product registration section 21, a distribution site list and a domain name list from the distribution site master 118 and sends the acquired distribution site list and domain name list to the commercial product registration section 21 as a response (step S15).

The commercial product registration section 21 displays the received domain name list on the display device of the distribution server 20 (step S16). When one of the domain names of the domain name list is selected, the commercial product registration section 21 displays the selected domain name in a textbox 2111 of the commercial product information edition screen 210 (step S17).

Subsequently, when a "select" button 2114 is clicked by the administrator, the commercial product registration section 21 sends a distribution package and group list information acquisition request to the distribution server cooperative section 111 of the activation server section 11 (step S18). The distribution server cooperative section 111 acquires, on receiving the distribution package and group list information acquisition request from the commercial product registration section 21, a distribution package list from the distribution package master 119 and a group list from the group ID master 120 and the group name master 122.

FIG. 11 is a diagram illustrating a configuration example of the distribution package master 119. As illustrated in FIG. 11, the distribution site master 119 includes a product ID, a distribution package name, and a vendor name registered for each distribution package. The distribution package name and the vendor name are registered for multiple languages (e.g., Japanese or English). The above information is contained for each distribution package in the distribution site list and domain name list sent to the commercial product registration section 21 in step S15. Note that the languages of the distribution package name and the vendor name contained in the response may be those compatible with a language environment of the distribution server 20. The language environment of the distribution server 20 may be specified by the commercial product registration section 21 when sending the distribution site list acquisition request in step S14. Alternatively, the language environment of the distribution server 20 may be determined based on functions contained in communication protocols. For example, in HTTP communications, a parameter associated with a language environment of a Web browser is reported to a Web server. If such a communication protocol is utilized, the language environment of the distribution server 20 may be determined based on the parameter. Note that information registered in the distribution package master 119 may be carried out in advance by the administrator of the license management server 10.

FIG. 12 is a diagram illustrating a configuration example of the group ID master. As illustrated in FIG. 12, a group ID master 120 includes group configuration information on a group ID and its associated delete flag registered for each combination of a group ID and a distribution site ID associated with the group ID. The group configuration information is registered for each combination of the group ID and the associated distribution site ID, because the group ID is unique to each distribution site. The group configuration information includes the product ID of the distribution package attributed to a group registered for the group ID of the corresponding group. The delete flag is data indicating whether to delete the group ID registered in the group ID master 120 (i.e., deleting a group), and the delete flag includes an "ON" or "OFF" value. The "ON" value indicates that the group ID (i.e., the group) may be deleted or is allowed to be deleted. The "OFF" value indicates that the group ID (i.e., the group) is unable to be deleted or is not allowed to be deleted (prohibited). When a purchased commercial product is associated with a group, a group ID (or a group) associated with the purchased commercial product is unable to be deleted. Thus, a default of the delete flag is an "ON" value. That is, when the group is registered in the group master 120, a commercial product associated with the group has not been purchased.

Note that FIG. 12 illustrates an example where identical plural group IDs (e.g., group ID 001) are registered in the group ID master 120. In the group ID master 120, one record includes a product ID of a distribution package. That is, in the example illustrated in FIG. 12, there are three registered distribution packages attributed to the group having the group ID "001".

FIG. 13 is a diagram illustrating a configuration example of the group name master. As illustrated in FIG. 13, a group name master 122 includes a name of a group (i.e., group name) in each language registered for each group ID. That is, the group name master 122 includes a group name in each language registered for the corresponding group.

The distribution server cooperative section 111 selects different group IDs associated with the distribution site IDs received in the authentication request step (step S11), acquires the group names associated with the selected group ID from the group name master 122, and generates a list of the groups associated with the selected group IDs (i.e., a group list). Note that the group names contained in the generated group list may be limited to those having the languages compatible with the language environment of the distribution server 20.

Subsequently, the distribution server cooperative section 111 sends the acquired distribution package and group list information to the distribution server 21 as a response (step S19). The distribution management section 21 displays a distribution package and group list screen (e.g., a screen including lists of distribution package names and group names) on the display device of the distribution server 20 based on the received distribution package and group list information (step S20). When one of the distribution packages is selected on a distribution package and group list screen, the commercial product registration section 21 displays the product ID and the distribution package name of the selected distribution package in textboxes 2113 and 2115, respectively. The commercial product registration section 21 also displays the term "product ID" in a textbox 2116 (step S21). Note that a character string displayed in the textbox 2116 indicates a product unit ID classification of the product ID displayed in the textbox 2113. The product unit ID classification is used to identify the product ID of the distribution package and the group ID of the group. That is, the commercial product information edition screen 210 is also used for editing the commercial product information associated with the group. In this case, the group ID is displayed in the textbox 2113 and the group name is displayed in the textbox 2115.

Subsequently, remaining commercial product information is input via the commercial product information edition screen 210 by the administrator (step S22). Specifically, the remaining commercial product information includes the license arrangement, the license validation period, the number of volumes, a class code, and the commercial product name that are input via the commercial product information edition screen 210 by the administrator. The license arrangement indicates a type of a license associated with the commercial product, and may include an outright license, a time-limited license, and a trial license. With the outright license, the user is allowed to use the product permanently after the purchase of the commercial product. With the time-limited license, the user is allowed to use the commercial product in a predetermined period (validation period). The trial license allows the user to use the commercial product on a trial basis. The license arrangement is input by selecting one of the items from a list box 2117. The license validate period is an attribute effective for the time-limited license and the trial license and indicates a period that the license is effective (valid). The license validation period is input in a textbox 2118. The number of volumes indicates the number of license volumes. A volume license is given to the user who has purchased the commercial product having the number of volumes of two or more, so that the user is allowed to simultaneously use the identical distribution packages in the number of computers within the given number of license volumes. The number of volumes is input in a textbox 2119.

A class code is an identifier that uniquely identifies each of the commercial products. The class code is input in a textbox 2120. Note that plural commercial products having different license contents (license information) may be defined with a distribution package or a group of the distribution packages. Accordingly, there is a one-to-many relationship between the product ID of the distribution package (one distribution package or a group of the distribution packages may be included) or the group ID and the class code (i.e., one product ID or group ID may be associated with plural class codes). The commercial product name is a name given to the commercial product. The commercial product name is input in a textbox 2122. Alternatively, when the button 2121 is clicked, the commercial product registration section 21 automatically generates a corresponding product name based on the distribution package name or group name, the license arrangement, and the license validation period, and displays the generated product name in the textbox 2122. Note that in the commercial product information edition screen 210, the commercial product name may be input in Japanese in the textbox 2123. Note that the commercial product name in other languages may be registered via a different screen.

When the commercial product information is input and an "OK" bottom is clicked on the commercial product information edition screen 210, the commercial product registration section 21 registers the input commercial product information in the commercial product master 23 (step S23).

FIG. 14 is a diagram illustrating a configuration example of the commercial product master in the distribution server 20. As illustrated in FIG. 14, the commercial product master 23 is a table used for managing the class code, the product unit ID (product ID or group ID), the license arrangement, the license validation period, the number of volumes, the commercial product name, and the like for each commercial product.

When the product information of a product is registered in the commercial product master 23 of the distribution server 20, the product may be distributed or sold in a corresponding distribution area to which the distribution server 20 is attributed.

Figure 15:
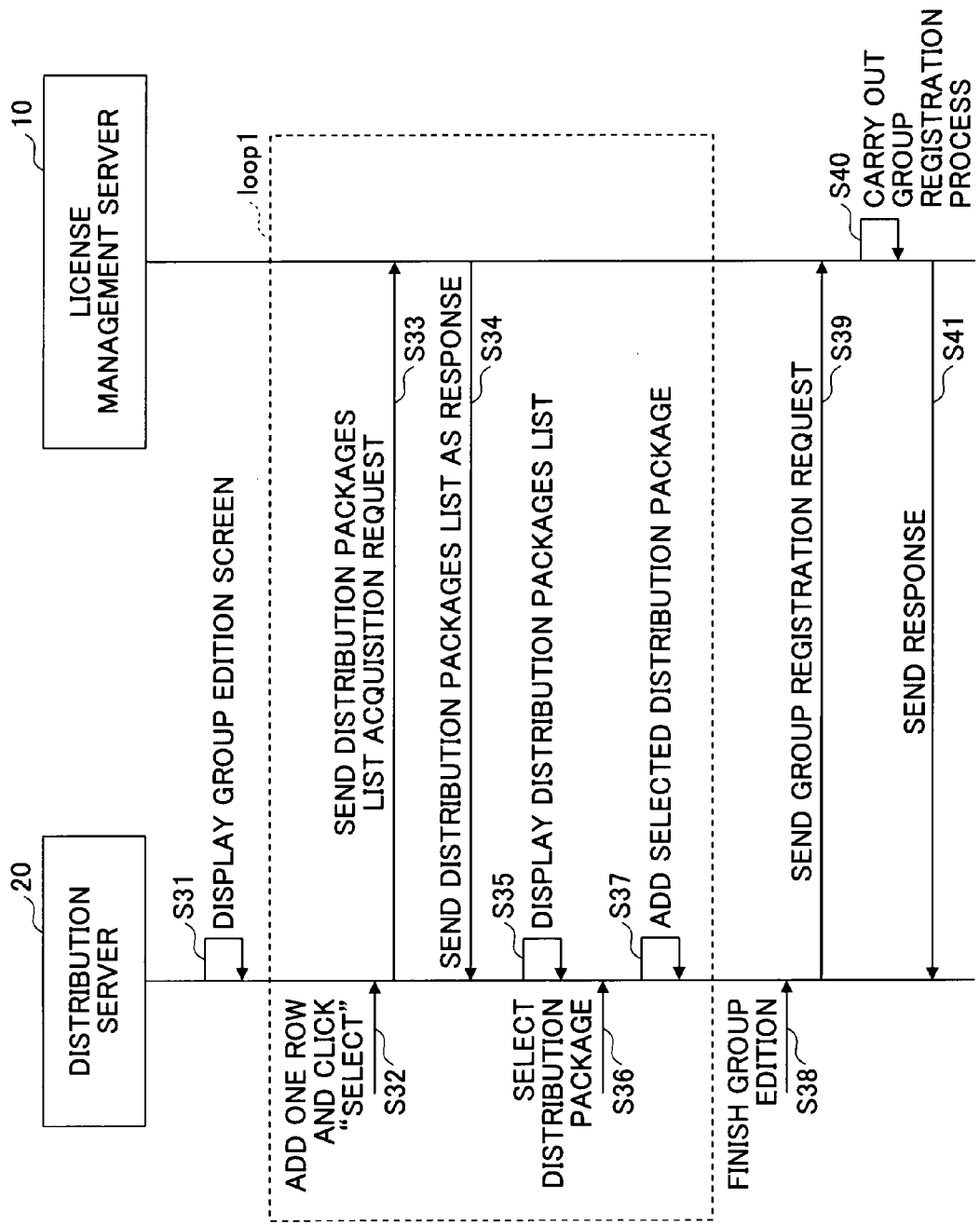
FIG. 15 is a sequence diagram illustrating a group creation process.

Subsequently, a group creation process (i.e., a process of registering a group in a group ID master 120 and a group name master 122) is described below. FIG. 15 is a sequence diagram illustrating the group creation process. The group creation process indicates a process of determining (selecting) distribution packages that constitute a new group.

For example, when the administrator of the distribution site inputs a group creating start instruction in the distribution server 20, the commercial product registration section 21 of the distribution server 20 displays a group edition screen on the display device of the distribution server 20 (step S31).

Figure 16:
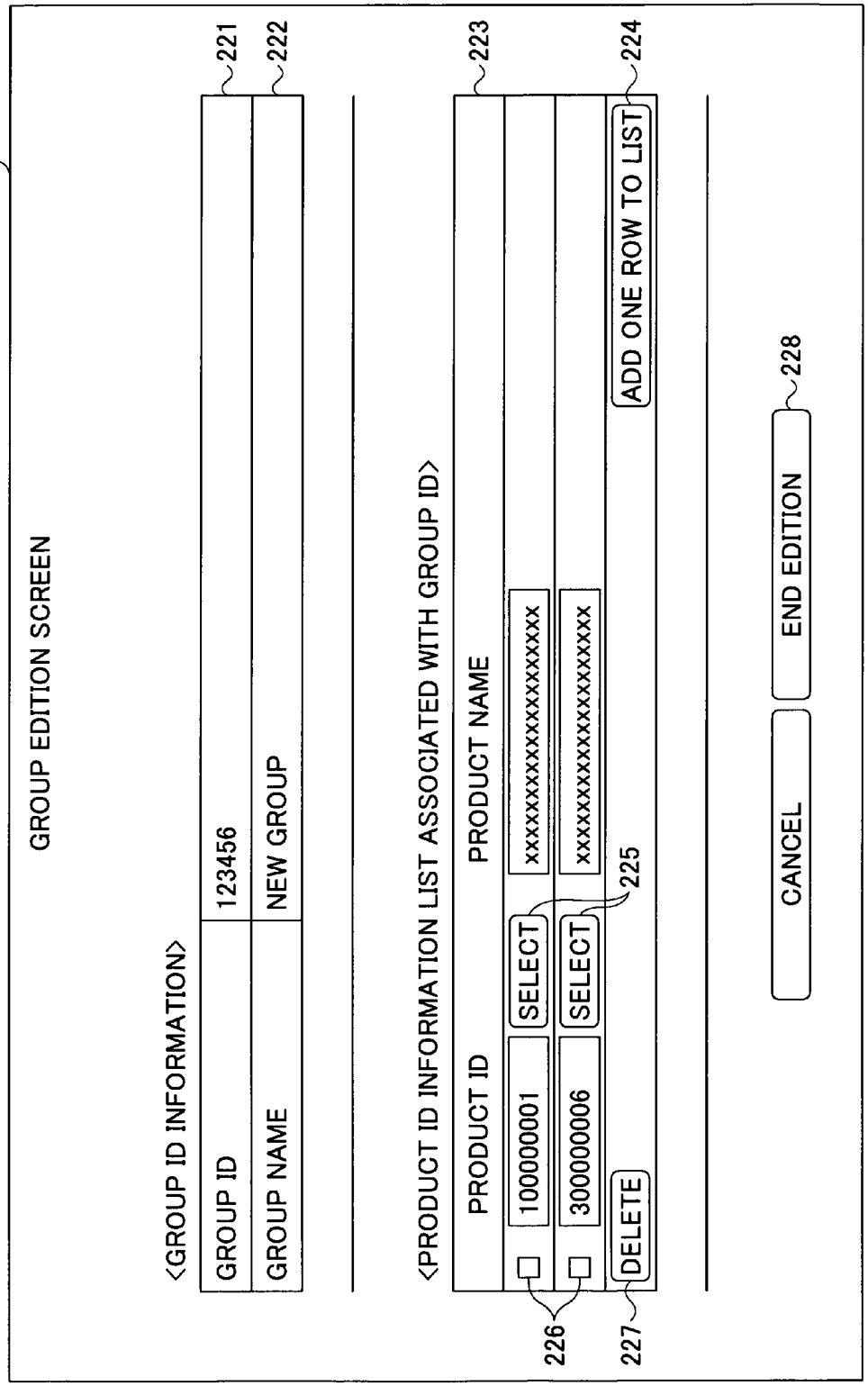
FIG. 16 is a diagram illustrating an example of a group edition screen.

FIG. 16 is a diagram illustrating an example of the group edition screen. As illustrated in FIG. 16, a group ID and a group name of a new group may be input via a group edition screen 220. The group ID for the new group is input in a region 221. The group name for the new group is input in a region 222.

Further, desired distribution packages for creating the new group may be specified (i.e., specifying combination (s) of distribution packages constituting the new group) in a table 223 of the group edition screen 220. Specifically, when an "add one row to list" button 224 is clicked in the table 223, a new row is added to the table 223. Note that in FIG. 16, there are already two rows added in the table 223; however, a default of the table 223 includes zero rows (none). Subsequently, when "select" buttons 225 of the added rows are clicked (step S32), the commercial product registration section 21 sends a distribution package list information acquisition request to the distribution server cooperative section 111 of the activation server section 11 (step S33). The distribution server cooperative section 111 acquires, on receiving the distribution package list information acquisition request from the commercial product registration section 21, distribution package list information from the distribution package master 119. The distribution server cooperative section 111 sends the acquired distribution package list information to the commercial product registration section 21 as a response (step S34).

The commercial product registration section 21 displays a distribution package list screen (e.g., a screen including lists of product IDs and distribution package names) on the display device of the distribution server 20 based on the received distribution package list information (step S35). When one of the distribution packages is selected on the distribution package list screen (step S36), the commercial product registration section 21 displays the product ID and the distribution package name of the selected distribution package in a corresponding row (where the "select" button 225 is clicked) of the table 223. In this manner, the distribution package is added as a member (element) of the new group on the display screen. Note that steps (S32 through S37) of a loop 1 are repeatedly carried out based on the number of distribution packages to be added to the new group. In addition, when one of check boxes 226 of the rows added to the table 223 is marked (ticked) and a "delete" button 227 is subsequently clicked, the distribution package displayed in the row having the marked (ticked) check box is deleted from the new group on the display screen.

Subsequently, when the addition of the distribution package (s) for creating the new group in the table 223 is finished and an "edition end" button 223 is then clicked (step S38), the commercial product registration section 21 sends a group registration request to the distribution server cooperative section 111 of the activation server section 11 (step S39). The group registration request contains parameters of the group configuration information input via the group edition screen 220 (information including a group IDs and product IDs of the distribution packages attributed to the group), the domain name, the distribution site ID, and the password that are stored in the storage of the distribution server 20. The distribution server cooperative section 111 carries out a group registration process based on the received group registration request (step S40). Specifically, the group configuration information of the new group is registered in the group ID master 120, and the group name of the new group is registered in the group name master 122. After carrying out the group registration process, the distribution server cooperative section 111 sends a response indicating whether the group registration process is successfully finished to the commercial product registration section 21 (Step S41).

Figure 17:
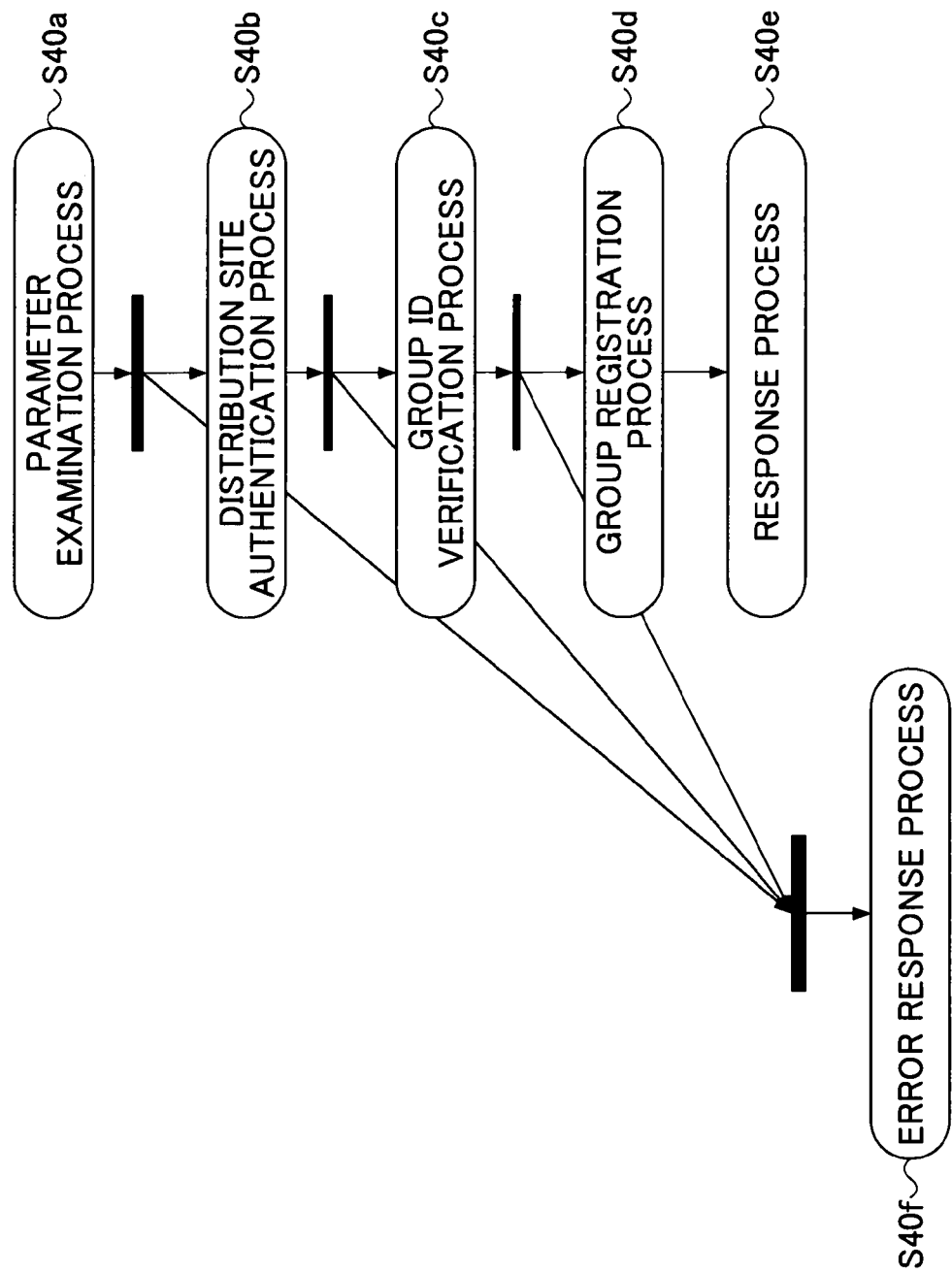
FIG. 17 is a sequence diagram illustrating a group registration process.

Next, a detail of step S40 is described. FIG. 17 is a sequence diagram illustrating the group registration process.

In step S40a, the distribution server cooperative section 111 examines whether the received group registration request contains necessary parameters. If the received group registration request contains the necessary parameters, the distribution server cooperative section 111 causes the distribution server authentication section 117 to sending authentication to the distribution server 20 (i.e., distribution site) (step S40b). The distribution server authentication section 117 matches a domain name, a distribution site ID and a password contained in the authentication request with the domain name, the distribution site ID and the password contained in the distribution site master 118, and sending authentication, when they are matched, to the distribution server 20.

When the distribution server 20 received the authentication, the distribution server cooperative section 111 verifies whether a combination of a group ID and a distribution site ID (hereinafter also called a "group ID and distribution site ID combination") contained in the group registration request has already been registered in the group ID master 20 (step S40c). If the group ID and distribution site ID combination contained in the group registration request is unregistered, the distribution server cooperative section 111 registers a record including the group ID, the distribution site ID, and the product ID of the distribution package contained in the group registration request in the group ID master 120 (step S40d). The distribution server cooperative section 111 sets a delete flag to an "ON" status for the registered record.

The distribution server cooperative section 111 also registers a record including the group ID and the group name in the group name master 122. Note that in this embodiment, the group name registered to create the group is a group name in Japanese (i.e., a Japanese group name). Thus, the "language" field of this record is recorded as "Japanese".

Subsequently, the distribution server cooperative section 111 sends a response indicating that the group registration has been successful to the commercial product registration section 21 (Step S40e). On the other hand, if the distribution server cooperative section 111 determines that the received group registration request contains none of necessary parameters in step S40a, if the distribution server authentication section 117 has failed to sending the authentication to the distribution server 20 in step S40b, or if the group ID and distribution site ID combination contained in the group registration request has already been registered, the distribution server cooperative section 111 sends an error response indicating that the group registration has been failed to the commercial product registration section 21 (Step S40f).

As described above, the group creation involves management of the group configuration information (i.e., management of information between the group and its associated distribution packages) alone, and does not involve generating the entity of a group (e.g., an archive file containing a collection of distribution packages attributed to the group). Accordingly, storage capacity used for creating a group may be suppressed.

Note that when product information is registered for the newly created group, the product information registration process illustrated in FIG. 8 may be carried out by selecting the newly created group in step S21.

As described above, the distribution site may optionally determine the configuration of the group. Thus, a group configuration effective for sales promotion may be created based on specific needs in corresponding distribution areas, and appropriate commercial products may be produced in the corresponding distribution areas.

Figure 18:
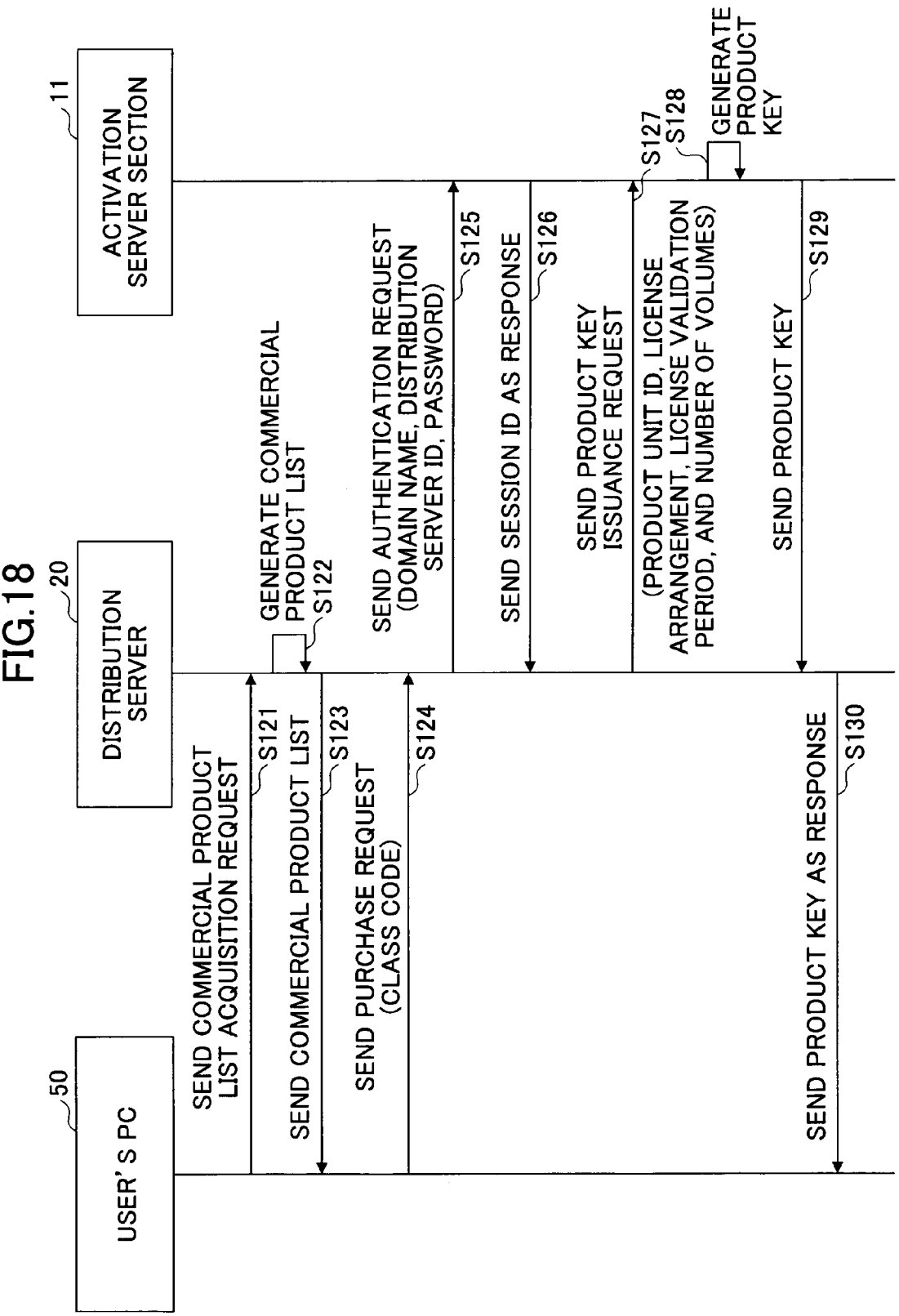
FIG. 18 is a sequence diagram illustrating a commercial product distribution process.

FIG. 18 is a sequence diagram illustrating a commercial product distribution process. The distribution server 20 is set in the distribution area to which the user's PC 50 belongs as illustrated in FIG. 18.

When a user in a certain user's environment E1 inputs a URL addressing a Web page for displaying a list of available commercial products that the user is capable of purchasing (i.e., commercial product list page) into a Web browser 51 of the user's PC 50, the Web browser 51 sends a commercial product list acquisition request to the distribution management section 22 of the distribution server 20 (step S121).

Subsequently, the distribution management section 22 generates the commercial product list page based on the commercial product master 23 (step S122). Specifically, the distribution management section 22 generates HTML data to display a commercial product name, a license arrangement, a license validation period, the number of license volumes, and a check box for each commercial product registered in the commercial product master 23 as the commercial product list page. Thus, the commercial products associated with the group license are created via the commercial product information edition screen 210. If the commercial product information has been registered in the commercial product master 23, the commercial products associated with the group license are also displayed in the commercial product list page as selectable commercial products. Note that the check box is used for the user to purchase commercial products by selecting desired one or more commercial products in the commercial product list page. Subsequently, the distribution management section 22 sends the generated commercial product list page to the Web browser 51 as a response (step S123). The Web browser 51 displays the received commercial product list page on a display device of the user's PC 50.

When the user selects a check box of a commercial product that the user desires to purchase and presses a purchase button, the Web browser 51 sends a purchase request including a class code of the selected commercial product subject to purchasing to the distribution management section 22 (step S124). That is, the commercial product list page is configured such that the selected class code of the commercial product is sent by pressing the purchase button. Note that plural commercial products may be selected in the commercial product list page. Thus, in step S124, plural class codes may be included in the purchase request.

Subsequently, the distribution management section 22 specifies the domain name, the distribution ID, and the password in the storage of the distribution server 20 and sends an authentication request together with the specified domain name, distribution site ID, and password to the license management server 10 of the activation server section 11 (step S125). The distribution server authentication section 117 of the activation server section 11 matches the domain name, the distribution site ID and a password contained in the authentication request with the domain name, the distribution site ID and the password contained in the distribution site master 118, and sending an authentication, when they are matched, to the distribution server 20. When the authentication sent to the distribution server 20 is successful, the authentication section 117 establishes a session and sends a session ID of the established session to the distribution management section 22 (step S126). A communication between the distribution management section 22 and the activation server section 11 is hereafter carried out based on the session ID of the established session.

Subsequently, the distribution management section 22 acquires a product unit ID (a product ID or a group ID), a license arrangement, a license validation period, and the number of volumes registered for a class code contained in the purchase request from the commercial product master 23, specifies the acquired product unit ID (the product ID or the group ID), the license arrangement, the license validation period, and the number of volumes, and sends a product key issuance request together with the specified product unit ID (the product ID or the group ID), license arrangement, license validation period, and number of volumes to the product key issuing section 112 of the activation server section 11 (step S127). Note that the product key issuance request corresponds to a commercial product distribution report.

On receiving the product key issuance request, the product key issuing section 112 generates a product key corresponding to the commercial product subject to purchasing (step S128). The product key issuing section 112 sends the generated product key to the distribution management section 22 (step S129). Note that if the product key issuance request contains plural product unit IDs, etc., for plural commercial products, the product key issuing section 112 generates a product key for every commercial product. A product key may also be generated for a commercial product associated with the corresponding group license. Accordingly, management of the product key generated for each commercial product described above may be easier than management of the product key generated for each distribution package attributed to the group when the user manages the product keys.

On receiving the product key, the product key reporting section 24 of the distribution server 20 sends the HTML data containing the received product key to the Web browser 51 as a response (step S130). The Web browser 51 displays the received HTML data on the display device of the user's PC 50. The user visually acknowledges the product key issued for the purchased commercial product. Note that the product key reporting section 24 may deliver the product key by sending an electronic mail containing the product key to the user's PC 50.

Figure 19:
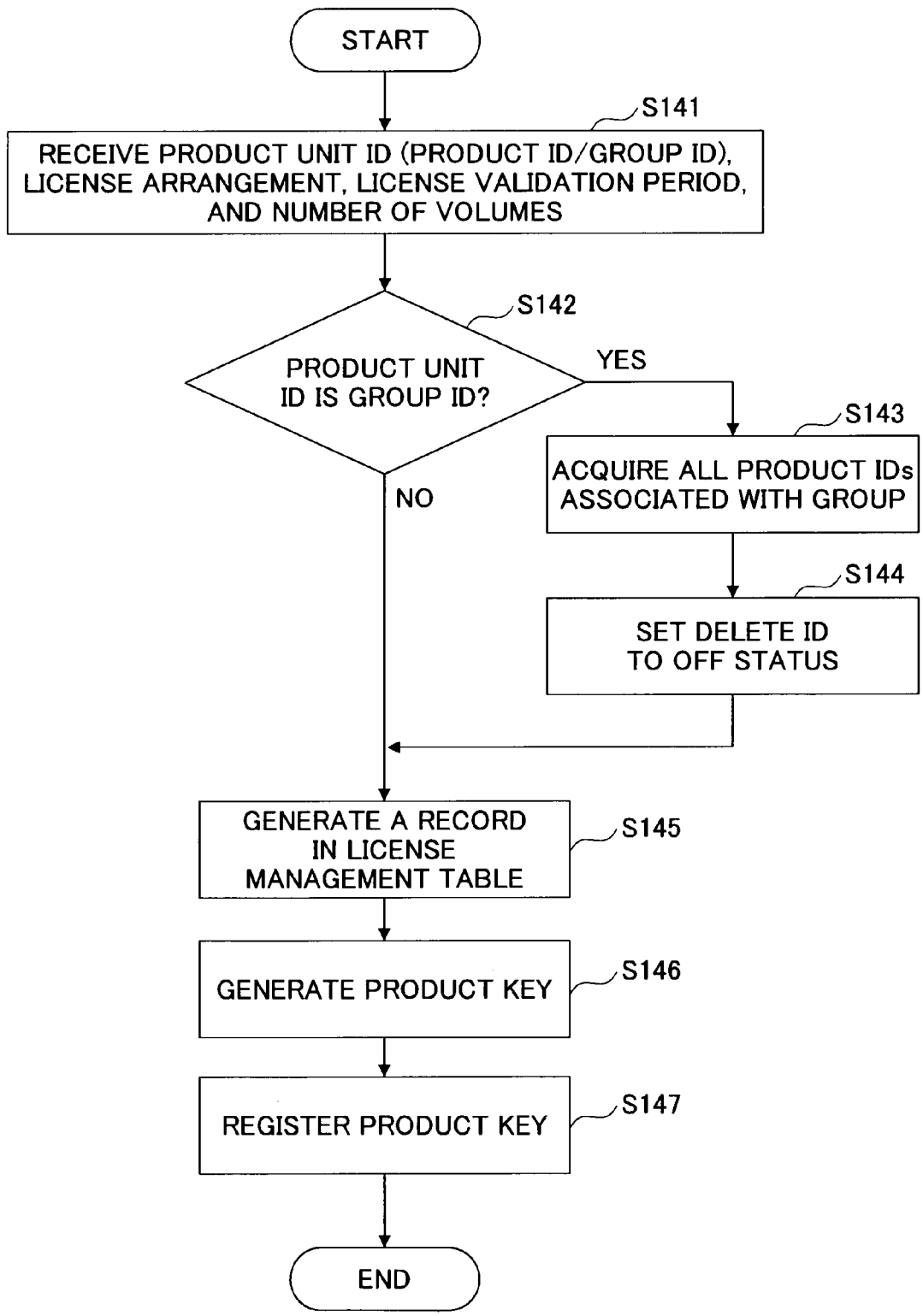
FIG. 19 is a flowchart illustrating a product key generation process carried out by a product key issuing section.

Next, a detail of step S128 is described. FIG. 19 is a flowchart illustrating a product key generation process carried out by the product key issuing section 112.

In step S141, the product key issuing section 112 receives the product unit ID (product ID or group ID), the license arrangement, the license validation period, and the number of volumes for the corresponding commercial product. Subsequently, the product key issuing section 112 determines whether the received product unit ID is a product ID or a group ID (step S142). Specifically, the product key issuing section 112 searches the group ID master 120 for the group ID that matches the received product unit ID. If the product key issuing section 112 finds the group ID that matches the product unit ID (YES in step S142), the product key issuing section 112 acquires all the product IDs attributed to the group ID (i.e., product IDs of the distribution packages attributed to the group) from the group ID master 120 (step S143). Subsequently, the product key issuing section 112 sets whether the delete flag of the group ID to an "OFF" status (step S144). Accordingly, the group ID associated with those product IDs may not be deleted.

If the product key issuing section 112 does not find the group ID that matches the product unit ID (NO in step S142), a record for registering the received product ID or the product ID acquired from the group ID master 120 is generated in the license management table 121 (step S145). Thus, if plural product IDs are acquired from the group ID master 120, plural records for registering the product IDs may be generated in the license management table 121. Further, the product key issuing section 112 generates the number of records corresponding to the number of license volumes associated with the same product ID. Thus, if the number of license volumes is two or more, the product key issuing section 22 generates two or more records associated with the same product ID in the license management table 121.

FIG. 20 is a diagram illustrating a configuration example of the license management table. As illustrated in FIG. 20, a license management table 121 includes items of a management number issued for the distribution package per license, a product key, a product ID, an apparatus number, a status, a license arrangement, a license validation period, a license expiration date, and a license issuance date.

Among the above items, the product ID field, the license arrangement field, and the license validation period field include values received from the distribution management section 22 in step S145. If plural records are generated, all the generated records contain the same value. However, if the product ID of the distribution package is acquired based on the group ID (i.e., group license), the generated record includes the acquired product ID.

The management number is an identifier (number) uniquely assigned to each record generated in the license management table 121. A product key generated in a subsequent step is registered as the product key. The apparatus number of the image forming apparatus 40 specified as an apparatus utilizing the distribution package is registered when the license file 90 is issued. The apparatus number is identifier information (apparatus identifier) that uniquely identifies each of the image forming apparatuses 40. The status is information on the license status. The license in this embodiment includes three license statuses of "no license", "check-out", and "check-in". The "no license" status is a status where the license is not issued. The "check-out" status is a status where the license is currently used. The "check-in" status is a status where the license is unused (ready for use). In step S145, a value is not registered in the status field. The license expiration date is a license expiration date of the license (license file 90) that is computed based on the license validation period when the license file 90 is issued. The license issuance date is a license issuance date of the license (license file 90) registered when the license file 90 is issued.

Subsequently, the product key issuing section 112 generates a product key (step S146). The number of product keys to be generated is one even if the received product unit ID in step S141 is a group ID or the number of volumes is two or more.

Figure 21:
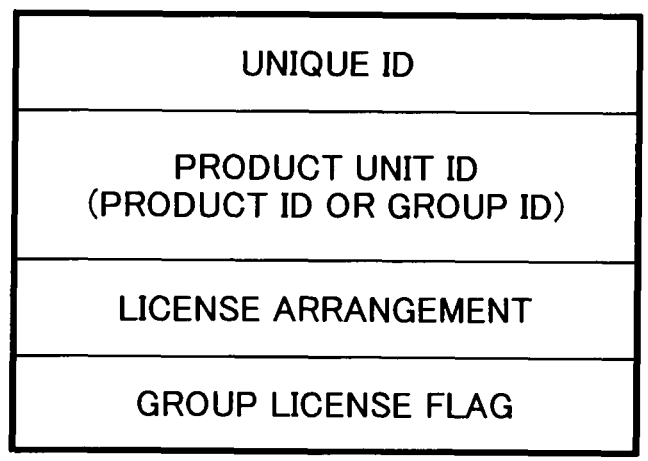
FIG. 21 is a diagram illustrating a configuration example of a product key.

FIG. 21 is a diagram illustrating a configuration example of a product key. As illustrated in FIG. 21, the product key is data including a unique ID, a product unit ID, a license arrangement and a group license flag.

The unique ID is uniquely generated every time a product key is generated. The uniqueness of the product key is acquired by the unique ID. The product unit ID is one of the product ID and the group ID received in step S141. That is, a product ID of the purchased commercial product or a group ID of the group of the purchased commercial product. The license arrangement is the license arrangement received in step S141. The group license flag is a parameter determining whether the product unit ID is a group ID (true) or not (false). The product key issuing section 112 sets a value of the group license flag as "true" when the received product unit ID is the group ID.

Subsequently, the product key issuing section 112 registers the generated product key on the record generated in step S145 and updates the license management table 121 by changing the status of the record to the "check-in" status (step S147). The number of product keys to be generated is one, even if the received product unit ID in step S141 is a group ID or the number of volumes is two or more.

Note that in FIG. 20, records corresponding to the management numbers 1 through 3 in the license table 121 are the records having a volume license. The records having the volume license have the same product keys and the product IDs. Further, records corresponding to the management numbers 4 and 5 in the license table 5 are the records having the group license (having a license as a group). The records having the group license have the same product keys. However, since the records having the group license correspond to different distribution packages despite the fact they are in the same group, the records having the group license have different product IDs.

The product keys generated in this manner are sent to the distribution management section 22 of the distribution server 20 in step S129 of FIG. 18, and are then transferred from the distribution management section 22 to the Web browser 51 of the user's PC 50.

Subsequently, the distribution packages contained in the commercial product having the issued product key are installed.

Figure 22:
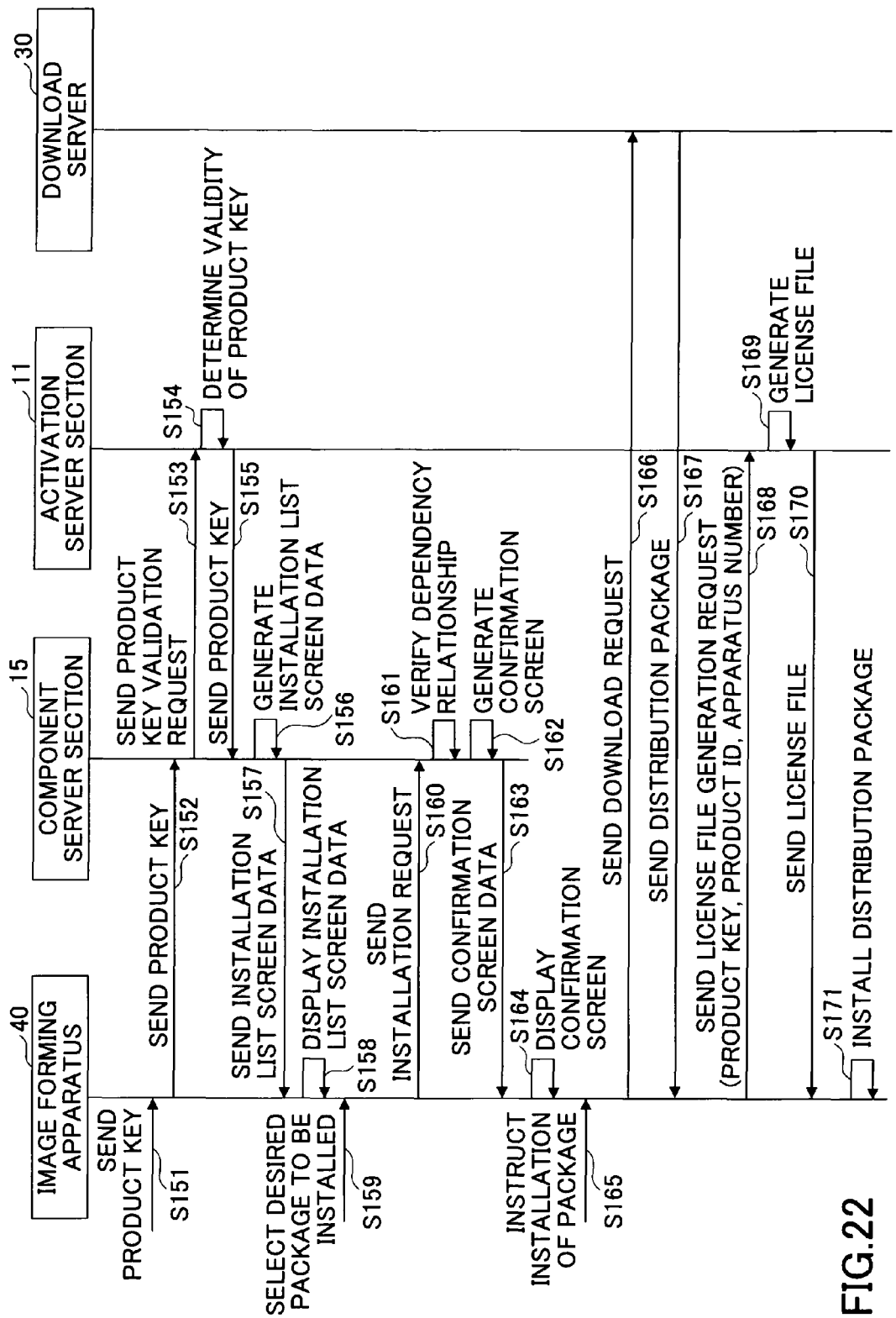
FIG. 22 is a sequence diagram illustrating a distribution package installation process.

FIG. 22 is a sequence diagram illustrating a distribution package installation process.

Having acquired the product key, the user inputs the acquired product key into the image forming apparatus 40 in which the user desires to use the distribution packages corresponding to the acquired product key (step S151). The user may input the product key via the following extended function setting menu screen displayed on the operations panel 45.

FIG. 23 is a diagram illustrating a display example of the extended function setting menu screen. An extended function setting menu screen 510 displays various menus for extending functions of the image forming apparatus 40. The various menus of the extended function setting menu screen 510 are displayed on the operations panel 45 by the UI control section 426 based on predetermined input operations. In the extended function setting menu 510, when a "newly add" menu 511 is selected, the UI control section 426 displays a product key input screen on the operations panel 45.

FIG. 24 is a diagram illustrating a display example of the product key input screen. A product key input screen 520 includes a product key input field 521. In step S151, the product key is input into the product key input field 521.

When the product key is input into the product key input field 521 and a "next" button 522 is selected, the installation section 421 specifies the input product key and sends an installation list screen generation request of the distribution packages associated with the product key to the installation supporting section 152 of the component server section 15 (step S152).

Subsequently, on receiving the installation list screen generation request, the installation supporting section 152 sends a product key validation request for validating the specified product key to the product key verification section 113 of the activation server section 11 (step S153). The product key verification section 113 determines the validity of the specified product key by referring to the license management table 121 (step S154). Specifically, the product key verification section 113 searches the license management table 121 for the records having the specified product key and having the value of the status that is not the "check-out" status. If the corresponding records having the specified product key and having the value of the status that is not the "check-out" status are found, the product key verification section 113 determines the specified product key as valid. If, on the other hand, the corresponding records are not found, the product key verification section 113 determines the specified product key as invalid. With this determination method, the specified product key is determined as valid insofar as at least one of the licenses of the distribution packages attributed to a group has not been used (is available).

When the specified product key is valid, the product key verification section 113 sends the product IDs associated with the specified product key in the license management table 121 (i.e., the product IDs of the distribution packages) to the installation supporting section 152 as a response (step S155). Thus, the plural product IDs corresponding to the group license or corresponding to the volume license may be sent to the installation supporting section 152 as a response. Note that in the case of the group license, license availability information is sent to the installation supporting section 152 for each product ID (i.e., each distribution package attributed to the group) as a response. In the case of the group license, at least one of the licenses of the distribution packages attributed to a group may already be used, so that it is necessary to identify which license (of the distribution package) is available or unavailable among the distribution packages attributed to the same group.

If, on the other hand, the product key verification section 113 determines the specified product key as invalid, the installation supporting section 152 sends error screen data for displaying an error screen indicating that the specified product key is invalid to the installation section 421 as a response. On receiving the error screen data, the installation section 421 causes the UI control section 426 to display the error screen based on the error screen data.

FIG. 25 is a diagram illustrating a display example of the error screen when the specified product key is invalid. Messages indicating a product key error (i.e., the product key is invalid) or product key input fields 531 are displayed in an error screen 530. The user may input a correct product key via the product key input fields 531. When the user inputs the correct product key via the product key input fields 531 and presses an "OK" button, the process of step S152 is executed again. On the other hand, if the user presses a "cancel" button 533, the installation of the distribution package is cancelled.

If the installation supporting section 152 receives a result indicating that the specified product key is valid in step S155, the installation supporting section 152 generates the installation list screen data of the distribution packages corresponding the product IDs received from the product key verification section 113 by referring to the component management table 155 (step S156).

FIG. 26 is a diagram illustrating a configuration example of the component management table. As illustrated in FIG. 26, a component management table 155 includes a product ID, a version, a name, a description, a vendor name, a distribution type, a download path, and a product ID of a function package registered for each distribution package. The version is a version number of the distribution package. The name is a name of the distribution package. The description is a description associated with the distribution package. The vendor name is a name of a vendor of the distribution package. The distribution type is a distribution type for the distribution package. The download path is positional information of the distribution package within the distribution package management section 32 of the download server 30. In this embodiment, a uniform resource locator (URL) is used as the positional information. The product ID of the function package is a list of product IDs of the respective function packages attributed to the respective distribution packages.

Note that the component management section 154 regularly acquires the distribution packages from the download server 30, analyzes contents of the acquired distribution packages and registers the analyzed contents in the component management table 155. Specifically, the product ID, the version, the name, the description, the vendor name, and the distribution type recorded on the distribution package information file stored in each of the distribution packages are registered in the product ID field, the version field, the name field, the description field, the vendor name field, and the distribution type field of the component management table 155. Thus, the name, the description, and the vendor name are registered in different languages. The product ID field of the function package of the component management table 155 registers a product ID recorded on the function package information file stored in the function package contained in each of the distribution packages. Note that the download path is reported from the download server 30 when acquiring the distribution package.

Subsequently, the installation supporting section 152 sends the generated installation list screen data to the installation section 421 of the image forming apparatus 40 (step S157). The installation section 421 inputs the received installation list screen data into the UI control section 426. The UI control section 426 displays the installation list screen on the operations panel 45 based on the installation list screen data (step S158).

FIG. 27 is a diagram illustrating a display example of an installation list screen. An installation list screen 540 displays a list of distribution packages subject to installation (installation candidates) and a check box arranged beside each of the distribution packages so that the user can select desired ones of the distribution packages that the user wishes to install (i.e., use or non-use of the distribution packages). The user ticks the desired check boxes of the distribution packages that she or he wishes to install. In FIG. 27, the packages 1 through 4 are displayed as installation candidates and the packages 1 through 3 are selected for installation.

Note that as clear from the above process, when the product key of the commercial product attributed to the group license is entered in the product key input screen 520, the installation list screen 540 displays a list of the distribution packages associated with the group assigned to the group license. Thus, the user can select part of the distribution packages associated with the group for installation. That is, inappropriate distribution packages (currently not installable distribution packages) are excluded from the list of the distribution packages subject to installation. Since the user can select desired one or more distribution packages for installation from the distribution packages attributed to the group, the user can flexibly manage (handle) the commercial products associated with the group license. Note that all the three distribution packages attributed to the group may be selected for installation.

Further, in the installation list screen 540, the names of the distribution packages are displayed based on the language environment of the image forming apparatus 40. That is, when generating the installation list screen data, the installation supporting section 152 uses the registered languages compatible with the language environment of the image forming apparatus 40. The language environment of the image forming apparatus 40 is determined based on information indicating the language environment of the image forming apparatus 40 contained in the installation list screen generation request sent from the image forming apparatus in step S152. Note that in the later-described various screens, the names of the distribution packages may also be displayed in the corresponding language based on the language environment of the image forming apparatus 40.

In the installation list screen 540, when the check boxes of the distribution packages that the user wishes to install are selected (ticked) and an "install" button 541 is pressed (step S159), the installation section 421 specifies the product IDs of the distribution packages having the ticked (selected) check boxes (selected for installation) and configuration information on all the distribution packages installed in the image forming apparatus 40, and sends an installation request for installing the selected distribution packages to the installation supporting section 152 of the component server section 15 (step S160).

Note that the product IDs of the ticked distribution packages in the installation list screen 540 are acquired from the installation list screen data. Note also that the configuration information of all the distribution packages installed in the image forming apparatus 40 is acquired from the installation information management table 427.

FIG. 28 is a diagram illustrating a configuration example of the installation information management table. As illustrated in FIG. 28, an installation information management table 427 includes a product ID, a version, a product ID of a function package, an activation flag, and a license expiration date for each distribution package.

The product ID of the function package is a product ID list of the function packages associated with the distribution package. The activation flag indicates whether a desired distribution package is activated (activated or inactivated). The license expiration date is an expiration date issued to the distribution package (expiration date of the license file 90). Note that the activation flag and the license expiration date of each function package are in compliance with the activation flag and the license expiration date of the distribution package to which the function package is attributed. Note also that contents of the installation information management table 427 are registered while the later-described distribution packages are installed.

The configuration information sent to the installation supporting section 152 of the component server section 15 in step S160 includes all the information registered in the installation information management table 427.

Subsequently, the installation supporting section 152 causes the dependency relationship determination section 151 to verify a dependency relationship of the distribution packages corresponding to the product IDs contained in the installation request (step S161). Specifically, the dependency relationship determination section 151 determines whether other function packages, on which the function package contained in the distribution package subject to installation or updating depends, have already been installed in the image forming apparatus 40.

Next, the installation supporting section 152 generates HTML data (i.e., confirmation screen data) for displaying a confirmation screen indicating the verification result of the dependency relationship (step S162), and sends the confirmation screen data to the installation section 421 as a response (step S163). Note that details of steps S161 and S162 are described later.

Subsequently, the installation section 421 inputs the received confirmation screen data into the UI control section 426. The UI control section 426 displays the confirmation screen on the operations panel 45 based on the confirmation screen data (step S164).

FIG. 29 is a diagram illustrating a display example of a confirmation screen when there is a valid package dependency relationship between the distribution packages. In a confirmation screen 550a, the distribution package (package 1) selected for installation has a valid package dependency relationship with other distribution packages (no package dependency relationship interference). Specifically, as illustrated in a region 552*a* of the confirmation screen 550*a*, a distribution package 2 on which the package 1 depends (dependency package) may be installed simultaneously with the package 1, and a distribution package 3 on which the package 1 depends has already been installed in the image forming apparatus.

When an "OK" button 551*a* is pressed in the confirmation screen 550*a* (step S165), the installation section 421 specifies the URLs corresponding to the distribution packages subject to installation and sends a download request for downloading the distribution packages to the download processing section 31 of the download server 30 (step S166). That is, the "OK" button 551*a* is associated with a URL of each of the distribution packages and a sending instruction for the download request.

FIG. 30 is a diagram illustrating a display example of the confirmation screen when dependency packages are simultaneously installed. As illustrated in FIG. 30, a region 552*b* of a confirmation screen 550*b* illustrates that the dependency package (firmware) that is not installed in the image forming apparatus 40 and is not subject to installation may be installed simultaneously with the package 1, and an inquiry about whether to install the dependency package. Note that whether the dependency package can be installed simultaneously with the distribution package subject to installation may be determined based on the distribution type of the dependency package.

When an "OK" button is pressed in the confirmation screen 550*a* (step S165), the installation section 421 specifies the URLs corresponding to the distribution packages subject to installation and a URL of the distribution package (dependency package) for simultaneous installation, and sends a download request for downloading the distribution packages and the dependency package to the download processing section 31 of the download server 30 (step S166). That is, the "OK" button 551*a* is associated with URLs the distribution packages, a URL of the dependency package to be installed simultaneously with the distribution package, and a sending instruction for the download request.

FIG. 31 is a diagram illustrating a display example of a confirmation screen when simultaneous installation of dependent packages is not allowed.

As illustrated in a region 552*c* of a confirmation screen 550*c*, there are three distribution packages 3, 4, and 5 that are not allowed to be installed. Regions 553*c*, 554*c*, and 555*c* of the confirmation screen 550*c* illustrate details of the three distribution packages that are not allowed to be installed. The region 553*c* indicates that the package 3 is unable to remove the dependency (dependency package may not be installed simultaneously with the distribution package subject to installation. The region 551*c* indicates that the license of the package 4 is already acquired (already used). The region 555*c* indicates that the package 5 is unable to be installed simultaneously with other packages (package 1 and package 2 in the example of FIG. 31). Note that FIG. 31 illustrated the example where the packages 1 through 5 are selected for installation.

When an "OK" button 551*c* is pressed in the confirmation screen 550*c* (step S165), the installation section 421 specifies the URLs corresponding to the distribution packages that are allowed to be installed and sends a download request for downloading the distribution packages to the download processing section 31 of the download server 30 (step S166). That is, the "OK" button 551*c* is associated with a URL of each of the distribution packages allowed to be installed and a sending instruction for the download request.

On receiving the download request in step S166, the download processing section 31 acquires the distribution packages identified by the URLs specified in the download request from the distribution package management section 32, and transfers the acquired distribution packages to the installation section 421 (step S167). The installation section 421 stores the received distribution packages in a temporary storage region in the HDD 414 (e.g., temporary folder).

When downloading of the distribution packages is completed, the installation section 421 specifies the product keys input in step S151, the product IDs of the distribution packages subject to installation, and the apparatus number of the image forming apparatus 40 recorded in the ROM 413 or HDD 414 and sends a license file generation request (license utilization request) to the license issuing section 115 of the activation server section 11 (step S168). Subsequently, the license issuing section 115 generates the license file 90 based on the product keys and the license management table 121 (step S169).

Figure 32:
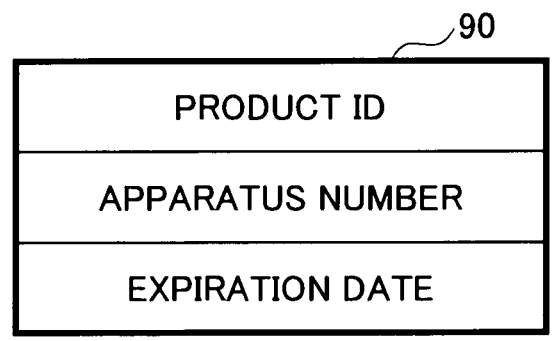
FIG. 32 is a diagram illustrating a configuration example of a license file.

FIG. 32 is a diagram illustrating a configuration example of the license file. As illustrated in FIG. 32, a license file 90 includes a product ID, an apparatus number, and an expiration date. The product ID is a product ID of the distribution package to which a license is assigned by the license file 90 (use of the distribution package is permitted). The apparatus number is an apparatus number of the image forming apparatus 40 in which the use of the distribution package associated with the product ID is permitted by the license file 90. The expiration date is an expiration date of the license file 90; that is, a license expiration date assigned by the license file 90.

The product ID associated with the corresponding product key contained in the license file generation request for generating the license file 90 is registered as the product ID of the license file 90. Note that if the product key is associated with the group license; that is, if plural different product IDs are registered corresponding to the product key in the license management table 121, the license issuing section 115 generates the license file 90 for each of the distribution packages. Accordingly, the product ID of a corresponding one of the generated license files 90 has the product ID of a corresponding one of the distribution packages having a group license.

The apparatus number contained in the license file generation request for generating the license file 90 is registered as the apparatus number of the license file 90. The expiration date of the license file 90 is a date (e.g., month/date/year) computed by adding a validation period registered in the license management table 121 corresponding to the product key and the corresponding product ID contained in the license file generation request for generating the license file 90 to a current date.

Subsequently, the license issuing section 115 sends the generated license file 90 to the installation section 421 as a response (step S170). The installation section 421 stores the received license file 90 in a temporary storage region in the HDD 414 (e.g., temporary folder).

On receiving the license file 90, the installation section 421 carries out an installation process of the distribution package (step S171). A detail of the installation process is described later.

Note that in the above example, an acquisition instruction of the distribution package (distribution package acquisition instruction) is sent to the image forming apparatus 40 via the installation list screen data in step S157 or the confirmation screen data in step S163. However, instead of the above example, the distribution package itself (i.e., not the acquisition instruction but the application program itself) may be directly sent to the image forming apparatus 40 when the installation section 421 carries out the installation process of the distribution package. In this case, the component server section 15 (i.e., second sending unit) may download the distribution package subject to installation from the download server 30 and transfer the downloaded the distribution package to the image forming apparatus 40.

In addition, if some of the distribution packages attributed to the group are installed (i.e., if some of the distribution packages attributed to the group are selected in the installation list screen 540 in FIG. 27), remaining distribution packages attributed to the same group may be separately installed. If the remaining distribution packages attributed to the group are installed, the user displays the product key input screen 520 again and enters corresponding product keys associated with the group. In this case, the installation supporting section 152 generates installation list screen data to display an installation list screen without providing check boxes corresponding to the distribution packages the licenses of which have already been used. Thus, the installation list screen 540 from which the distribution packages having the already used licenses are not selectable is displayed. Whether the distribution package includes the already in use license is determined based on information indicating availability (usability) of the license for each product ID attributed to the group which is sent from the product key verification section 113 as a response in step S155.

Subsequently, descriptions are given of details of the processes carried out by the component server section 15 of the license management server 10 in steps in S161 and S162 illustrated in FIG. 22.

Figure 33:
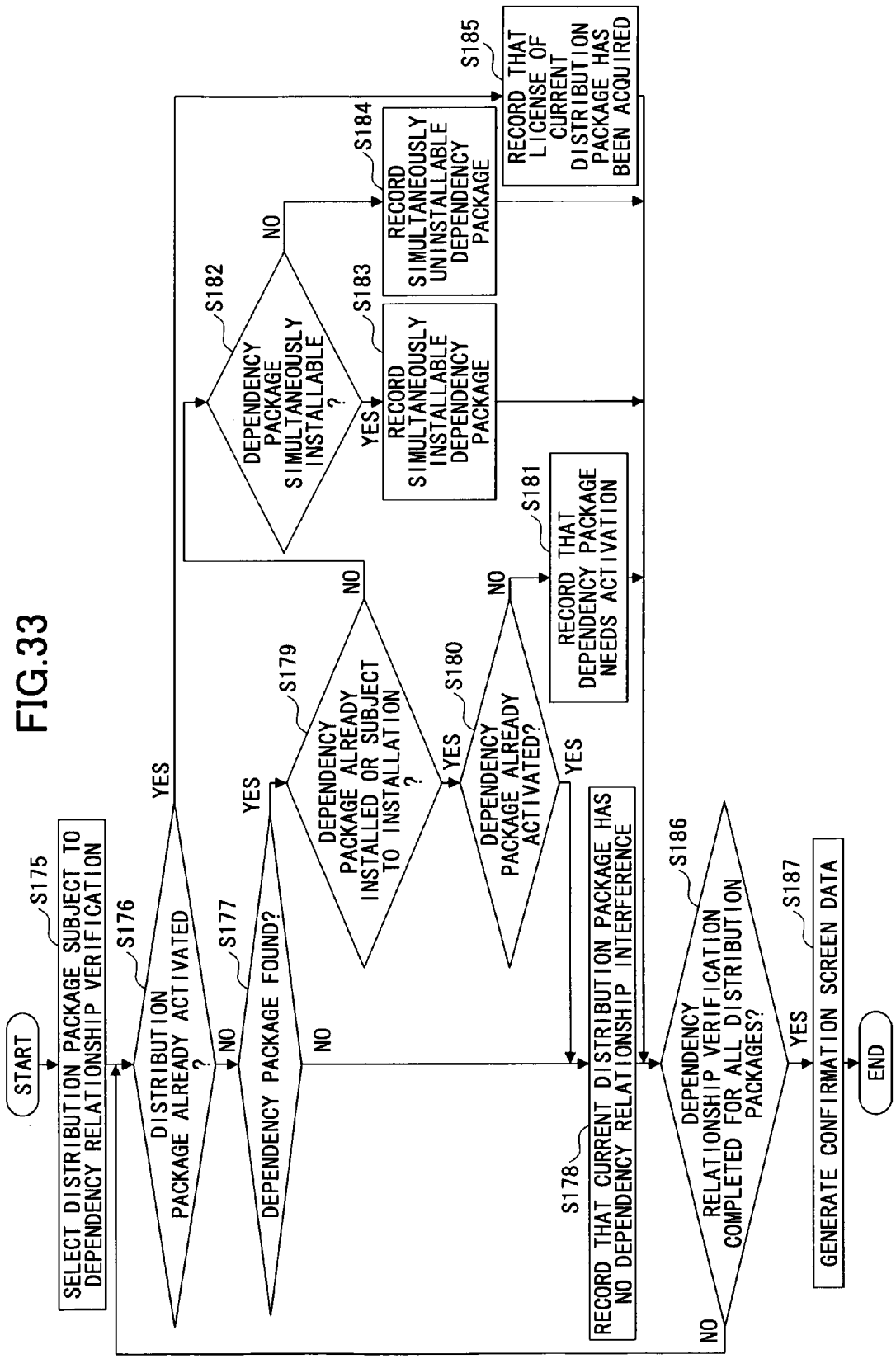
FIG. 33 is a flowchart illustrating a package dependency relationship verification process and a confirmation screen data generation process carried out by a component server section.

FIG. 33 is a flowchart illustrating a dependency relationship verification process and a confirmation screen data generation process carried out by a component server section 15.

In step S175, the dependency relationship determination section 151 selects one of the product IDs received in a dependency relationship verification request in step S161 in FIG. 22 to carry out the dependency relationship verification process on the selected product ID (i.e., selected distribution package). Subsequently, the dependency relationship determination section 151 determines whether the distribution package subject to the dependency relationship verification (hereinafter simply called a "current distribution package") has already been activated based on configuration information of the current distribution package contained in the configuration information received per each distribution package in step S160 (step S176). If the current distribution package has not been activated (No in step S176), the dependency relationship determination section 151 determines whether there is a dependency distribution package (i.e., dependency package) on which the current distribution package depends based on the component management table 155 (see FIG. 28) and the dependency relationship management table 156 (step S177).

FIG. 34 is a diagram illustrating a configuration example of the dependency relationship management table. As illustrated in FIG. 34, a dependency relationship management table 156 includes a product ID of a function package and a product ID of a (current) function package on which the function package depends registered for each function package. Plural product IDs of the function packages on which the current function package depends may be registered.

Note that in FIG. 34, "0" indicates that there is no function package on which the current function package depends.

Note that similar to the component management table 155, the dependency relationship management section 154 regularly acquires the distribution packages from the download server 30, analyzes contents of the acquired distribution packages and registers the analyzed contents in the dependency relationship management table 156. Specifically, the content of package dependency information recorded in the package information file of the function package contained in the distribution package is registered in the dependency relationship management table 156 as the product ID of the function package on which the current function package depends.

In step S177, the dependency relationship determination section 151 acquires a product ID list of the function packages registered corresponding to the product ID of the current distribution package in the component management table 155. Subsequently, the dependency relationship determination section 151 specifies the function package (hereinafter called a "dependency function package") on which the current function package depends based on the product IDs of the acquired function packages and dependency relationship management table 156. If the dependency function package is found, the dependency relationship management table 156 specifies the distribution package to which the dependency function package is attributed by inversely referring to the component management table 155. The specified distribution package is determined as a dependency package of the current distribution package. Note that there may be plural dependency packages. Further, the dependency relationships between the function packages may be recursively searched for.

If the dependency package is not found (No in step S177), the dependency relationship determination section 151 records that the current distribution package has no dependency relationship interference in the memory device 103 by associating with the product ID of the current distribution package (step S178). If the dependency package is found (Yes in step S177), the dependency relationship determination section 151 determines whether the dependency has already been installed in the image forming apparatus 40 or whether the dependency package is subject to installation based on the configuration information received per each distribution package in step S160 or the product IDs of the received distribution packages subject to installation in step S160 (step S179). That is, if the configuration information corresponding to the dependency package has been received, the dependency relationship determination section 151 determines that the dependency package has already been installed in the image forming apparatus 40. Further, if the product ID of the dependency package is included in the product IDs of the distribution packages subject to installation, the dependency relationship determination section 151 determines that the dependency package is subject to installation.

If the dependency package has been already installed in the image forming apparatus 40 (Yes in step S179), the dependency relationship determination section 151 determines whether the dependency package has been already activated (i.e., whether the dependency package is available) based on the configuration information received per distribution package (step S180). That is, the dependency relationship determination section 151 determines whether the dependency package has been already activated based on the activation flag contained in the configuration information of the dependency package.

If the dependency package has been already activated, or the dependency package is subject to installation (Yes in step S180), the dependency relationship determination section 151 records that the current distribution package has no dependency relationship interference in the memory device 103 by associating with the product ID of the current distribution package (step S178). If there is a dependency package that has not been activated (No in step S180), the dependency relationship determination section 151 records that the current distribution package has the dependency package necessary for activation in the memory device 103 by associating with the product ID of the current distribution package (step S181).

Further, if the dependency package has not been installed (No step S179), the dependency relationship determination section 151 determines whether the dependency package can be installed simultaneously with the current distribution package based on the component management table 155 (step S182). That is, in the component management table 155, if the distribution type corresponding to the product ID of the dependency package indicates that activation is not necessary, the dependency relationship determination section 151 determines that the dependency package can be installed simultaneously with the current distribution package. On the other hand, in the component management table 155, if the distribution type of the dependency package indicates that activation is necessary, the dependency relationship determination section 151 determines that the dependency package is not allowed to be installed simultaneously with the current distribution package.

If the dependency package can be installed simultaneously with the current distribution package (Yes in step S182), the dependency relationship determination section 151 records the product ID of the simultaneously installable dependency package in the memory device 103 by associating with the product ID of the current distribution package (step S183). If the dependency package is not allowed to be installed simultaneously with the current distribution package (No in step S182), the dependency relationship determination section 151 records the product ID of the simultaneously uninstallable (inappropriate) dependency package in the memory device 103 by associating with the product ID of the current distribution package (step S184).

Further, if the current distribution package has been already activated (Yes in step S176), the dependency relationship determination section 151 records that a license of the current distribution package has been already acquired in the memory device 103 by associating with the product ID of the current distribution package (step S185).

When the processes in steps S175 through S185 have been carried out for all the product IDs received in the dependency relationship verification request in step S161 of FIG. 22 (Yes in step S186), the installation supporting section 152 generates confirmation screen data based on information recorded in the memory device 103 (step S187). If, for example, all the distribution packages have no dependency relationship interference, the installation supporting section 152 generates confirmation screen data to display the confirmation screen 550a illustrated in FIG. 29. Further, if information associated with step S183 is recorded, the installation supporting section 152 generates confirmation screen data to display the confirmation screen 550b illustrated in FIG. 30. Further, if information associated with steps S183, S184, and S185 are recorded, the installation supporting section 152 generates confirmation screen data to display the confirmation screen 550c illustrated in FIG. 31.

Note that each of the confirmation screen data to display the confirmation screens 550a, 550b, and 550c includes a corresponding "OK" button associated with a URL of each of the installable distribution packages. URLs of the installable distribution packages are acquired via a download path of the component management table 155.

The above example describes the dependency package indicated based on the distribution package unit. However, the dependency package may be indicated based on the function package unit. Note that the dependency package may be indicated based on the function package unit; however, since the distribution package is a delivering unit, the distribution package having the function package is subject to installation.

Figure 35:
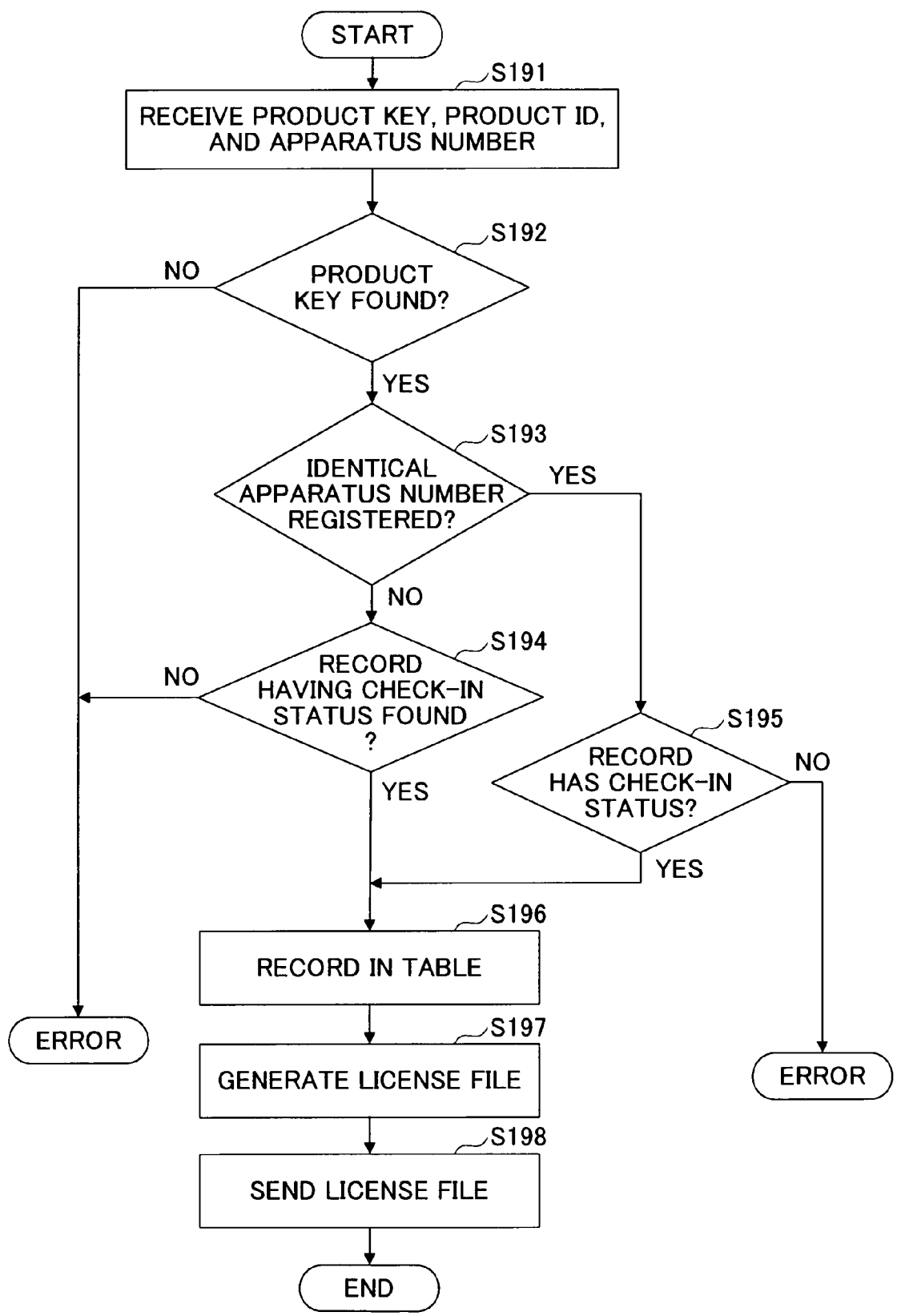
FIG. 35 is a flowchart illustrating a license file generation process carried out by an activation server section.

Subsequently, descriptions are given of details of the processes carried out by the component server section 11 of the license management server 10 in steps in S168 through S170 illustrated in FIG. 22. FIG. 35 is a flowchart illustrating a license file generation process carried out by the activation server section 11. Note that FIG. 35 illustrates the license file generation process when one product key is received. Thus, if plural product keys are received, the processes of steps S192 through S198 are carried out for each product key.

In step S191, the license issuing section 115 receives a license utilization request together with a product key, a product ID, and an apparatus number of the image forming apparatus 40 from the installation section 421 of the image forming apparatus 40. Subsequently, the license issuing section 115 determines whether a license corresponding to the received product key can be allowed. Specifically, the license issuing section 115 determines whether the received product key has been registered in the license management table 121 (step S192). If the product key has been registered (found) in the license management table 121 (Yes in step S192), the license issuing section 115 determines whether an apparatus number identical to the received apparatus number has been registered corresponding to the registered product key in the license management table 121 (step S193). If the identical apparatus number has not been registered (not found) in the license management table 121 (No in step S193), the license issuing section 115 determines whether there is a record having the "check-in" status among the records corresponding to the registered (found) product key and the received product ID in the license management table 121 (S194). If the record having the "check-in" status (hereinafter simply called a "target record") is found in the license management table 121 (Yes in step S194), the license issuing section 115 records the received apparatus number in the target record and changes the "check-in" status of the target record into the "check-out" status (step S196). That is, if the license issuing section 115 records that the license corresponding to the registered product key is in use. Further, if the license validation period of the target record has been already recorded (i.e., if the target record has been assigned to the lime-limited license), the license issuing section 115 computes the license expiration date by adding the recorded license validation period to the current date and records the computed license expiration date for the target record in the license management table 121.

Subsequently, the license issuing section 115 generates a license file 90 (see FIG. 32) containing the product ID, the apparatus number, and the license expiration date corresponding to the target record (step S197). Note that the license file 90 is generated for each record of the license management table 121; that is, the license file 90 is generated for each license corresponding to the distribution package. Subsequently, the license issuing section 115 sends the generated license file 90 to the installation section 421 of the image forming apparatus 40 as a response (step S198).

On the other hand, if the an apparatus number identical to the received apparatus number has been registered corresponding to the registered product key in the license management table 121 (Yes in step S193), the license issuing section 115 determines whether the found record having the identical apparatus number has the "check-in" status (step S195). If the record having the identical apparatus number has the "check-in" status (Yes in step S195), the processes of steps S196 through S198 are carried out.

Further, if the product key has not been registered (found) in the license management table 121 (No in step S192), if the target record having the "check-in" status is not found in the license management table 121 (No in step S194), or if the record having the identical apparatus number has the "check-out" status (No in step S195), the license issuing section 115 detects errors so that the license issuing section 115 generates no license file 90 and issues no license.

Figure 37:
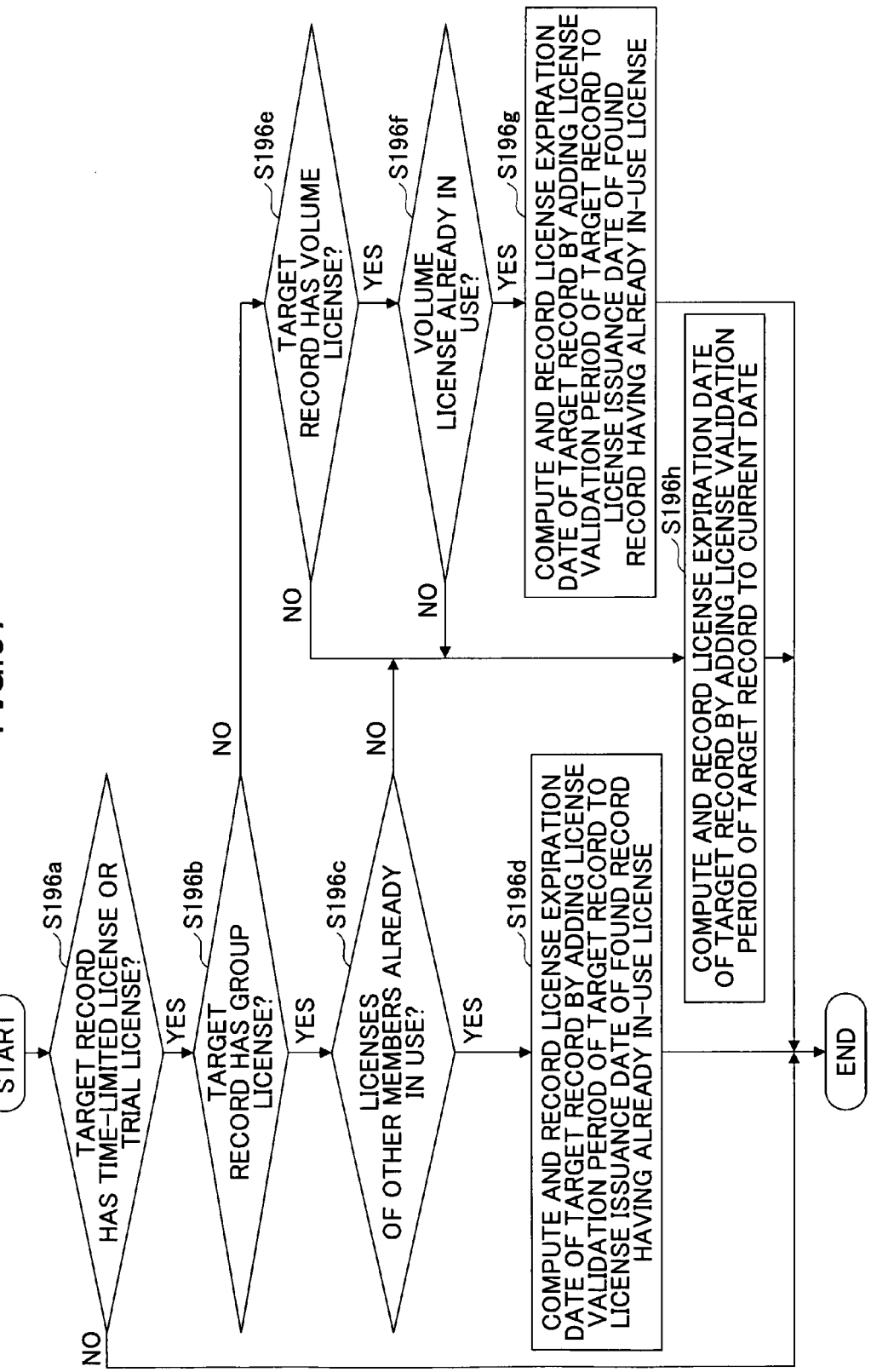
FIG. 37 is a flowchart illustrating a license validation period computing process.

Subsequently, a detail of a license expiration computation process carried out in step S196 is described. FIG. 37 is a flowchart illustrating a license validation period computing process.

In step S196a, the license issuing section 115 determines whether a license arrangement of the target record is a time-limited license or a trial license. That is, the license issuing section 115 determines whether the license arrangement of the target record has an expiration date. If the license arrangement of the target record is not the time-limited license or the trial license (No in step S196a), the license issuing section 115 does not carry out the computation of the license expiration date.

If the license arrangement of the target record is the time-limited license or the trial license (Yes in step S196a), the license issuing section 115 determines whether the license arrangement of the target record is a group license (step S196b). Specifically, the license issuing section 115 searches for records other than the target record that include a product ID differing from that of the target record and the product key identical to that of the target record. If the license issuing section 115 finds such records having the product ID differing from that of the target record and the product key identical to that of the target record, the license issuing section 115 determines that the target record has the group license. If, on the other hand, the license issuing section 115 does not find such records, the license issuing section 115 determines that the target record is not associated with the group license.

If the license issuing section 115 determines that the target record is associated with the group license; that is if the target record has the group license (Yes in S196b), the license issuing section 115 determines whether the licenses of the found records (other members of the group) associated with the group license are already in use (step S196c). Specifically, the license issuing section 115 determines whether there is a record having the "check-out" status among those records found in step S196b (i.e., other members associated with the group license). If there is such a record having the "check-out" status is found among those records found in step S196b (Yes in step S196c), the license issuing section 115 records an expiration date computed by adding the license validation period of the target record to the license issuance date of the found record in a field of the "license issuance date" of the target record (step S196d). That is, the distribution packages attributed to the same group have the same license expiration date.

If, on the other hand, the license issuing section 115 determines that the target record is not associated with the group license (No in S196b), the license issuing section 115 determines whether the target record is associated with the volume license (step S196e). Specifically, the license issuing section 115 searches for another record having a product ID identical to the product ID of the target record and a product key identical to the product key of the target record. If the license issuing section 115 finds such a record having the product ID identical to that of the target record and the product key identical to that of the target record, the license issuing section 115 determines, that the target record is associated with the volume license (Yes in step S196e); whereas if the license issuing section 115 does not find such a record, the license issuing section 115 determines that the target record is not associated with the volume license (No in step S196e).

If, the license issuing section 115 determines that the target record is associated with the volume license (Yes in step S196e), the license issuing section 115 determines whether a volume license of the found record (having the product ID identical to that of the target record and the product key identical to that of the target record) is already in use (step S196f). Specifically, the license issuing section 115 determines whether there is a record having the "check-out" status among those records found in step S196e. If there is such a record having the "check-out" status is found among those records found in step S196e (Yes in step S196e), the license issuing section 115 records an expiration date computed by adding the license validation period of the target record to the license issuance date of the found record in a field of the "license issuance date" of the target record (step S196g). That is, the distribution packages attributed to the volume license have the same license expiration date.

Further, if the target record is associated with the group license (i.e., if the license issuing section 115 finds a record having a product ID differing from that of the target record and having the product key identical to that of the target record) but the license of the found record is not in use (No in step S196c), if the target record is not associated with the group license (No in step S196b) or the volume license (No in step S196e), or if the target record is associated with the volume license but the volume license of the found record is not in use (No in step S196), the license issuing section 115 records an expiration date computed by adding the license validation period of the target record to a current date (today) in a field of the "license issuance date" of the target record (step S196h).

Figure 36:
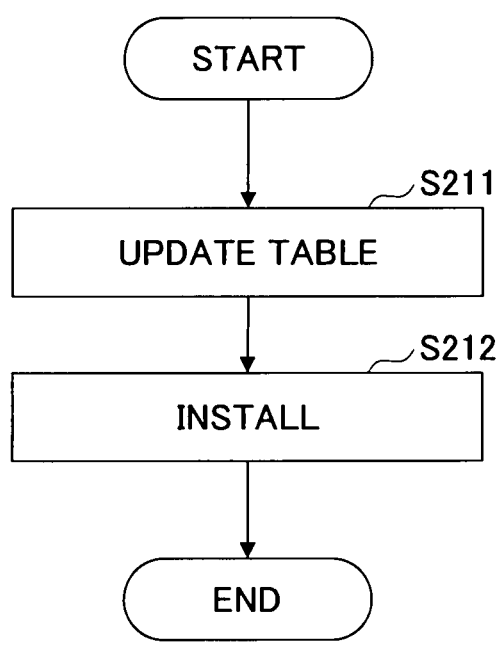
FIG. 36 is a flowchart illustrating a distribution package installation process carried out by the image forming apparatus.

Subsequently, a description is given of a detail of the process carried out by the image forming apparatus 40 in step in S171 illustrated in FIG. 22. FIG. 36 is a flowchart illustrating a distribution package installation process carried out by the image forming apparatus 40.

As illustrated in FIG. 36, in step S211, the installation section 421 registers information contained in the distribution packages stored in a temporary storage region and information contained in the license files 90 in the installation information management table 427. That is, respective product IDs and versions of the distribution packages recorded in the distribution package information files are registered in corresponding product ID fields and version fields of the installation information management table 427. The product ID of the function package of the installation information management table 427 registers a product ID recorded on the function package information file stored in the function package contained in each of the distribution packages. Further, the activation flag field of the installation information management table 427 includes a value indicating that the distribution package has been already activated. The license expiration date field of the installation information management table 427 includes the expiration date recorded in the license file 90.

Subsequently, the installation section 421 stores the license file stored in the temporary storage region and the distribution package in a predetermined storage region (folder) to make the distribution package ready for use.

Note that the license file 90 is utilized for a license examination carried out by the license examination section 424 when the functional package contained in the distribution package is activated. That is, the license examination section 424 activates the function package if there is a license file 90 corresponding to the distribution package to which the function package subject to activation is attributed, if the apparatus number of the license file matches the apparatus number of the image forming apparatus 40 in which the function package is subject to activation, and if the validation period of the license file 90 is not expired. Otherwise, the license examination section 424 does not allow the function package to be activated. However, the license examination carried out by the license examination section 424 may alternatively be carried out based on the component management table 155.

Note that the user may be charged for the distribution package installed in the image forming apparatus 40 based on information contained in the license management table 121 that is regularly acquired from the activation server section 11 by the distribution management section 22 of the distribution server 20. More specifically, in the license management table 121, if there is a record having the license issuance date later than a previous charge, the user is charged for the license of the record having the license issuance date later than the previous charge.

As described above, in the first embodiment, the user may be able to easily carry out a sequence of operations including downloading the distribution package, the activation of the distribution package, and the installation of the distribution package by following sequentially displayed screens of the image forming apparatus 40 induced by the activation server section 11 or the component server section 15 of the license management server 10.

Further, the dependency relationship of the distribution package selected to be subject to installation is automatically verified, and the dependency package is also automatically selected to be subject to installation. Thus, the user may be able to install the distribution package without figuring out complicated dependency relationships between the distribution packages.

Further, the distributor of the commercial products (manufacturer's environment E2) may appropriately manage clients' utilization of the distribution packages. Specifically, the distributor of the commercial products may manage the clients' utilization of the distribution packages based on the license management table 121 by identifying a type of license arrangement used for each image forming apparatus 40 (apparatus number). Accordingly, if the distribution package includes bugs or if the distribution package is upgraded, the distributor of the commercial products may specify the image forming apparatuses 40 that utilize the same distribution package and providing appropriate post-sales support.

Further, since the license expiration date is not determined when the product is purchased (i.e., when the purchase of the product is applied to the distribution server 20) but is determined when the distribution package is installed (i.e., when the use of the license is started), handling of the license may be flexible. That is, after purchasing the commercial product, the user may install the purchased commercial product in her or his own time without having any disadvantage in terms of the license validation period of the purchased commercial product.

Further, a product key is issued for one commercial product associated with a group license. In this case, the user can install all the distribution packages attributed to the commercial product associated with the group by entering the above issued product key. Thus, the installation of the distribution packages attributed to the group may be facilitated.

Next, a license updating process is described. If the purchased commercial product has a time-limited license and the user desires to continue to use such a commercial product, the license validation period may be extended by carrying out the license updating process.

Figure 38:
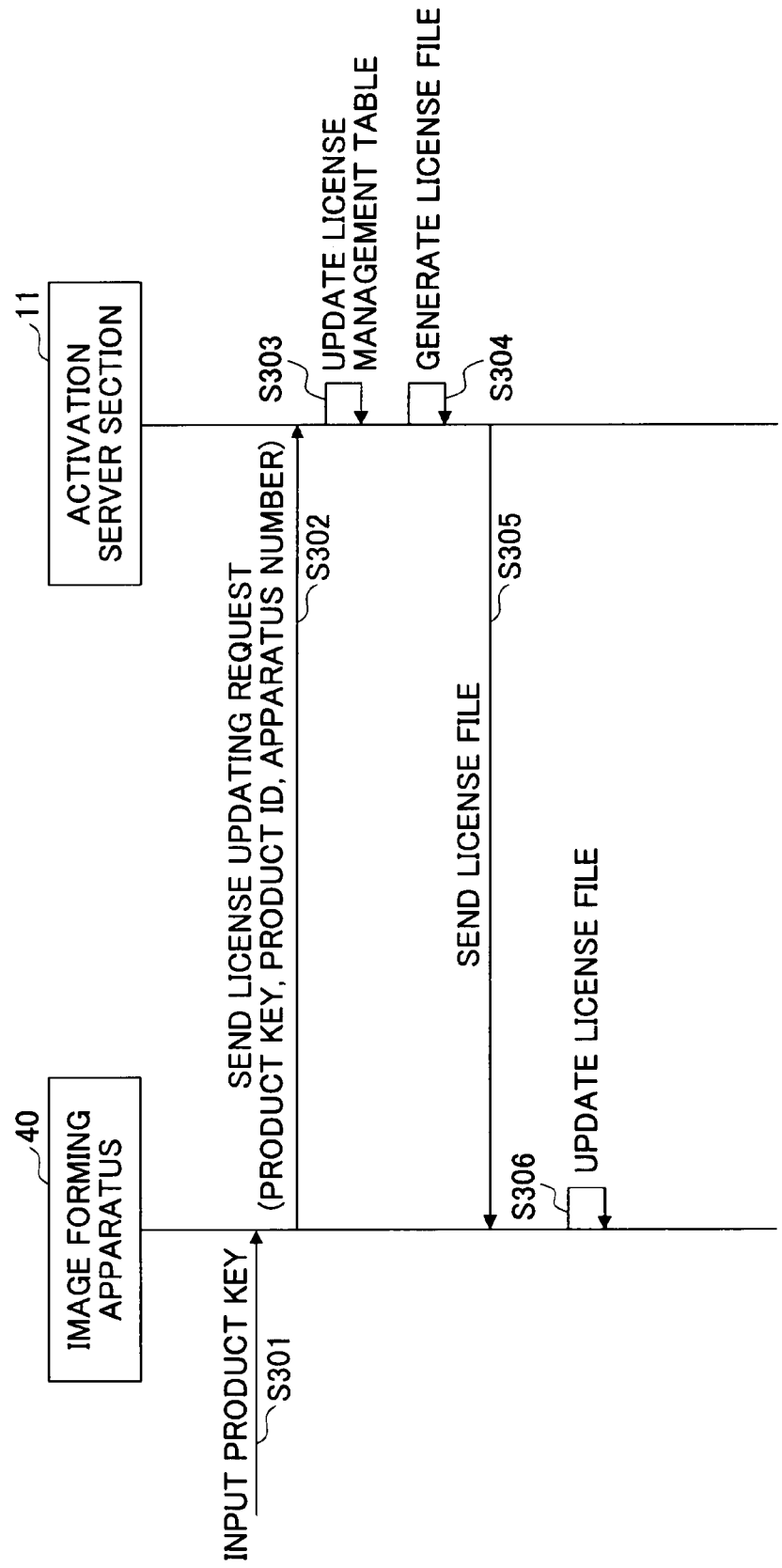
FIG. 38 is a sequence diagram illustrating a license updating process.

FIG. 38 is a sequence diagram illustrating the license updating process.

When the license is updated, the user selects an extended function management menu 513 in the extended function setting menu screen 510 (see FIG. 23) displayed on the operations panel 45. The UI control section 426 displays an extended function management screen on the operations panel 45 when the user selects the extended function management menu 513.

FIG. 39 is a diagram illustrating a display example of the extended function management screen. As illustrated in FIG. 39, an extended function management screen 560 includes a distribution package list display region 561. The distribution package list display region 561 displays a list of the distribution packages (i.e., packages 1 through 4) installed in the image forming apparatus 40. Each of the distribution packages (i.e., packages 1 through 4) is provided with a check box. When the user selects (ticks) the check boxes of the distribution packages the licenses of which the user wishes to update and presses an "acquire/update license" button, the UI control section 426 displays a license acquisition/updating screen the operations panel 45.

FIG. 40 is a diagram illustrating a display example of the license acquisition/updating screen. A license acquisition/updating screen 570 includes a product key input field 572 for inputting the product key corresponding to the ticked distribution package in the extended function management screen 560. When the user inputs the product key in the product key input field 572 and presses an "OK" button 571 (step S301), the license updating section 422 specifies the product key, the product ID of the distribution package subject to updating, and the apparatus number of the image forming apparatus 40 recorded on the ROM 413 or the HDD 414 and sends a license updating request (i.e., new license file generation request) to the license issuing section 115 of the activation server section 11 (step S302).

On receiving the license updating request, the license issuing section 115 updates the license management table 121 (step S303). Specifically, if the license arrangement of a record corresponding to the specified product key, product ID, and apparatus number has the time-limited license, the license issuing section 115 updates the license expiration date and the license issuance date of the record in the license management table 121. Further, if the record in the license management table 121 has the "check-in" status, the license issuing section 115 updates the "check-in" status of the record with a "check-out" status. In this process, a new license expiration date is computed by adding the license validation period to one of the registered license expiration date (i.e., old license expiration date registered in the license management table 121) and the current date that has the latest date. In addition, a new license issuance date of the record is determined as the current date (Date/Year). Note that if plural product IDs are specified, records corresponding to the plural product IDs in the license management table 121 are updated.

Subsequently, the license issuing section 115 generates a new license file (see FIG. 32) containing the product ID, the apparatus number, and the license expiration date corresponding to each of the updated records (i.e., each of the distribution packages subject to updating) in the license management table 121 (step S304).

Subsequently, the license issuing section 115 sends the generated new license file to the installation section 422 as a response (step S305). The license updating section 422 deletes the existing license file 90 corresponding to the distribution package subject to license updating, and stores the received new license file in a predetermined storage region of the HDD 414. The license issuing section 422 updates the installation information management table 427 based on the received new license file (step S306). Specifically, the license issuing section 422 updates the license expiration date corresponding to the product ID recorded in the existing (old) license file 90 with a new (computed) license expiration date recorded in the new license file 90. Further, the license issuing section 422 changes the activation flag of the record into a value indicating that the distribution package has been already activated.

With the above process, the user is allowed to use the same distribution package until the new (updated) license expiration date.

Note that the license updating may be charged in the same manner as the installation charge. That is, the user may be charged for updating of the distribution package installed in the image forming apparatus 40 based on information contained in the license management table 121 that is regularly acquired from the activation server section 11 by the distribution management section 22 of the distribution server 20. More specifically, in the license management table 121, if there is a record having the license issuance date later than a previous charge, the user is charged for the license of the record having the license issuance date later than the previous charge.

Next, an upgrading of the distribution package (a distribution package upgrading process) is described. The user may upgrade the purchased distribution package with an upgraded version of the corresponding distribution package if the license of the purchased distribution package is still valid.

Figure 41:
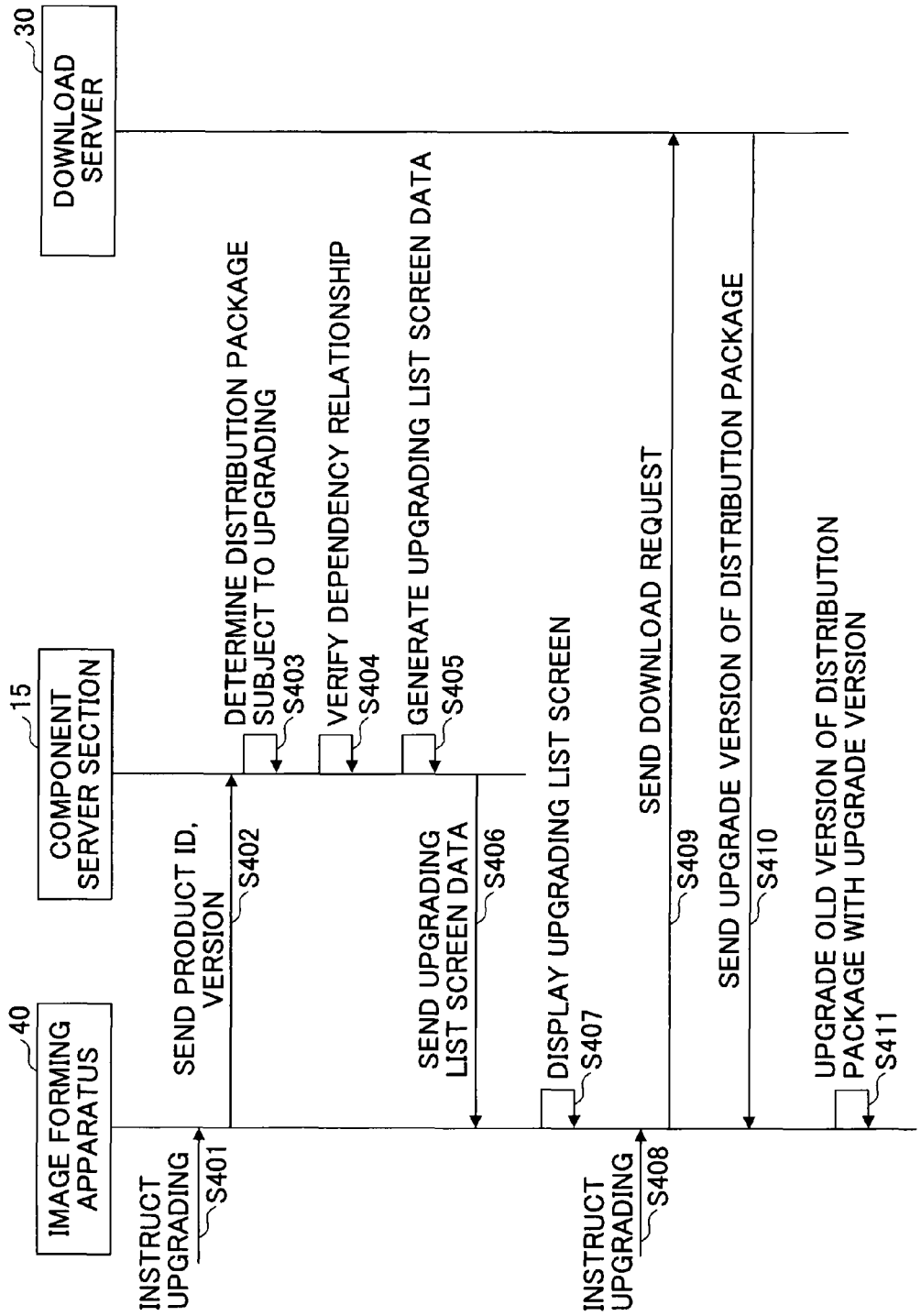
FIG. 41 is a sequence diagram illustrating a distribution package upgrading process.

FIG. 41 is a sequence diagram illustrating the distribution package upgrading process. When the user selects an "upgrade" menu 512 in the extended function setting menu screen 510 displayed on the operations panel 45 (step S401), the package upgrading section 423 specifies the product ID and the version of the distribution package installed in the image forming apparatus 40 and sends a distribution package upgrading request to the package upgrade supporting section 153 of the component server section 15 (step S402). Note that the specified product ID and the version of the distribution package are acquired from the installation information management table 427.

The package upgrade supporting section 153 determines candidate distribution packages subject to upgrading based on the specified product ID and version of the distribution packaged in the received distribution package upgrading request and the component management table 155 (step S403). Specifically, the package upgrade supporting section 153 determines whether there are distribution packages (product IDs) registered in the component management table 155 that have a version newer than the received version of the distribution packaged contained in the received distribution package upgrading request. If there are distribution packages having the version newer than the received version found in the component management table 155, the package upgrade supporting section 153 acknowledges the found distribution packages as the candidate distribution packages subject to upgrading.

Subsequently, the package upgrade supporting section 153 causes the dependency relationship determination section 151 to verify the dependency relationship of the candidate distribution packages subject to upgrading (Step S404). Note that although the dependency relationship of the candidate distribution packages subject to upgrading has been already verified during the installation of the same distribution packages, the verification of the dependency relationship is carried out again when upgrading. This is because the dependency relationship between the distribution packages may be altered due to upgrading of the distribution packages. Note that the verification of the dependency relationship in step S404 may be carried out in the same manner as that carried out during the installation (see FIG. 33).

If there is no dependency relationship interference of the candidate distribution package, the package upgrade supporting section 153 generates upgrading list screen data to display an upgrade list screen for selecting one or more distribution packages from a list of candidate distribution packages subject to upgrading in the upgrade list screen (S405). Subsequently, the package upgrade supporting section 153 sends the upgrading list screen data to the package upgrading section 423 as a response (step S406). Note that if there is the dependency relationship interference regarding the candidate distribution packages, the confirmation screen data similar to that generated when installation may be generated for the candidate distribution packages subject to upgrading and the generated confirmation screen data are sent to the package upgrading section 423 as a response.

Subsequently, the package upgrading section 423 inputs the received upgrading list screen data into the UI control section 426. The UI control section 426 displays the upgrading list screen on the operations panel 45 based on the upgrading list screen data (step S407).

FIG. 42 is a diagram illustrating a display example of the upgrading list screen. As illustrated in FIG. 42, an upgrading list screen 580 includes an upgrading package list display region 581. The upgrading package list display region 581 includes a list of distribution packages that have upgraded versions available (candidate distribution packages subject to upgrading). Each of the candidate distribution packages subject to upgrading (i.e., upgrading packages 1 through 4) is provided with a check box.

When the user selects (ticks) the check boxes of the candidate distribution packages subject to upgrading and presses an "upgrade" button 582 (step S408), the package upgrading section 423 specifies a URLs corresponding to the candidate distribution packages subject to upgrading and sends a download request for downloading the upgrade versions of the distribution packages to the download processing section 31 of the download server 30 (step S409).

Specifically, the upgrading list screen data include the URLs of the corresponding candidate distribution packages subject to upgrading. Further, the "upgrade" button 582 is associated with a sending instruction of the download request that specifies the URLs of the selected (ticked) candidate distribution packages subject to upgrading in the upgrading package list display region 581.

Subsequently, the download processing section 31 acquires the distribution packages identified by the URLs specified in the received download request from the distribution package management section 32, and transfers the acquired distribution packages to the package upgrading section 423 (step S410). The package upgrading section 423 upgrades old versions of the distribution packages with new versions of the corresponding distribution packages by storing the received distribution packages in the predetermined storage region in the HDD 414. Further, the package upgrading section 423 updates the installation information management table 427 based on the product IDs and the versions recorded in the distribution package information files stored in the received distribution packages). Specifically, the package upgrading section 423 updates values of the versions corresponding to the product IDs in the installation information management table 427.

Figure 43:
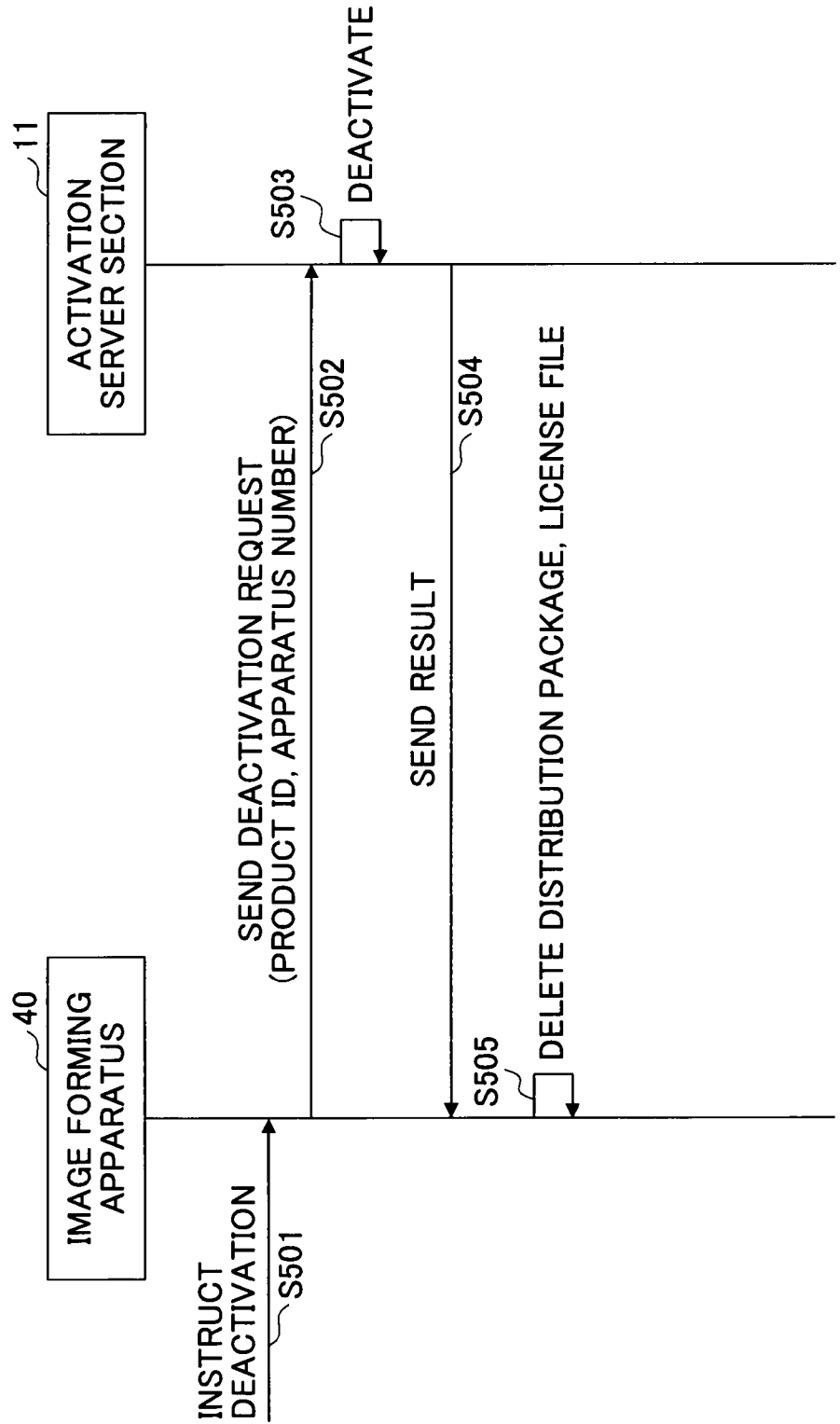
FIG. 43 is a sequence diagram illustrating a deactivation process.

Next, a deactivation process is described. FIG. 43 is a sequence diagram illustrating the deactivation process.

In step S501, the apparatus deactivation section 425 receives a deactivation instruction input from the user (step S501). The deactivation instruction is input from the user via the extended function management screen 560 (see FIG. 39). That is, when the user selects (ticks) one or more distribution packages subject to deactivation in the distribution package list display region of the extended function management screen 560 and presses the "cancel license" button 563, the apparatus deactivation section 425 acknowledges the selected distribution packages as those subject to deactivation.

Subsequently, the apparatus deactivation section 425 specifies the product IDs of the selected distribution packages subject to deactivation and the apparatus number of the image forming apparatus 40 and sends a deactivation request (i.e., a license cancellation request) to the server deactivation section 116 of the activation server section 11 (step S502). The server deactivation section 116 changes the "check-out" statuses of the records corresponding to the specified product IDs and apparatus numbers to the "check-in" statuses, that is, information indicating that the licenses of the distribution packages corresponding to the specified product IDs and apparatus numbers being not used. Note that the deactivation is carried out on the licenses of the records having the "check-out" statuses. Thus, if the status of the record subject to deactivation is not "check-out" status, the server deactivation section 116 determines that the deactivation has failed.

Subsequently, the server deactivation section 116 sends the result of the deactivation process (whether the deactivation has been carried out) to the apparatus deactivation section 425 of the image forming apparatus 40 as a response (step S504). If the deactivation process has been successful, the apparatus deactivation section 425 deletes the distribution package subject to deactivation and its associated license file 90 from the HDD 414 (step S505). Further, the apparatus deactivation section 425 also deletes the record corresponding to the distribution package that has been deactivated from the installation information management table 427.

With this process, the function package contained the corresponding distribution package is disabled. Further, since the activation of the license of this distribution package has been cancelled, the license of the distribution package is available in the image forming apparatus 40.

Thus, the distribution package on which the deactivation process has been carried out may be used if the license of the distribution package is still within the license validation period. That is, the deactivation process is particularly effective if the user wishes to transfer the license of the distribution package in one image forming apparatus, a lease period of which has been terminated, to another image forming apparatus 40.

Further, the deactivation process may automatically be executed when license expiration of the distribution package has been detected.

Figure 44:
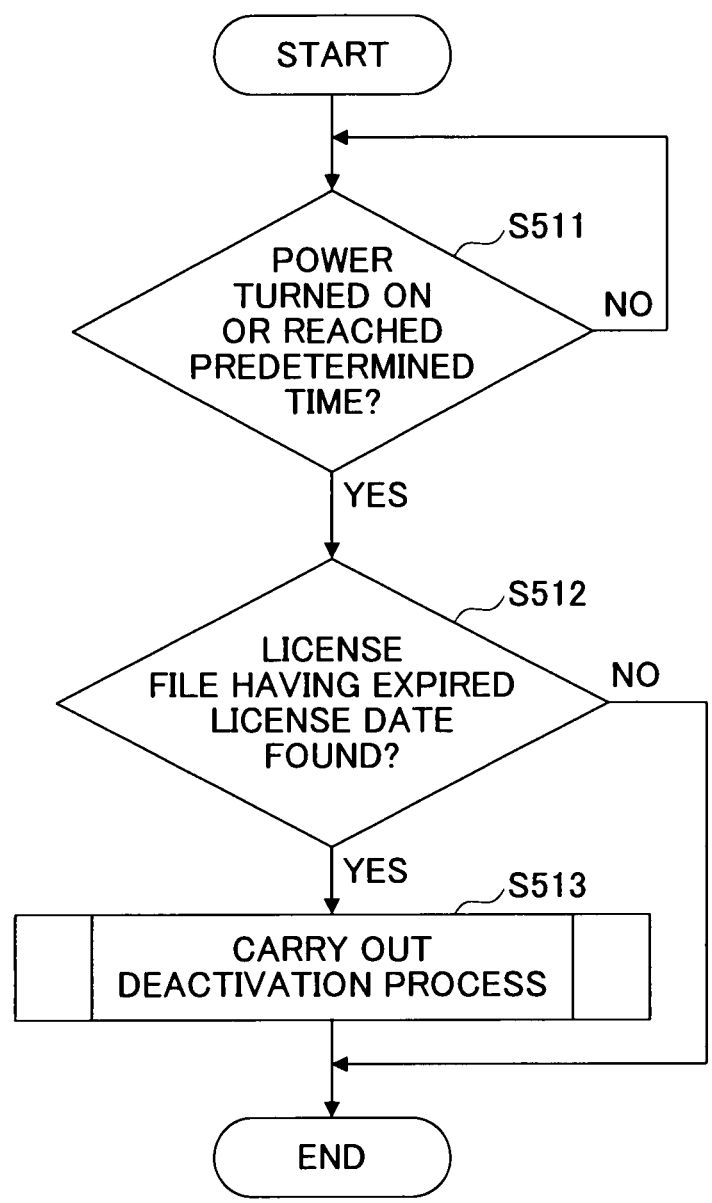
FIG. 44 is a flowchart illustrating an automatic execution of a deactivation process carried out in the image forming apparatus.

FIG. 44 is a flowchart illustrating an automatic execution of the deactivation process carried out in the image forming apparatus 40.

Foe example, when the power of the image forming apparatus 40 is turned on or when it comes to a determined set time (Yes in step S511), the apparatus deactivation section 425 checks the expiration dates of all the license file 90 stored in the HDD 414 of the image forming apparatus 40 (step S512). Specifically, the apparatus deactivation section 425 compares the expiration date of each of the license files 90 with a current time to determine whether there are any license files 90 that have an expired license date. If there are the license files 90 that have an expired license date (Yes in step S512), the apparatus deactivation section 425 executes the deactivation process illustrated in FIG. 43 on the distribution packages corresponding to the product IDs recorded in the license files 90 (step S513).

As described in the above first embodiment, the user can simply follow the instructions displayed on the image forming apparatus 40 to carry out updating of the license of the distribution package, upgrading of the distribution package and deactivation of the distribution package.

Further, since the license and entity of the distribution package are separated, it is possible to flexibly manage the distribution package such as updating the license alone or upgrading the distribution package alone.

Figure 45:
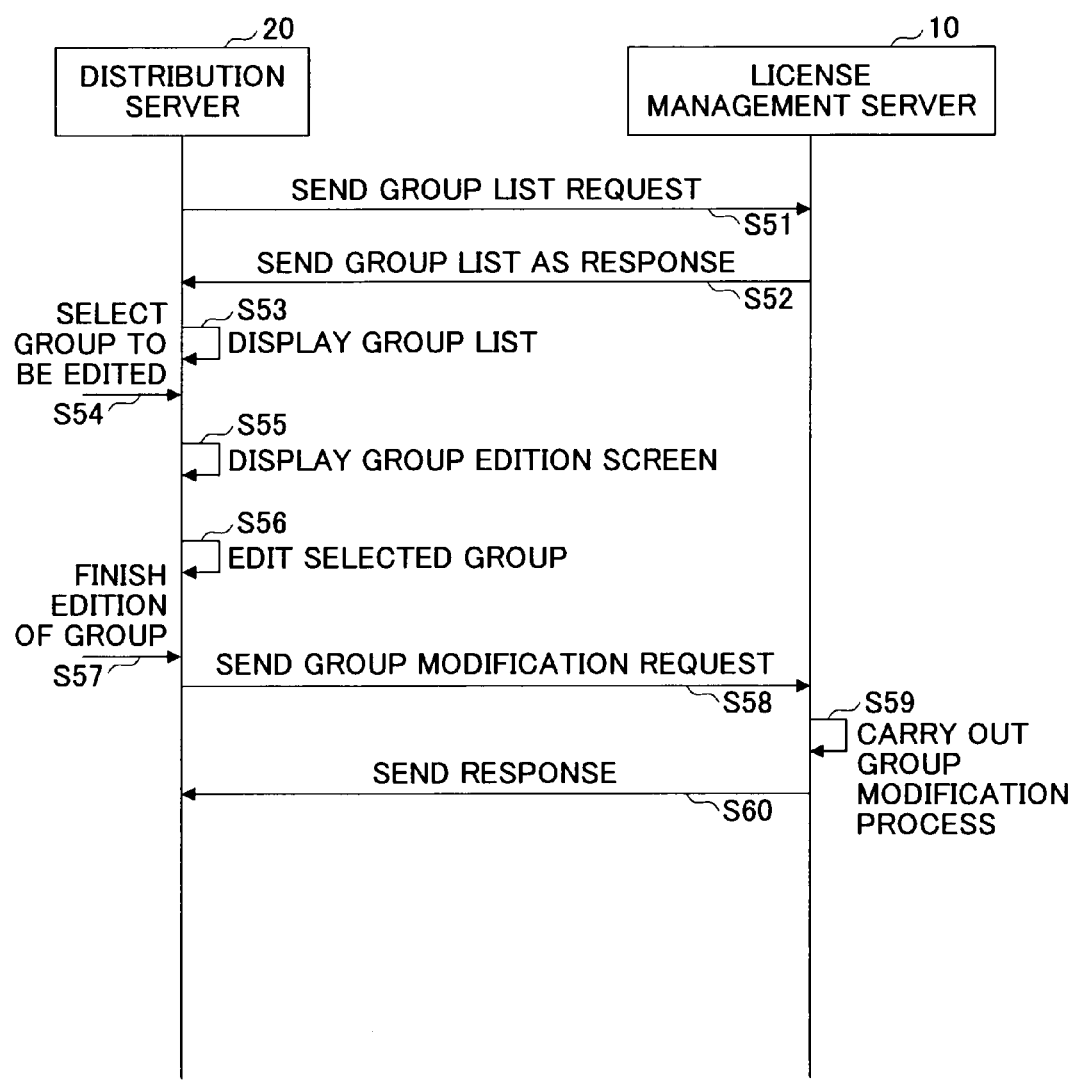
FIG. 45 is a sequence diagram illustrating a group edition process.

Next, a detail of editing of the registered group configuration is described. FIG. 45 is a sequence diagram illustrating a group editing process.

For example, when the administrator of the distribution site inputs a group configuration modification start instruction in the distribution server 20, the commercial product registration section 21 of the distribution server 20 sends a group list information acquisition request to the distribution server cooperative section 111 of the distribution server 11 (step S51). The distribution server cooperative section 111 acquires, on receiving the group list information acquisition request from the commercial product registration section 21, group list information from the group ID master 120 and the group name master 122. The distribution server cooperative section 111 then sends the acquired group list information to the commercial product registration section 21 as a response (step S52).

The commercial product registration section 21 displays a group list screen on the display device of the distribution server 20 based on the received group list information (step S53). When one or more groups are selected in the group list screen to instruct the editing of the groups (step S54), the commercial product registration section 21 displays the selected groups in the group edition screen 220 (FIG. 16) as the groups subject to editing (step S55). Specifically, the group IDs and group names of the selected groups are displayed in regions 221 and 222 of the displayed group edition screen 220.

Subsequently, the editing of the group configuration is carried out, such as addition of the distribution package to the group or deletion of the distribution package from the group. After the editing of the group configuration is finished and the "end edition" button (see FIG. 16) is clicked (step S57), the commercial product registration section 21 sends the group configuration modification request to the distribution server cooperative section 111 of the activation server section 11 (step S58). The group configuration modification request contains parameters of group IDs and group names of the group subject to editing, group configuration information after modification (i.e., product IDs of the distribution packages attributed to the group), the domain name, as well as the domain name, the distribution site ID, and the password stored in the storage of the distribution server 20. The distribution server cooperative section 111 carries out a group configuration modification process based on the received group configuration modification acquisition request (step S59). Specifically, the distribution server cooperative section 111 updates the group configuration information recorded in the group ID master 120 with the group configuration information contained in the group configuration modification request. After carrying out the group configuration modification process, the distribution server cooperative section 111 sends a response indicating whether the group configuration modification process is successfully finished to the commercial product registration section 21 (Step S60).

Figure 46:
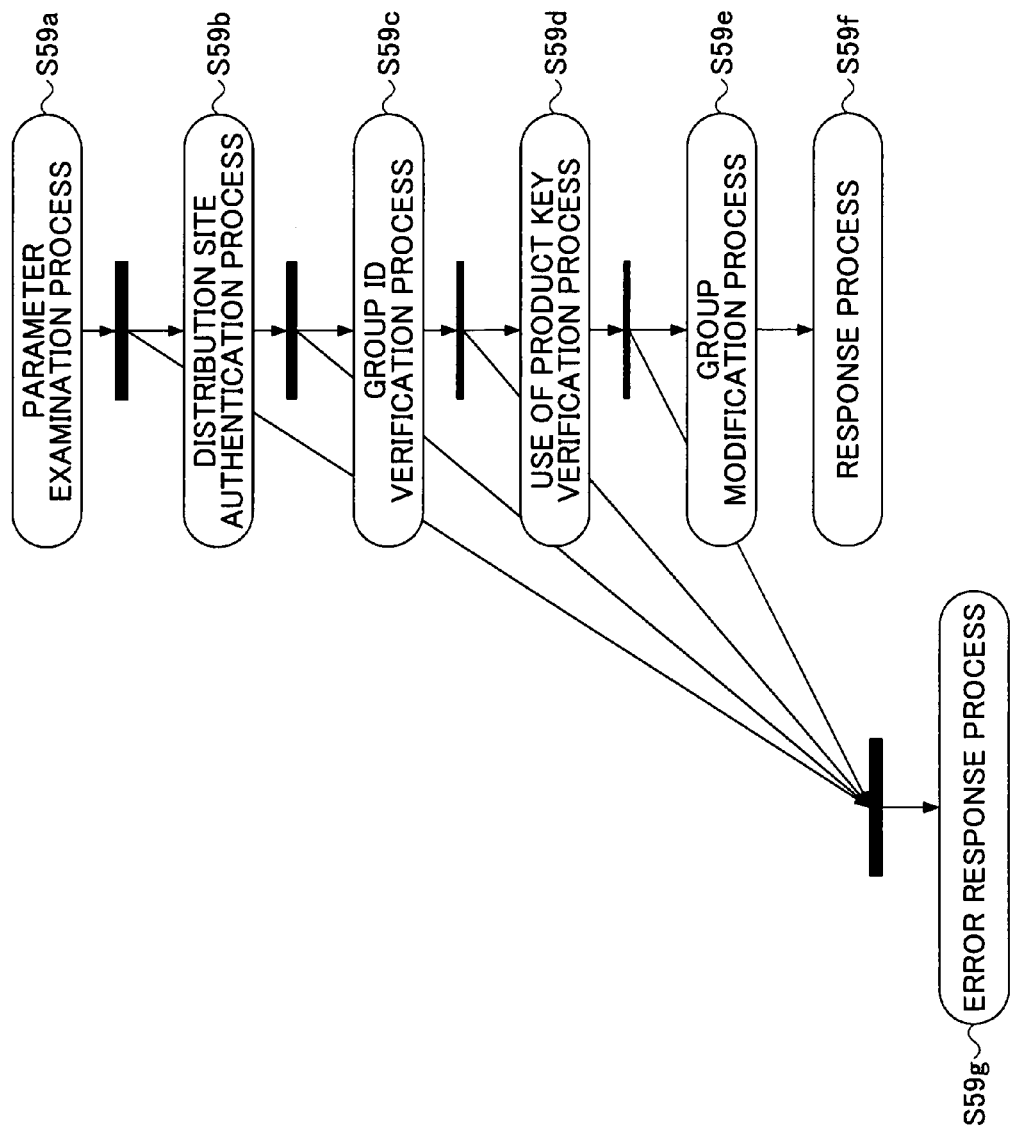
FIG. 46 is a diagram illustrating a group alteration process.

Next, a detail of step S59*a* is described. FIG. 46 is a sequence diagram illustrating the group configuration modification process. Steps S59*a* and S59*b* in FIG. 46 are similar to steps S40*a* and S40*b* illustrated in FIG. 17.

Subsequently, the distribution server cooperative section 111 verifies whether the records containing the group IDs of the distribution packages and the corresponding distribution site IDs in the group configuration modification request has already been registered in the group ID master 120 (step S59*c*). If the records are registered in the group ID master 120, the distribution server cooperative section 111 verifies whether any of the product keys (licenses) of the commercial products associated with the group are in use (step S59*d*). More specifically, the product IDs of the distribution packages attributed to the group are acquired from the group ID master 120 based on the group IDs contained in the group configuration modification request. Subsequently, the distribution server cooperative section 111 verifies whether the licenses associated with the acquired product IDs of the distribution packages are already in use based on the license management table 121 (see FIG. 20). Whether the license of the corresponding distribution package is in use indicates whether the status of the distribution package is the "check-out" status. If the license of the corresponding distribution package is not in use, the distribution server cooperative section 111 updates the group configuration information of the group ID master 120 based on the received group configuration modification acquisition request (step S59*e*). Subsequently, the distribution server cooperative section 111 deletes the (old/already registered) product ID registered in the group ID master 120 corresponding to the group IDs and the distribution site IDs contained in the group configuration modification request and updates the (old/already registered) product ID with the (new) product ID contained in the group configuration modification request corresponding to the group ID and the distribution site ID.

Subsequently, the distribution server cooperative section 111 sends a response indicating that the group configuration modification has been successful to the commercial product registration section 21 (Step S59*f*). On the other hand, if the distribution server cooperative section 111 determines that there are no necessary parameters in step S59*a*, if authentication for the distribution server 20 has failed in step S59*b*, if the distribution server cooperative section 111 determines that the group ID and distribution site ID have not been registered in the group ID master 120 in step S59*c*, and if the distribution server cooperative section 111 determines that the product key associated with the group ID has been in use in step S59*d*, the distribution server cooperative section 111 sends an error response indicating that the group configuration modification has failed to the commercial product registration section 21 (Step S59*g*).

Note that if the license arrangement of the distribution package subject to modification is registered as a trial license in the license management table 121, and any of the licenses of the distribution packages attributed to the same group as that of the distribution package subject to modification, it is possible to permit editing of the group of the distribution package having the trial license (i.e., add a distribution package attributed to the same group). The distribution package having the trial license is provided as a "trial" to promote the purchase of the product by adding the trial distribution package to the group of the distribution packages, even if any of the licenses of the distribution packages may have been already in use.

Next, deletion of the group is described. When any of the groups selected in the group list screen displayed in step S53 of FIG. 45 is to be deleted, the commercial product registration section 21 sends a group deletion request containing the group ID and the corresponding distribution site ID of the selected group to the distribution server cooperative section 111 of the license management server 10. On receiving the group deletion request, the distribution server cooperative section 111 carries out a group deletion process illustrated in FIG. 47.

Figure 47:
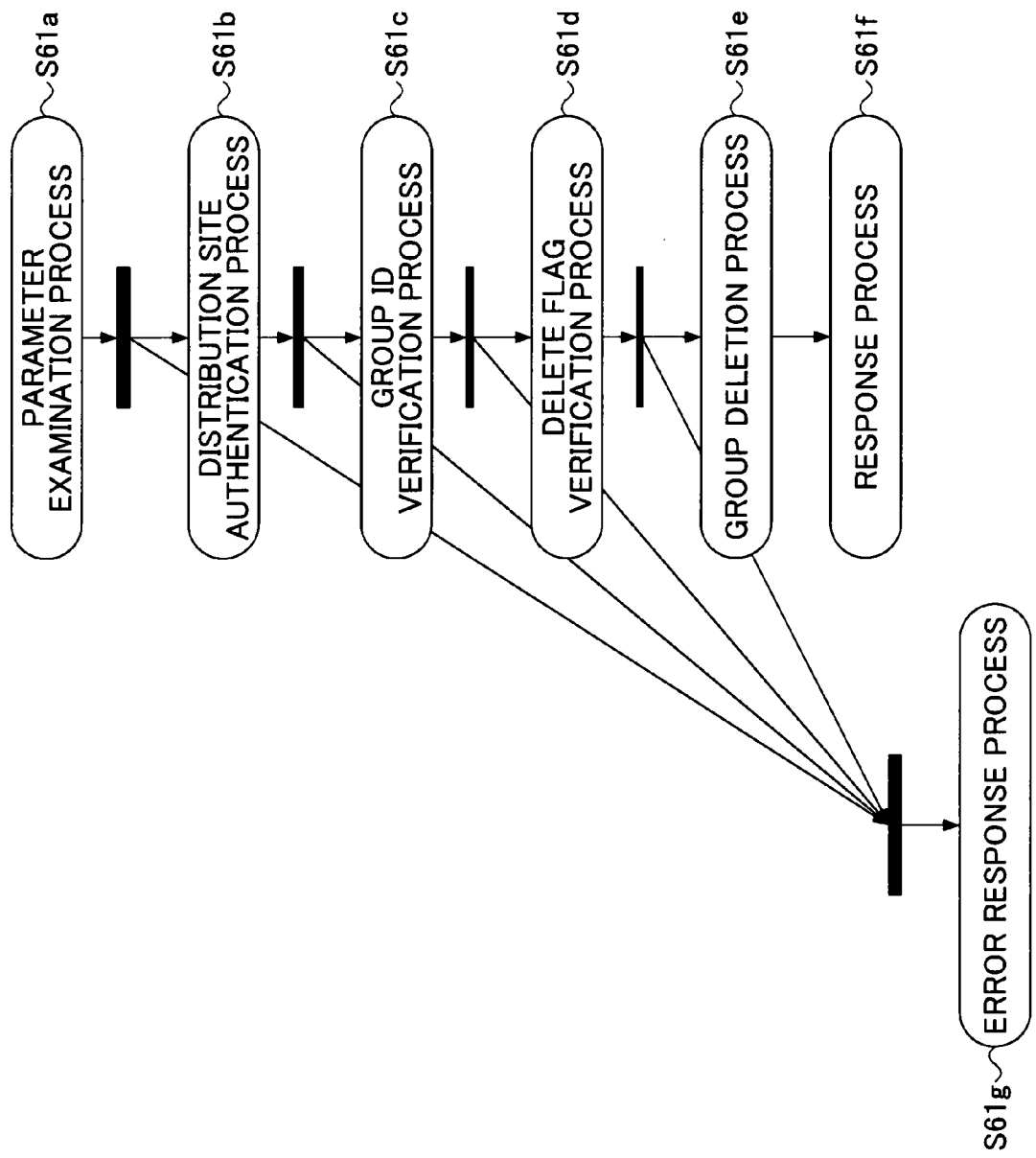
FIG. 47 is a diagram illustrating a group deletion process.

FIG. 47 is a sequence diagram illustrating the group deletion process. Steps S61*a* through S61*c* of FIG. 47 are similar to steps S59*a* through S59*c* in FIG. 46.

In step S61*d*, the distribution server cooperative section 111 determines whether it is possible to delete the selected group based on a deletion flag including the group ID and the corresponding distribution site ID contained in the group deletion request. Specifically, if the deletion flag is an "ON" status, the distribution server cooperative section 111 determines that it is possible to delete the group having the deletion flag is the "ON" status. If the deletion flag is an "OFF" status, the distribution server cooperative section 111 determines that it is not possible to delete the group having the deletion flag is the "OFF" status.

If the distribution server cooperative section 111 determines that it is not possible to delete the group, the distribution server cooperative section 111 updates the group ID master 120 based on the group deletion request (step S61*e*). Specifically, the distribution server cooperative section 111 deletes the record having the group ID and the corresponding distribution ID contained in the group deletion request from the group ID master 120. Further, the distribution server cooperative section 111 also deletes the record having the corresponding group ID from the group name master 122. Descriptions of steps S61*f* and S61*g* are omitted because they are clear from the descriptions of steps S59*f* and S59*g* illustrated in FIG. 46.

As described above, the group configuration may optionally be modified after the registration of the group based on a requirement of the distribution site. However, the modification of the group configuration may be restricted (prohibited) if any of the licenses of the distribution packages attributed to the same group is in use. Further, the deletion of the group may be restricted (prohibited) after the commercial product associated with the group is purchased. Thus, the management information associated with the group may be appropriately matched with the group state in the market.

Figure 48:
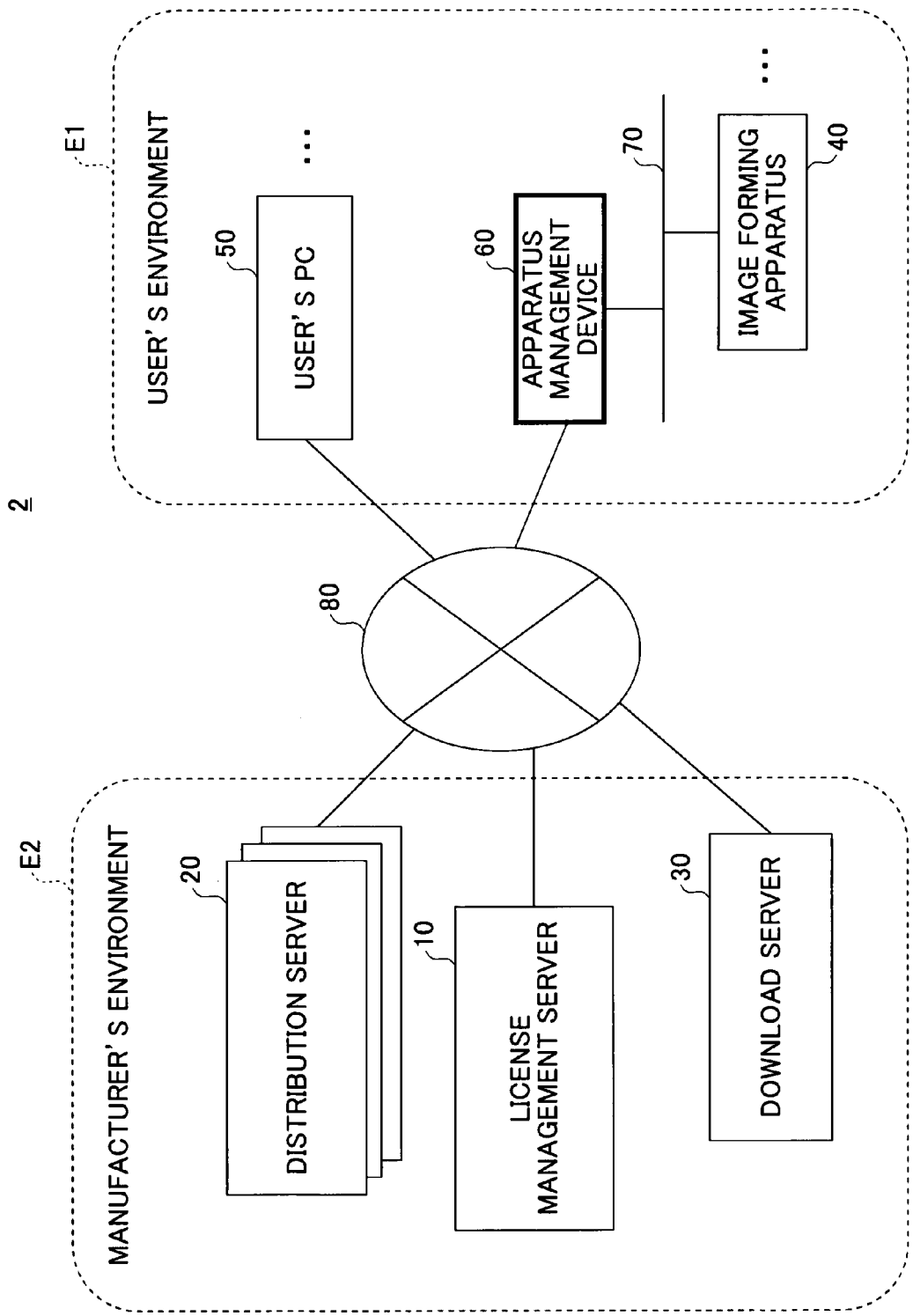
FIG. 48 is a diagram illustrating a configuration example of an apparatus management system according to a second embodiment.

Next, an apparatus management system according to a second embodiment is described. FIG. 48 is a diagram illustrating a configuration example of the apparatus management system according to the second embodiment. Components illustrated in FIG. 48 similar to those illustrated in FIG. 1 are provided with the same reference numerals and descriptions of the components are thus omitted.

In FIG. 48, an apparatus management device 60 is added to the user's environment E1. The apparatus management device 60 is a personal computer (PC) that carries out acquisition and introduction of the software components and their corresponding licenses (utilization authorization) in the image forming apparatus 40 all at once. A hardware configuration of the apparatus management device 60 may be the same as that illustrated in FIG. 6. However, the apparatus management device 60 includes a display device such as a liquid crystal display and input devices such as a keyboard and a mouse. The apparatus management device 60 is connected to each of the image forming apparatuses 40 via a network 70 (regardless of wired or wireless connection) such as a local area network (LAN). Note that the user's PC 50 may also be connected to the network 70. Further, the user's PC 50 may include the function of the apparatus management device 60.

Figure 49:
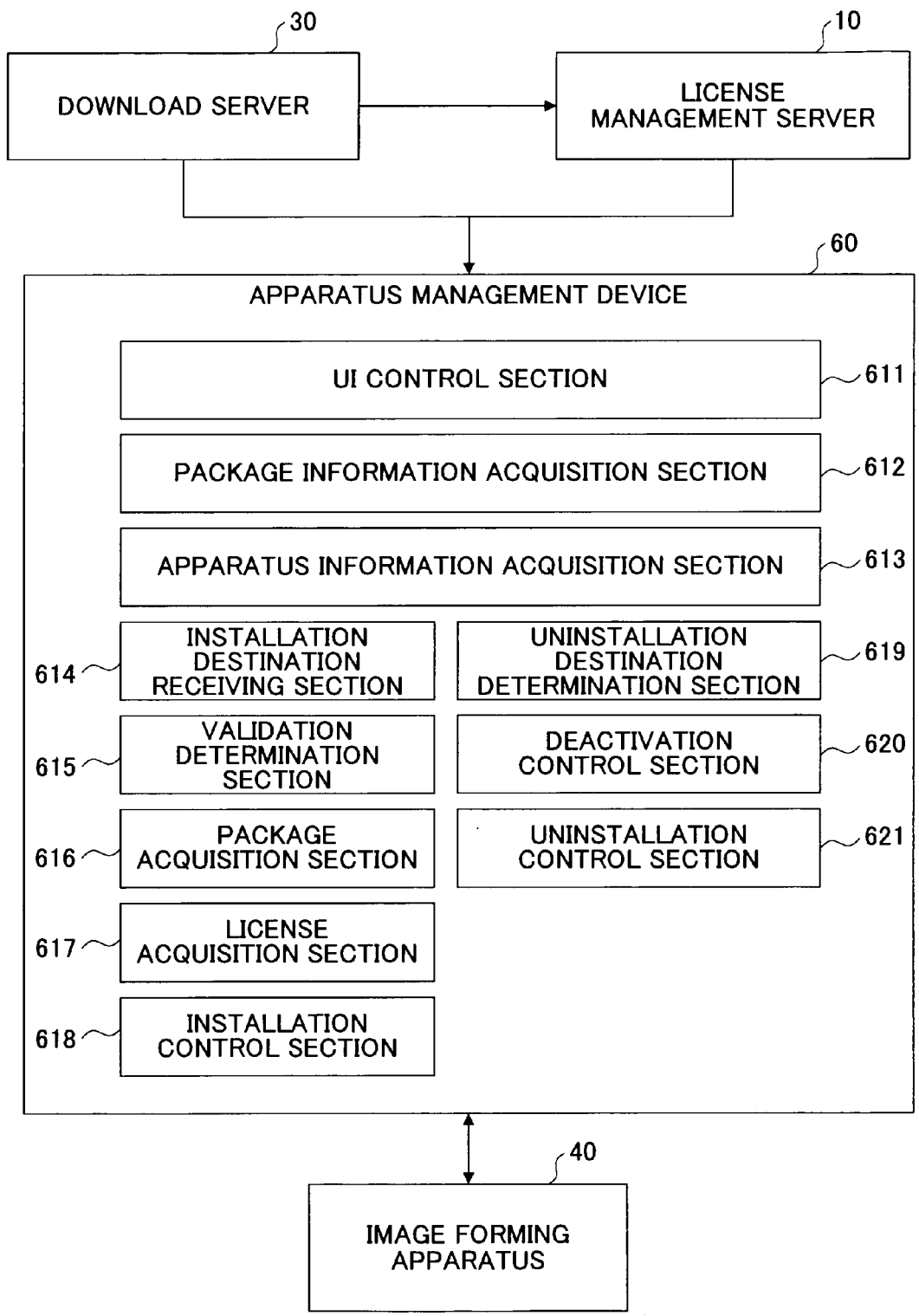
FIG. 49 is a diagram illustrating a functional configuration example of an apparatus management device according to the second embodiment.

FIG. 49 is a diagram illustrating a functional configuration example of the apparatus management device according to the second embodiment.

As illustrated in FIG. 49, the apparatus management device 60 includes a UI control section 611, a package information acquisition section 612, an apparatus information acquisition section 613, an installation destination receiving section 614, a validation determination section 615, a package acquisition section 616, a license acquisition section 617, an installation control section 618, an uninstallation destination determination section 619, a deactivation control section 620, and an uninstallation control section 621. These sections are implemented by causing a CPU of the apparatus management device 60 to execute computer programs installed in the apparatus management device 60.

The UI control section 611 receives instructions (e.g., to install or uninstall the distribution package) assigned by the user. The package information acquisition section 612 acquires configuration information of the distribution package subject to installation or uninstallation from the license management server 10. The apparatus information acquisition section 613 acquires apparatus information from the image forming apparatus 40. The apparatus information includes information on the distribution packages or firmware installed in the image forming apparatus 40. The installation destination receiving section 614 receives specifications of the image forming apparatus 40 as an installation destination of the distribution package. The validation determination section 615 causes the dependency relationship determination section 151 of the license management server 10 to verify the validity of installing the distribution package subject to installation in the image forming apparatus 40.

The package acquisition section 616 downloads (acquires) the distribution package subject to installation from the download server 30. The license acquisition section 617 acquires the license file 90 associated with the distribution package subject to installation from the license management server 10. The installation control section 618 sends the downloaded distribution package and the acquired license file 90 associated with the downloaded distribution package to the image forming apparatus 40.

The uninstallation destination determination section 619 determines the image forming apparatus 40 to which the distribution package subject to uninstallation is installed. The deactivation control section 620 sends a license deletion request of the license file 90 to the image forming apparatus 40 to request the license management server 10 to cancel the license associated with the license file 90. The uninstallation control section 621 requests the image forming apparatus 40 to uninstall the distribution package.

Note that the functional configurations of the license management server 10, the download server 30, the image forming apparatus 40, and the like may be similar to those according to the first embodiment.

Figure 50:
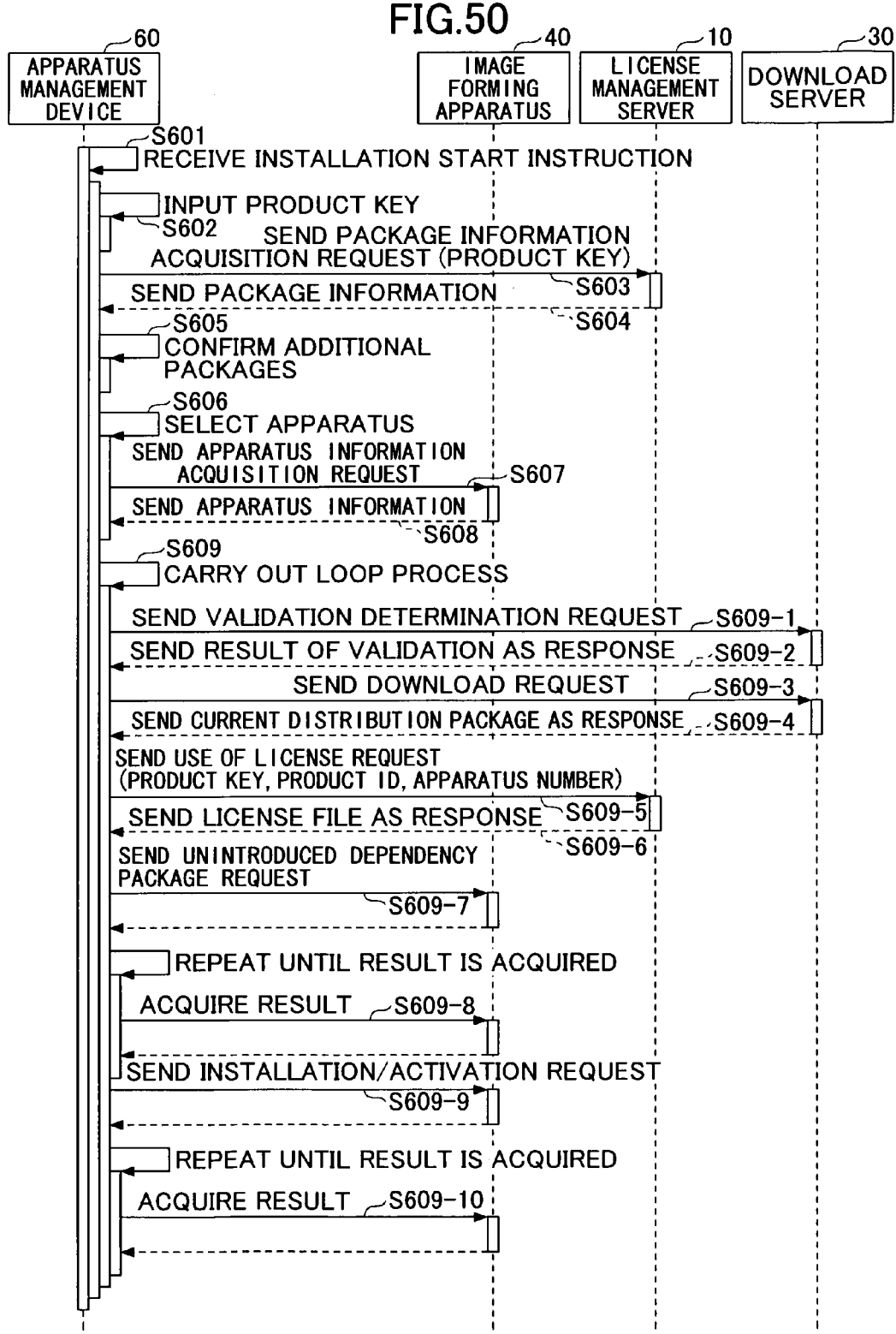
FIG. 50 is a sequence diagram illustrating an installation process and an activation process of the installed package according to the second embodiment.

A process of an apparatus management system is described as follow. FIG. 50 is a sequence diagram illustrating an installation and an activation process of the installed package according to the second embodiment. In FIG. 50, the user of the image forming apparatus 40 has already purchased any of the commercial products associated with the distribution packages and corresponding product keys of the purchased commercial products. The commercial products and the corresponding product keys may be purchased in the same manner illustrated in the first embodiment. Note that in FIG. 50, the user operates the apparatus management device 60.

The UI control section 611 of the apparatus management device 60 displays, on receiving the installation start instruction input for installing the distribution package, the product key input screen on the display device via an initial (default) screen displayed on the display device (step S601). When the user inputs the product key of the distribution package subject to installation (hereinafter simply called a "current distribution package") via the product key input screen (step S602), the package information acquisition section 612 specifies the input product key and sends a package information acquisition request associated with the product key to the installation supporting section 152 of the license management server 10 (step S603).

On receiving the package information acquisition request, the installation supporting section 152 of the license management server 10 causes the product key verification section 113 to verify the validation of the product key by following similar processes in steps S153 through S155 illustrated in FIG. 22.

When the product key is verified as valid, the installation supporting section 152 acquires information registered corresponding to the received product key from the component management table 155 (see FIG. 26), and sends the acquired package information as package information to the package information acquisition section 612 as a response (step S604). Thus, the package information at least contains the product ID associated with the received the product key (i.e., the product ID of the current distribution package). Further, if the received product key is associated with the group license or the volume license, the package information contains plural product IDs (associated with plural records).

When the package information acquisition section 612 receives the package information, the UI control section 611 of the apparatus management device 60 displays a confirmation screen containing the received package information to allow the user to confirm contents of the current distribution package and the license corresponding to the current distribution package (step S605).

When the user inputs an installation operation continuation instruction (e.g., presses an "OK" button in the confirmation screen), the installation destination receiving section 614 displays an apparatus selection screen including a list of the image forming apparatuses 40 on the display device for the user to select one of the image forming apparatuses 40 to install the current distribution package in the selected image forming apparatus 40 (step S606). The user may select two or more image forming apparatuses 40 in the apparatus selection screen. Note that in the apparatus selection screen, the image forming apparatuses that have corresponding IP addresses and host names recorded in the storage device may be displayed. Alternatively, the apparatus information acquisition section 613 issues a broadcast or the like over the network 70 to search for the image forming apparatuses 40 connected to the network 70 and the host names or the like of the found image forming apparatuses 40 may be displayed in the apparatus selection screen.

Subsequently, the apparatus information acquisition section 613 sends an apparatus information acquisition request to the image forming apparatuses 40 selected in the apparatus selection screen (step S607). The installation section 421 of each of the image forming apparatuses 40 that have received the apparatus information acquisition request acquires information recorded in the installation information management table 427 (see FIG. 28) and sends the acquired information including the apparatus number of the image forming apparatus 40 as the apparatus information to the apparatus information acquisition section 613 as a response (step S608).

In a subsequent step S609, a loop process is carried out for each of the selected image forming apparatuses 40 (selected in the apparatus selection screen) whose apparatus information is acquired. In the loop process, the image forming apparatus 40 subject to the loop process is hereinafter called a "current apparatus".

In step S609-1, the validation determination section 615 sends a validation determination request containing apparatus information of the current apparatus and the package information acquired by the package information acquisition section 612 to the license management server 10. The "validation" indicates the validation to install the function package contained in the current distribution package in the current apparatus. On receiving the validation determination request, the dependency relationship determination section 151 of the license management server 10 determines (verifies) a dependency relationship associated with the current distribution package by carrying out a similar process illustrated in FIG. 33. If there is no dependency relationship interference associated with the current distribution package, the dependency relationship determination section 151 determines the installation of the current distribution package into the current apparatus as valid. If, on the other hand, there is a dependency relationship interference associated with the current distribution package, the dependency relationship determination section 151 determines the installation of the current distribution package into the current apparatus as invalid.

Subsequently, the image delivery section 151 sends a result of the validation to the validation determination section 615 as a response (S609-2). If the dependency relationship determination section 151 determines the installation of the current distribution package into the current apparatus as valid and a dependency package is not installed in the current apparatus, the result of the validation contains information on the dependency package (hereinafter also called an "unintroduced dependency package") recorded in the component management table 155. The (existence of) information on the dependency package indicates an unintroduced dependency package acquisition instruction.

On receiving the validation result indicating the installation of the current distribution package in the current apparatus as valid, the package acquisition section 616 sends a current distribution package download request to the download server 30 based on a download path (URL) contained in the package information of the current distribution package (step S609-3). On receiving the download request, the download processing section 31 acquires the distribution package identified by the URL specified by the download request from the distribution package management section 32, and transfers the acquired distribution package to the package acquisition section 616 as a response (step S609-4). If there are plural current distribution packages, the download processes carried out in steps S609-3 and S609-4 are repeated. Further, the validation result contains the unintroduced dependency package information in step S609-2, the down load processes may also be carried out on the unintroduced dependency package. Note that a case where the plural current distribution packages include cases where those having a product key input in step S601 that is associated with the group license or where plural product keys are input in step S601.

Subsequently, the license acquisition section 617 specifies the product key input in step S601, the product ID of the current distribution package, and the apparatus number of the current apparatus and sends a use of license request to the license management server 10 (step S609-5).

The license issuing section 115 of the license management server 10 carries out the process similar to that illustrated in FIG. 35 to generate the license file 90 and sends the generated license file 90 to the license acquisition section 617 as a response (step S609-6).

Note that if the package acquisition section 616 (acquires) downloads the distribution package successfully, the license acquisition section 617 carries out the step S609-5. That is, if the package acquisition section 616 fails to acquire (download) the distribution package, the license acquisition section 617 does not receive the license file 90. If the package acquisition section 616 fails to acquire the distribution package, the distribution package is unable to be installed. This is because if the license acquisition section 617 acquires the license file 90 despite the fact that the package acquisition section 616 fails to acquire the distribution package, the license of the distribution package that is practically not used may become in use, which brings a disadvantage to the user.

Subsequently, if the unintroduced dependency package is acquired in step S609-4, the installation control section 618 sends the unintroduced dependency package and an unintroduced dependency package installation request to the current apparatus to install the unintroduced dependency package into the current apparatus (step S609-7). The installation section 421 of the current apparatus installs the unintroduced dependency package in the current apparatus and records the package information (e.g., product ID) of the unintroduced dependency package in the installation information management table 427.

Subsequently, the installation control section 618 inquires of the current apparatus about an installation result of the unintroduced dependency package (step S609-8). The inquiry (i.e., polling) is repeated until the installation of the unintroduced dependency package in the current apparatus is completed and the installation result is sent as a response.

The unintroduced dependency package is installed before the current distribution package to avoid installation failure of the current distribution package due to the fact that a dependency component is not installed.

Subsequently, the installation control section 618 sends the distribution package acquired in step S609-4 (i.e., current distribution package) and the license file 90 acquired in step S604-6 to the current apparatus as well as sending an installation request and an activation request for installing and activating the current distribution package to the current apparatus (step S609-9). The installation section 421 of the current apparatus carries out the installation process illustrated in FIG. 22 associated with the received distribution package and license file 90. As a result, the distribution package may be used in the current apparatus.

Subsequently, the installation control section 618 inquires of the current apparatus about an installation result of the distribution package (step S609-10). The inquiry (i.e., polling) is repeated until the installation of the distribution package in the current apparatus is completed and the installation result is sent as a response.

Next, an uninstallation and deactivation (cancellation of license) process of the distribution package is described.

Figure 51:
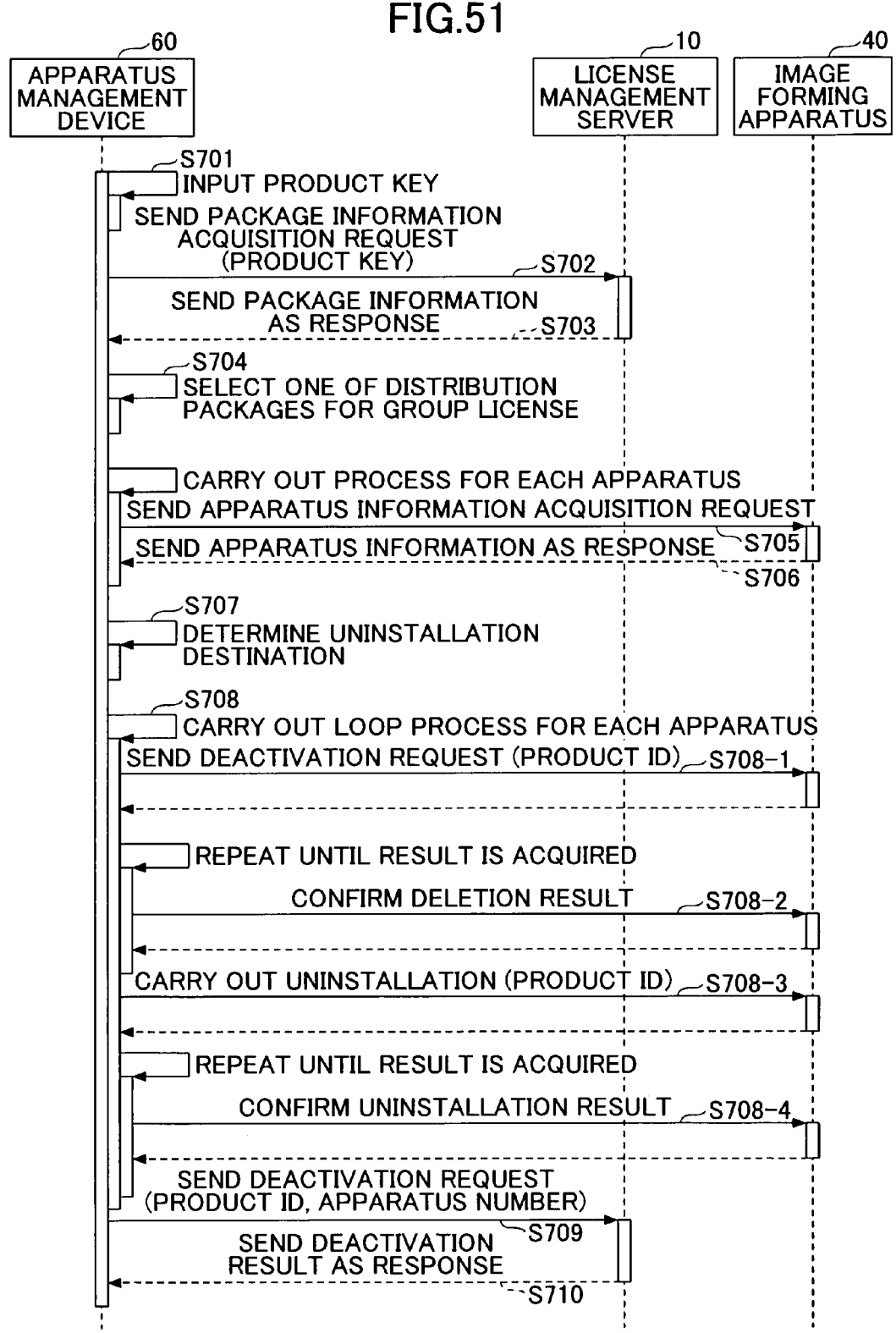
FIG. 51 is a sequence diagram illustrating a distribution package uninstallation process and a deactivation process according to the second embodiment.

FIG. 51 is a sequence diagram illustrating the uninstallation and deactivation process of the package according to the second embodiment.

In step S701, the UI control section 611 of the apparatus management device 60 receives the product key of the distribution package subject to uninstallation input by the user via an uninstallation screen displayed on the display device. Subsequently, the package information acquisition section 612 specifies the input product key and sends a package information acquisition request associated with the product key to the license management server 10 (step S702).

Subsequently, the component management section 154 of the license management server 10 carries out a process similar to that carried out in response to the step S603 illustrated in FIG. 50 and sends the package information of the distribution package corresponding to the received product key to the package information acquisition section 612 as a response (step S703). If the product key is associated with the group license, the component management section 154 of the license management server 10 sends the package information associated with plural distribution packages as a response.

If the product key is associated with the group license; that is, if the package information associated with the plural distribution packages is received, the UI control section 611 displays a distribution package selection screen including the distribution package list information for the user to select one of the distribution packages subject to uninstallation (step S704). The selected distribution package is hereinafter called a "current distribution package".

Subsequently, the apparatus information acquisition section 613 sends an apparatus information acquisition request to each of the image forming apparatuses 40 (step S705). On receiving the apparatus information acquisition request, the apparatus deactivation section 425 of each of the image forming apparatuses 40 acquires information recorded in the installation information management table 427 and sends the acquired information and the apparatus number of the corresponding image forming apparatus 40 as the apparatus information to the apparatus information acquisition section 613 (step S706).

Subsequently, the uninstallation destination determination section 619 matches the package information acquired in step S703 with the apparatus information of the image forming apparatus 40 acquired in step S706 to determine the image forming apparatus 40 (i.e., uninstallation destination) in which the distribution package associated with the package information is installed (step S707). Specifically, the image forming apparatus 40 associated with the apparatus information including the product ID (product ID of the distribution package) contained in the package information is determined as the image forming apparatus 40 (i.e., image forming apparatus 40 that is the uninstallation destination of the distribution package) in which the distribution package is installed.

The subsequent step S708 is a loop process executed for each image forming apparatus 40 that is the uninstallation destination of the distribution package. The image forming apparatus 40 subjected to the loop process is hereinafter called a "current apparatus".

In step S708-1, the deactivation control section 620 specifies the product ID of the current distribution package and sends a deactivation request (i.e., deletion request of the license file 90) to the current apparatus. On receiving the deactivation request, the apparatus deactivation section 425 of the current apparatus deletes the license file 90 associated with the specified product ID.

Subsequently, the deactivation control section 620 inquires of the current apparatus about a deletion result of the deactivation license file 90 (step S708-2). This inquiry (i.e., polling) is repeated until the deletion of the license file 90 from the current apparatus is completed and the deletion result is sent as a response.

Subsequently, the uninstallation control section 621 specifies the product ID of the current distribution package and sends an uninstallation request (i.e., deletion request of the distribution package) to the current apparatus (step S708-3). On receiving the uninstallation request, the uninstallation control section 621 uninstalls (deletes) the current distribution package associated with the specified product ID.

Subsequently, the uninstallation control section 621 inquires of the current apparatus about an uninstallation result of the current distribution package (step S708-4). The inquiry (i.e., polling) is repeated until the uninstallation of the distribution package from the current apparatus is completed and the uninstallation result is sent as a response.

In step S708, the distribution package is uninstalled from all the image forming apparatuses 40 subject to uninstallation of the distribution package, and the deactivation control section 620 specifies the product ID of the current distribution package and the apparatus numbers of all the image forming apparatuses 40 and sends a deactivation request (i.e., a license cancellation request) to the server deactivation section 116 of the license management server 10 (step S709). The server deactivation section 116 carries out the process similar to that illustrated in step S503 of FIG. 43. As a result, the license status associated with the specified product ID and the apparatus number is changed to the "check-in" status. Subsequently, the server deactivation section 116 sends the result of the deactivation process (whether the deactivation has been carried out) to the deactivation section 620 of the apparatus management device 60 as a response (step S710).

As described above, in the apparatus management device 60 according to the second embodiment, installation and activation (starting the use of the license) of the distribution package from the plural image forming apparatuses 40 are carried out all at once. Accordingly, in the user's environment E1 having numerous image forming apparatuses 40, the amount of operations carried out by the user may be significantly reduced.

Note that in the second embodiment, the image forming apparatus 40 is illustrated as one example of the apparatus; however, the apparatus may not be limited to the image forming apparatus 40. Any kind of apparatus may be used as the apparatus in the embodiment insofar as a program can be added (installed) in the apparatus.

Figure 52:
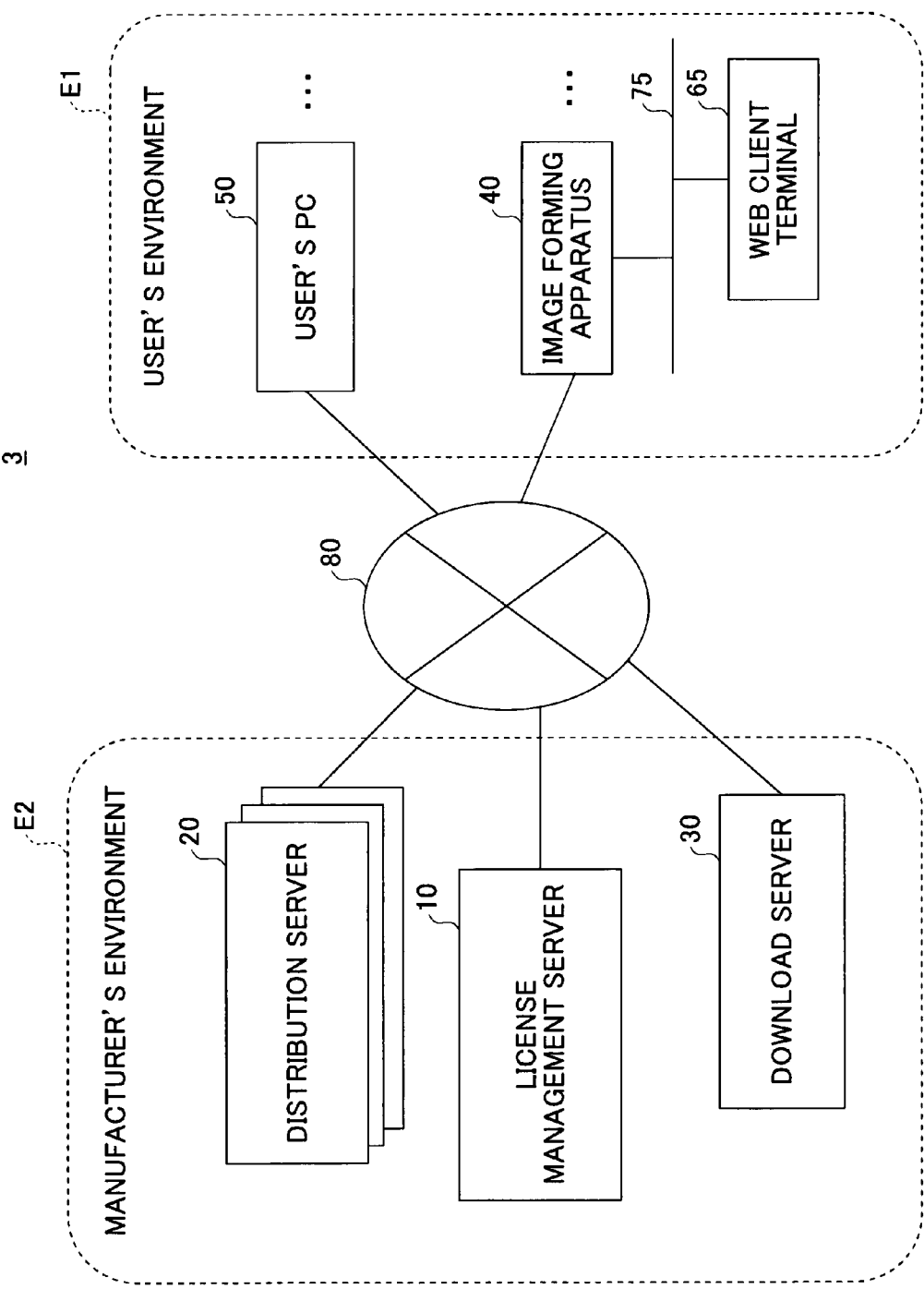
FIG. 52 is a diagram illustrating a configuration example of an apparatus management system according to a third embodiment.

Next, an apparatus management system according to a third embodiment is described. FIG. 52 is a diagram illustrating a configuration example of the apparatus management system according to the third embodiment. Components illustrated in FIG. 52 similar to those illustrated in FIG. 1 are provided with the same reference numerals and descriptions of the components are thus omitted.

In FIG. 52, a Web client terminal 65 is added to the user's environment E1. The Web client terminal 65 is a computer or an electronic apparatus having a Web browser such as a personal computer (PC). A hardware configuration of the Web client terminal 65 may be the same as that illustrated in FIG. 6. Note that the Web client terminal 65 includes a display device such as a liquid crystal display and input devices such as a keyboard and a mouse. The Web client terminal 65 is connected to each of the image forming apparatuses 40 via a network 75 (regardless of wired or wireless connection) such as a local area network (LAN). Note that the user's PC 50 may include the function of the Web client terminal 65.

Figure 53:
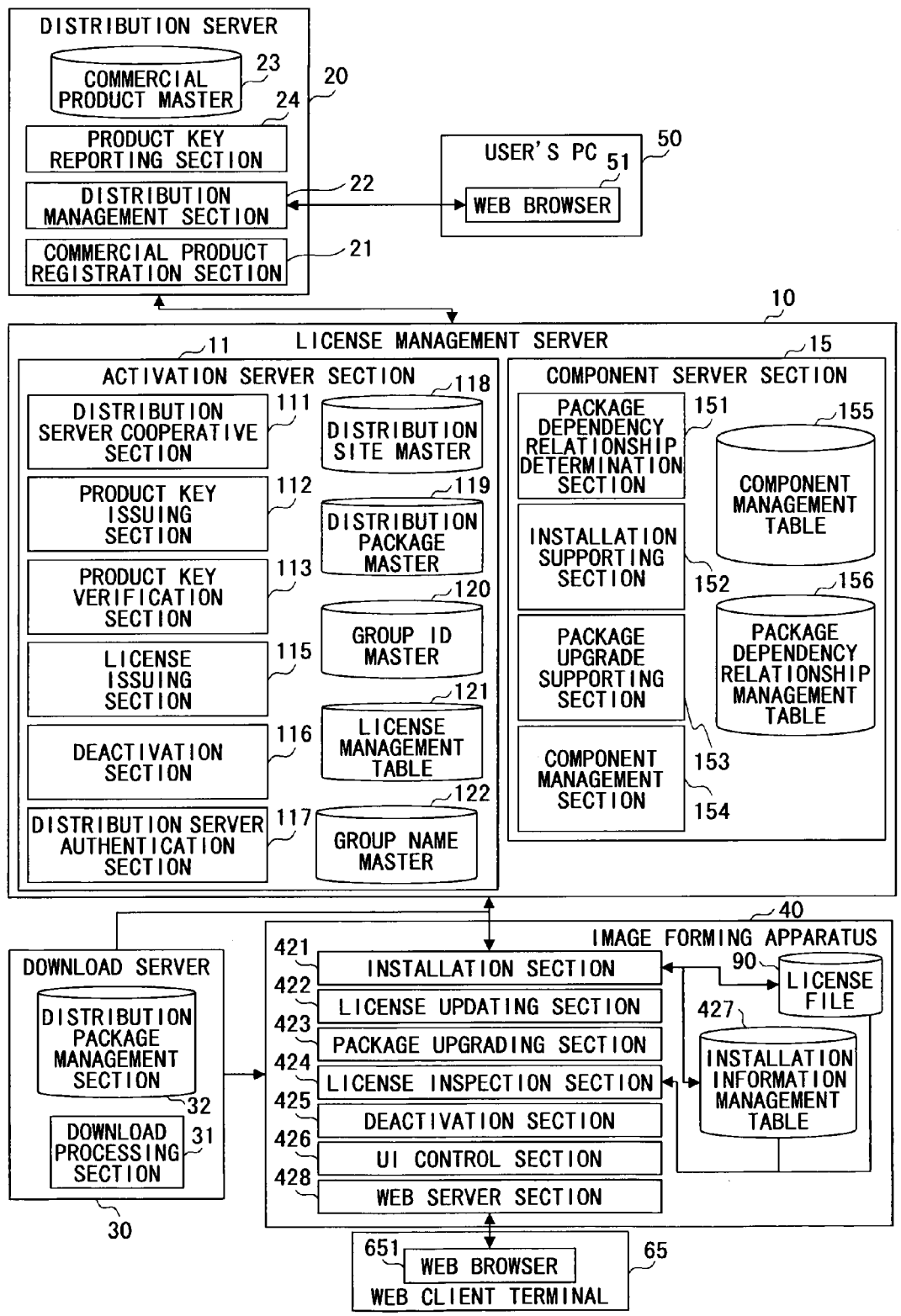
FIG. 53 is a diagram illustrating a functional configuration example of the apparatus management system according to the third embodiment.

FIG. 53 is a diagram illustrating a functional configuration example of the apparatus management system according to the third embodiment. Components illustrated in FIG. 53 similar to those illustrated in FIG. 5 are provided with the same reference numerals and descriptions of the components are thus omitted.

In FIG. 53, the image forming apparatus 40 further includes the Web server section 428. The Web server section 428 carries out a display process to display a screen, which the UI control section 426 displays on the operations panel 45 in the first embodiment, on the Web client terminal 65. Specifically, the Web server section 428 sends HTML data of various screens to the Web client terminal 65.

The Web client terminal 65 includes a Web browser 651. The Web browser 651 receives the HTML data of various screens sent from the Web server section 428 and displays the various screens on a display device of the Web client terminal 651 based on the received HTML data of the various screens.

That is, in the apparatus management system 3 according to the third embodiment, the user is capable of remotely carrying out operations that the user carries out via the operations panel 45 in the first embodiment via the Web client terminal 65. Specifically, the user is capable of carrying out input instructions carried out steps in S151, S159, and S165 in the sequence diagram in FIG. 22 via screens displayed by the Web browser 651. Thus, in the third embodiment, the Web server section 428 corresponds to an example of an input unit that receives an input of the license key.

Note that in the above-described embodiments, the license management server 10, the distribution server 20, and the download server 30 are illustrated as separate apparatuses. However, the license management server 10 may be configured to include at least one of functions of the distribution server 20 and the download server 30.

In one embodiment, there is provided a license management device that includes a license identifier generator unit configured to generate a license identifier and license information corresponding to a purchased group of one or more application programs, the license identifier being associated with a group identifier of the purchased group of the application programs, the license identifier being associated with the license information corresponding to the purchased group of the application programs; a group information storage unit configured to store the group identifier of the purchased group of the application programs in association with product identifiers of the application programs of the purchased group; a license information storage unit configured to record the license identifier corresponding to the group identifier of the purchased group of the application programs in association with the product identifiers of the application programs of the purchased group; a determination unit configured to determine, on receiving the generated license identifier associated with at least one of the application programs of the purchased group, whether the received license identifier associated with the at least one of the application programs of the purchased group is recorded in the license information storage unit; and a first sending unit configured to send via a network, if the determination unit determines that the license identifier received by the determination unit is recorded in the license information storage unit, a license file corresponding to the recorded license identifier associated with the at least one of the application programs of the purchased group to provide a permission to use the at least one of the application programs of the purchased group associated with the recorded license identifier.

In another embodiment, there is provided a computer-readable recording medium containing a computer program for causing a computer to carry out a method for managing a license in a license management device. The method includes generating a license identifier and license information corresponding to a purchased group of one or more application programs, the license identifier being associated with a group identifier of the purchased group of the application programs, the license identifier being associated with the license information corresponding to the purchased group of the application programs; storing the group identifier of the purchased group of the application programs in association with product identifiers of the application programs of the purchased group; recording the license identifier corresponding to the group identifier of the purchased group of the application programs in association with the product identifiers of the application programs of the purchased group; determining, on receiving the generated license identifier associated with at least one of the application programs of the purchased group, whether the received license identifier associated with the at least one of the application programs of the purchased group is recorded in a license information storage unit; and sending via a network, if the license identifier associated, with the at least one of the application programs of the purchased group received in the determination step is determined as being recorded in the license information storage unit, a license file corresponding to the recorded license identifier associated with the at least one of the application programs of the purchased group to provide a permission to use the at least one of the application programs of the purchased group associated with the recorded license identifier.

In another embodiment, there is provided a license management system that includes an information processing apparatus; and a license management device connected to the information processing apparatus via a network. In the license management system, the license management device includes a license identifier generator unit configured to generate a license identifier and license information corresponding to a purchased group of one or more application programs, the license identifier being associated with a group identifier of the purchased group of the application programs, the license identifier being associated with the license information corresponding to the purchased group of the application programs; a group information storage unit configured to store the group identifier of the purchased group of the application programs in association with product identifiers of the application programs of the purchased group; a license information storage unit configured to store the license identifier corresponding to the group identifier of the purchased group of the application programs in association with the product identifiers of the application programs of the purchased group; a determination unit configured to determine, on receiving the generated license identifier associated with at least one of the application programs of the purchased group from the information processing apparatus, whether the received license identifier associated with the at least one of the application programs of the purchased group is recorded in the license information storage unit; and a sending unit configured to send to the information processing apparatus via a network, if the determination unit determines that the license identifier associated with the at least one of the application programs of the purchased group received by the determination unit is recorded in the license information storage unit, a license file corresponding to the recorded license identifier associated with the at least one of the application programs of the purchased group to provide a permission to use the at least one of the application programs of the purchased group associated with the recorded license identifier, and the information processing apparatus includes an input unit configured to receive the license identifier input thereto; a sending unit configured to send the input license identifier received by the input unit to the license management device; and a receiving unit configured to receive the license file corresponding to the received license identifier associated with the at least one of the application programs of the purchased group from the license management device.

In such license management system and license management device according to the above embodiments, operations involving introducing an application program and a license corresponding to the application program may be appropriately supported.

Embodiments of the present invention have been described heretofore for the purpose of illustration. The present invention is not limited to these embodiments, but various variations and modifications may be made without departing from the scope of the present invention. The present invention should not be interpreted as being limited to the embodiments that are described in the specification and illustrated in the drawings.

The present application is based on Japanese Priority Application No. 2009-253500 filed on Nov. 4, 2009, with the Japanese Patent Office, the entire contents of which are hereby incorporated by reference.

The invention claimed is:

1. A license management device comprising:
a network interface connected, via a network, to one or more distribution servers, the one or more distribution servers being configured to manage distribution of one or more application programs, and the one or more distribution servers being set to provide for different distribution areas; and
circuitry configured to:

generate a license identifier and license information corresponding to a purchased group of one or more application programs from the one or more distribution servers, the license identifier being associated with a group identifier of the purchased group of the one or more application programs, the license identifier being associated with the license information corresponding to the purchased group of the one or more application programs;

store, in a memory, identifier information of the one or more distribution servers and the group identifier of the purchased group of the one or more application programs in association with respective product identifiers of the one or more application programs of the purchased group, the group identifier of the purchased group of the one or more application programs being associated with the one or more distribution servers based on a corresponding distribution area;

record, in the memory, the license identifier corresponding to the group identifier of the purchased group of the one or more application programs in association with the respective product identifiers of the one or more application programs of the purchased group;

determine, on receiving the generated license identifier associated with the group identifier of the purchased group of at least one of the one or more application programs, whether the license identifier is recorded in the memory;

send, via the network interface, when the circuitry determines that the received license identifier is recorded in the memory, a license file corresponding to the license identifier to provide a permission to use the at least one of the one or more application programs of the purchased group associated with the license identifier;

generate an installation list, separate from the license file, of the one or more application programs of the purchased group when the circuitry determines that the received license identifier is recorded in the memory;

send, via the network interface, the generated installation list for selecting one or more of the one or more application programs of the purchased group for installation;

send, via the network interface, an application program acquisition instruction for acquiring the at least one of the one or more application programs of the purchased group associated with the respective product identifiers;

prohibit a deletion of the purchased group of the one or more application programs;

prohibit a modification of a configuration of a group when at least one license associated with the group is in use, the group having the one or more application programs;

receive via, the network interface, a license utilization request including an apparatus identifier uniquely assigned to an installation destination apparatus subject to installation of the at least one of the one or more application programs of the purchased group, the license identifier associated with the at least the one of the one or more application programs of the purchased group, and the product identifier of the at least the one of the one or more application programs of the purchased group, and determine whether a license corresponding to the received license identifier and the received product identifier of the at least one of the one or more application programs of the purchased group contained in the license utilization request is available based on whether information indicating that the license corresponding to the received license identifier and the received product identifier of the at least one of the one or more application programs of the purchased group being in use is recorded in the memory;

record, in the memory when the license corresponding to the received license identifier and the received product identifier of the at least one of the one or more application programs of the purchased group is available, the information indicating that the license corresponding to the received license identifier and the received product identifier of the at least one of the one or more application programs of the purchased group is in use in association with the received license identifier and the received product identifier of the at least one of the one or more application programs of the purchased group;

determine whether the received license identifier is registered in a license management table;

determine whether a first apparatus identifier identical to the received apparatus identifier is registered corresponding to the received license identifier in the license management table when the circuitry determines that the received license identifier is registered in the license management table;

when the first apparatus identifier is not registered in the license management table, determine whether there is a record having a check-in status among records corresponding to the received license identifier and the received product identifier in the license management table;

when the record having the check-in status is found in the license management table, record the received apparatus identifier in a target record and change the check-in status of the target record to a check-out status;

when the first apparatus identifier is registered in the license management table, determine whether a found record having the first apparatus identifier has the check-in status;

when the found record having the first apparatus identifier has the check-in status, record the received apparatus identifier in the target record and change the check-in status of the target record to the check-out status; and generate the license file corresponding to the at least one of the one or more application programs associated with the product identifier and the license identifier corresponding to the product identifier such that the at least one of the one or more application programs associated with the product identifier and the license identifier corresponding to the product identifier is used in the installation destination apparatus associated with the apparatus identifier.

2. The license management device as claimed in claim 1, wherein the circuitry is configured to:
send, via the network interface, the at least one of the one or more application programs of the purchased group associated with the respective product identifiers.

3. The license management device as claimed in claim 2, wherein the different distribution areas are based on geographic regions.

4. The license management device as claimed in claim 1, wherein the circuitry is configured to:
record, in the memory when the license corresponding to the received license identifier and the received product identifier of the at least one of the one or more application programs of the purchased group is available, the apparatus identifier of the installation destination apparatus in association with the received license identifier corresponding to the received product identifier of the at least one of the one or more application programs.

5. The license management device as claimed in claim 1, wherein the circuitry is configured to:
receive the license utilization request sent via a screen displayed based on the installation list in which the one or more of the one or more application programs are selected.

6. The license management device as claimed in claim 1, wherein the circuitry is configured to:
record, in the memory when the license corresponding to the received license identifier and the received product identifier of the at least one of the one or more application programs of the purchased group is available, and a license expiration date of another application program associated with a same purchased group of the at least one of the one or more application programs is assigned as a license expiration date of the license corresponding to the received license identifier and the received product identifier of the at least one of the one or more application programs of the purchased group, the assigned expiration date in association with the received license identifier and the received product identifier of the at least one of the one or more application programs of the purchased group.

7. The license management device as claimed is in claim 1, wherein the different distribution areas are based on geographic regions.

8. A non-transitory computer-readable recording medium containing a computer program for causing a computer to carry out a method for managing a license in a license management device, the method comprising:
connecting, via a network, to one or more distribution servers, the one or more distribution servers being configured to manage distribution of one or more application programs, the one or more distribution servers being set to provide for different distribution areas;

generating a license identifier and license information corresponding to a purchased group of one or more application programs from the one or more distribution servers, the license identifier being associated with a group identifier of the purchased group of the one or more application programs, the license identifier being associated with the license information corresponding to the purchased group of the one or more application programs;

storing identifier information of the one or more distribution servers and the group identifier of the purchased group of the one or more application programs in association with respective product identifiers of the one or more application programs of the purchased group, the group identifier of the purchased group of the one or more application programs being associated with the one or more distribution servers based on a corresponding distribution area;

recording the license identifier corresponding to the group identifier of the purchased group of the one or more application programs in association with the respective product identifiers of the one or more application programs of the purchased group;

determining, on receiving the generated license identifier associated with the group identifier of the purchased group of at least one of the one or more application programs, whether the license identifier is recorded by the computer;

sending, via the network, when the received license identifier associated with the at least one of the one or more application programs of the purchased group is determined as being recorded by the computer, a license file corresponding to the license identifier to provide a permission to use the at least one of the one or more application programs of the purchased group associated with the license identifier;

generating an installation list, separate from the license file, of the one or more application programs of the purchased group when the received license identifier is determined as being recorded by the computer;

send, via the network, the generated installation list for selecting one or more of the one or more application programs of the purchased group for installation;

sending an application program acquisition instruction for acquiring the at least one of the one or more application programs of the purchased group associated with the respective product identifiers;

prohibiting a deletion of the purchased group of the one or more application programs;

prohibiting a modification of a configuration of a group when at least one license associated with the group is in use, the group having the one or more application programs;

receiving, via the network, a license utilization request including an apparatus identifier uniquely assigned to an installation destination apparatus subject to installation of the at least one of the one or more application programs of the purchased group, the license identifier associated with the at least the one of the one or more application programs of the purchased group, and the product identifier of the at least the one of the one or more application programs of the purchased group, and determining whether a license corresponding to the received license identifier and the received product identifier of the at least one of the one or more application programs of the purchased group contained in the license utilization request is available based on whether information indicating that the license corresponding to the received license identifier and the received product identifier of the at least one of the one or more application programs of the purchased group being in use is recorded by the computer;

recording, when the license corresponding to the received license identifier and the received product identifier of the at least one of the one or more application programs of the purchased group is available, the information indicating that the license corresponding to the received license identifier and the received product identifier of the at least one of the one or more application programs of the purchased group is in use in association with the received license identifier and the received product identifier of the at least one of the one or more application programs of the purchased group;

determining whether the received license identifier is registered in a license management table;

determining whether a first apparatus identifier identical to the received apparatus identifier is registered corresponding to the received license identifier in the license management table when it is determined that the received license identifier is registered in the license management table;

when the first apparatus identifier is not registered in the license management table, determining whether there is a record having a check-in status among records corresponding to the received license identifier and the received product identifier in the license management table;

when the record having the check-in status is found in the license management table, recording the received apparatus identifier in a target record and changing the check-in status of the target record to a check-out status;

when the first apparatus identifier is registered in the license management table, determining whether a found record having the first apparatus identifier has the check-in status:

when the found record having the first apparatus identifier has the check-in status, recording the received apparatus identifier in the target record and changing the check-in status of the target record to the check-out status; and generating the license file corresponding to the at least one of the one or more application programs associated with the product identifier and the license identifier corresponding to the product identifier such that the at least one of the one or more application programs associated with the product identifier and the license identifier corresponding to the product identifier is used in the installation destination apparatus associated with the apparatus identifier.

9. The non-transitory computer-readable recording medium as claimed in claim 8, wherein the method further includes:

sending the at least one of the one or more application programs of the purchased group associated with the respective product identifiers.

10. The non-transitory computer-readable recording medium as claimed in claim 9, wherein the different distribution areas are based on geographic regions.

11. The non-transitory computer-readable recording medium as claimed in claim 8, wherein when the license corresponding to the received license identifier and the received product identifier of the at least one of the one or more application programs of the purchased group is available, the apparatus identifier of the installation destination apparatus is recorded in association with the received license identifier corresponding to the received product identifier of the at least one of the one or more application programs.

12. The non-transitory computer-readable recording medium as claimed in claim 8, wherein the license utilization request sent via a screen displayed based on the installation list in which the one or more of the one or more application programs are selected is received in the receiving.

13. The non-transitory computer-readable recording medium as claimed in claim 8, wherein when the license corresponding to the received license identifier and the received product identifier of the at least one of the one or more application programs of the purchased group is available, and a license expiration date of another application program associated with a same purchased group of the at least one of the one or more application programs is assigned as a license expiration date of the license corresponding to the received license identifier and the received product identifier of the at least one of the one or more application programs of the purchased group, the assigned expiration date is recorded in association with the received license identifier and the received product identifier of the at least one of the one or more application programs of the purchased group in the recording.

14. The non-transitory computer-readable recording medium as claimed in claim 8, wherein the different distribution areas are based on geographic regions.

15. A license management system comprising:
an information processing apparatus;
one or more distribution servers that are configured to manage distribution of one or more application programs, the one or more distribution servers being set to provide for different distribution areas; and
a license management device connected to the information processing apparatus and the one or more distribution servers via a network, the license management device including circuitry configured to:
generate a license identifier and license information corresponding to a purchased group of one or more application programs from the one or more distribution servers, the license identifier being associated with a group identifier of the purchased group of the one or more application programs, the license identifier being associated with the license information corresponding to the purchased group of the one or more application programs;
store, in a memory, identifier information of the one or more distribution servers and the group identifier of the purchased group of the one or more application programs in association with respective product identifiers of the one or more application programs of the purchased group, the group identifier of the purchased group of the one or more application programs being associated with the one or more distribution servers based on a corresponding distribution area;
store, in the memory, the license identifier corresponding to the group identifier of the purchased group of the one or more application programs in association with the respective product identifiers of the one or more application programs of the purchased group;
determine, on receiving the generated license identifier associated with the group identifier of the purchased group of at least one of the one or more application programs, whether the license identifier is recorded in the memory;
send to the information processing apparatus via the network, when the circuitry determines that the received license identifier associated with the at least one of the one or more application programs of the purchased group is recorded in the memory, a license file corresponding to the license identifier to provide a permission to use the at least one of the one or more application programs of the purchased group associated with the license identifier;
generate an installation list, separate from the license file, of the one or more application programs of the purchased group when the circuitry determines that the received license identifier is recorded in the memory;
send to the information processing apparatus, via the network, the generated installation list for selecting one or more of the one or more application programs of the purchased group for installation;
send to the one or more distribution servers, via the network interface, an application program acquisition instruction for acquiring the at least one of the one or more application programs of the purchased group associated with the respective product identifiers;
prohibit a deletion of the purchased group of the one or more application programs;
prohibit a modification of a configuration of a group when at least one license associated with the group is in use, the group having the one or more application programs;
receive via, the network, a license utilization request including an apparatus identifier uniquely assigned to an installation destination apparatus subject to installation of the at least one of the one or more application programs of the purchased group, the license identifier associated with the at least the one of the one or more application programs of the purchased group, and the product identifier of the at least the one of the one or more application programs of the purchased group, and determine whether a license corresponding to the received license identifier and the received product identifier of the at least one of the one or more application programs of the purchased group contained in the license utilization request is available based on whether information indicating that the license corresponding to the received license identifier and the received product identifier of the at least one of the one or more application programs of the purchased group being in use is recorded in the memory;
record, in the memory when the license corresponding to the received license identifier and the received product identifier of the at least one of the one or more application programs of the purchased group is available, the information indicating that the license corresponding to the received license identifier and the received product identifier of the at least one of the one or more application programs of the purchased group is in use in association with the received license identifier and the received product identifier of the at least one of the one or more application programs of the purchased group;
determine whether the received license identifier is registered in a license management table;
determine whether a first apparatus identifier identical to the received apparatus identifier is registered corresponding to the received license identifier in the license management table when the circuitry determines that the received license identifier is registered in the license management table;
when the first apparatus identifier is not registered in the license management table, determine whether there is a record having a check-in status among records corresponding to the received license identifier and the received product identifier in the license management table;
when the record having the check-in status is found in the license management table, record the received apparatus identifier in a target record and change the check-in status of the target record to a check-out status;
when the first apparatus identifier is registered in the license management table, determine whether a found record having the first apparatus identifier has the check-in status;
when the found record having the first apparatus identifier has the check-in status, record the received apparatus identifier in the target record and change the check-in status of the target record to the check-out status; and
generate the license file corresponding to the at least one of the one or more application programs associated with the product identifier and the license identifier corresponding to the product identifier such that the at least one of the one or more application programs associated with the product identifier and the license identifier corresponding to the product identifier is used in the installation destination apparatus associated with the apparatus identifier, wherein the information processing apparatus includes another circuitry configured to:

receive the license identifier input thereto;

send the input license identifier to the license management device; and receive the license file corresponding to the received license identifier associated with the at least one of the one or more application programs of the purchased group from the license management device.

16. The license management system as claimed in claim 15, wherein the different distribution areas are based on geographic regions.

* * * * *